(12) United States Patent
Han et al.

(10) Patent No.: US 8,658,751 B2
(45) Date of Patent: Feb. 25, 2014

(54) MOLECULE-BASED MAGNETIC POLYMERS AND METHODS

(75) Inventors: Chang Dae Han, Akron, OH (US); Wenyi Huang, Columbus, OH (US)

(73) Assignee: The University of Akron, Akron, OH (US)

( * ) Notice: Subject to any disclaimer, the term of this patent is extended or adjusted under 35 U.S.C. 154(b) by 240 days.

(21) Appl. No.: 13/271,693

(22) Filed: Oct. 12, 2011

(65) Prior Publication Data

US 2012/0035330 A1 Feb. 9, 2012

Related U.S. Application Data

(63) Continuation-in-part of application No. 12/717,607, filed on Mar. 4, 2010, now abandoned, which is a continuation-in-part of application No. PCT/US2008/075311, filed on Sep. 5, 2008.

(60) Provisional application No. 60/970,723, filed on Sep. 7, 2007, provisional application No. 60/970,752, filed on Sep. 7, 2007.

(51) Int. Cl.
*C08G 79/00* (2006.01)
*C08F 283/00* (2006.01)
*C08L 85/00* (2006.01)

(52) U.S. Cl.
USPC .............. 528/9; 525/389; 525/374; 525/539

(58) Field of Classification Search
USPC .................. 528/9; 525/389, 374, 539
See application file for complete search history.

(56) References Cited

U.S. PATENT DOCUMENTS

| | | | | |
|---|---|---|---|---|
| 3,975,289 A | * | 8/1976 | Froix | 252/589 |
| 4,080,490 A | * | 3/1978 | Dawans et al. | 525/326.2 |
| 5,272,238 A | * | 12/1993 | Garnier et al. | 528/9 |
| 5,844,052 A | * | 12/1998 | Keller et al. | 525/474 |
| 7,041,374 B1 | * | 5/2006 | Nelson et al. | 428/411.1 |
| 7,786,217 B2 | * | 8/2010 | Faust et al. | 525/201 |
| 7,879,740 B2 | * | 2/2011 | Lee et al. | 438/780 |
| 8,444,834 B2 | * | 5/2013 | Liu et al. | 204/403.14 |
| 2007/0197768 A1 | | 8/2007 | Choi et al. | |
| 2008/0111127 A1 | | 5/2008 | Lee et al. | |
| 2012/0041163 A1 | * | 2/2012 | Tang et al. | 526/241 |

FOREIGN PATENT DOCUMENTS

| | | | |
|---|---|---|---|
| DE | 37 03 771 A1 | * 8/1988 | |
| DE | 370377 | 8/1988 | |
| FR | 2698631 | 6/1994 | |
| JP | 2008-120994 A | * 5/2008 | C08G 61/12 |

OTHER PUBLICATIONS

Vernois et al. J. Appl. Polym. Sci. 1979, 23, 1601-1606.*
Abd-Alla et al. J. Appl. Polym. Sci. 1993, 47, 323-329.*
Wright, M.E.; Sigman, M.S. Macromolecules 1992, 25, 6055-6058.*
Lee et al. Bull. Korean Chem. Soc. 2009, 30(2), 309-314.*
Lions, F.; Martins, K. V. "Tridentate Chelate Compounds. I", J. Am. Chem. Soc. 1957, 79. 2733-2738.
Vernois, M.; Williams, H.L. Copolymers of 3,3'4,4'-Tetraaminobiphenyl and 1,2,4,5-Tetraaminobenzene with 1,1'-Bis(glyoxalyl)-ferrocene and 1,1'-Bis(phenylglyoxalyl) ferrocene, J. Appl. Polym. Sci. 1979, 23: 1601-1606.
Sugano T, Kinoshita M, Shirotani I, Ohno K (1983) Metamagnetic behavior of an organometallic polymer: [Fe{(C13H17N3)2}SO4×6H2O]n, Solid State Commu., 45: 99-102.
Cao, Y.; Wang, P.; Hu, Z.; Li, S.; Zhang, L; Zhao, "Magnetic Characterizations of Organic Ferromagnet Poly-BIBO and Its Derivative", J. Solid State Commun. 1988, 68: 817-820.
Zhao, M.-G.; Lin, Z-R.; Ni, X. "An Ambient Temperature-Stable Organometallic Ferromagnet", J. Phys. Condens. Matter 1991, 3: 6695-6702.

* cited by examiner

*Primary Examiner* — Rip A. Lee
(74) *Attorney, Agent, or Firm* — Renner Kenner Greive Bobak Taylor & Weber

(57) ABSTRACT

Molecule-based magnetic polymers with reasonably high Curie temperature and methods of preparing are provided. In particular, magnetic polymers having repeating units of an organometallic monomer covalently bonded to a monomer having a plurality of unpaired electrons are disclosed. Intrinsically homogeneous magnetic fluids (liquid magnets) and methods of preparing are also provided.

17 Claims, 21 Drawing Sheets

(I) Metallocene-Containing Molecule-Based Magnetic Polymer (II) Bimetallocene-Containing Molecule-Based Magnetic Polymer

MOLECULE-BASED MAGNETIC POLYMERS AND METHODS

CROSS-REFERENCE TO RELATED APPLICATIONS

This application is a continuation-in-part of U.S. Patent Publication No. 2010/0155649, which is a continuation-in-part of PCT Application No. PCT/US08/75311 filed on Sep. 5, 2008, which claims the benefit of U.S. Provisional Patent Application Ser. Nos. 60/970,723 and 60/970,752, both filed on Sep. 7, 2007, all of which are incorporated herein by reference.

TECHNICAL FIELD

The invention relates to magnetic polymers and methods of making such polymers. This invention also relates to magnetic fluids and methods of making magnetic fluids. More particularly, the invention relates to magnetic polymers and methods of making such polymers with electron-donor metallocene compounds and electron-acceptor organic-based compounds with unpaired electrons. Intrinsically homogeneous magnetic fluids (liquid magnets) and methods of preparing are also provided. The magnetic fluids may include a magnetic polymer in a carrier solvent.

BACKGROUND OF THE INVENTION

Magnets serve an indispensable function in our technology-based society and are ubiquitous in all varieties of mechanical and electronic devices in science and industry. Traditional magnets are atom-based, and are comprised of the transition, lanthanide, or actinide metals, with the magnetism arising from the magnetic dipole moment that is a product of the presence of unpaired electrons in the d- or f-orbitals.

Previous research attempts to design and synthesize molecular organic magnets and high-spin molecules with intrinsic magnetic properties were unsuccessful and very few have been found to be of industrial use, as such molecules have a fairly low ferromagnetic transition temperature, commonly referred to as Curie temperature ($T_c$). There remain fundamental obstacles that seem to block the ability to resolve scientific difficulties in developing organic magnets with high $T_c$ (much higher than room temperature). There are only a few examples of organic magnets that have $T_c$ above room temperature, but such materials are insoluble in common solvents (e.g., toluene, acetone, and tetrahydrofuran) and infusible as well as unstable under ambient environment. Thus the problem of fabrication of magnetic films and liquid magnets still remains unresolved. Since the magnetic anisotropy in organometallic magnets is considerably lower than that in the case of metal-containing compounds arising from the weak spin-orbital coupling between s and p electrons, high-$T_c$ molecular magnets have not yet been realized.

Development of molecule-based magnetic polymers would be worthwhile because they may exhibit numerous desirable properties, including solubility, processability, and synthetic tenability. Such features are a direct result of the molecular nature of molecule-based magnetic polymers and are not shared by traditional atom-based magnets. Molecule-based magnetic polymers provide prospects for new nanoscale molecular materials as functional magnetic memory devices leading to dramatically enhanced data processing speeds and storage capacity in computers or many other applications. Such polymeric magnets would be lighter, more flexible, and less intensive to manufacture than conventional metal and ceramic magnets. Just for example, applications could include magnetic shielding, magneto-optical switching, and candidates for high-density optical data storage systems.

The theory of magnetism is primarily based on two quantum mechanical concepts: electron spin and the Pauli Exclusion principle. From the Curie law, the magnetic susceptibility ($\chi$) is expressed by $\chi=N^2g\beta^2S(S+1)/3k_BT$ where $\beta$ is the effective magnetic moment, g is g-factor, N is Avogadro's number, S is the spin angular momentum, $k_B$ is the Boltzmann constant, and T is the absolute temperature. Thus, $\chi$ is proportional to $S^2$ (thus high spin is required for high magnetic properties), but inversely proportional to T. Also, there is a critical temperature, $T_c$, below which the ferromagnetic materials exhibit spontaneous magnetization. To date, the most challenging issue for the synthesis of molecule-based magnetic polymers is to increase the $T_c$ to well above room temperature, which is desirable for industrial applications.

The conventional molecular/organic magnets used at present are all atom-based. They exist in the form of crystals or complexes through noncovalent bonds (e.g., hydrogen bonding, ionic interactions, or metal coordinations), and thus spin coupling largely depends on the lattice distance of the crystal, because the exchange interaction is proportional to $1/r^{10}$, wherein r is the bond length. Some efforts have been directed to the formation of a charge-transfer (CT) complex to design and synthesize molecular/organic magnets. It has been noted that there are positive and negative spin densities in certain structures (e.g. aromatic radicals), and that atoms of positive spin density are exchange coupled most strongly to atoms of negative spin density in neighboring molecules. The delocalization of spin density in macromolecular chains makes it possible for magnetic interactions to take place across extended bridges between magnetic centers separated from each other, propagating through conjugated bond linkages, which act as molecular wires. Spin polarization (i.e., the simultaneous existence of positive and negative spin densities at different locations within a given radical) is needed for intermolecular exchange interactions to bring about ferromagnetic interactions. Employing iron or transition metal with larger radial orbitals as magnetic centers will improve the overlap between the orbitals of electron acceptor ($A^-$) and electron donor ($D^+$), namely spin coupling. Currently, there have been no successful attempts reported on the synthesis of molecule-based donor-acceptor magnetic polymers.

Magnetic polymers based on p-orbital spins typically exhibit weak ferromagnetic properties and thus $T_c$ is still below 10 K even when S reaches 5000. Therefore, it is necessary to incorporate much stronger magnetic centers into the macromolecular chains, such as iron or other transition metals having the unpaired electrons located in d- or f-orbitals.

Existing superparamagnetic nanocomposites typically contain magnetic particles (e.g., Fe, Co, Ni etc.) in the form of powder or flakes in a non-magnetic polymer matrix. Due to the tendency of magnetic particles to aggregate when added to a non-magnetic polymer matrix, the magnetic particles are typically treated with a surfactant or another polymer in order to suppress aggregation. Because magnetic particles have a much higher density than the non-metallic polymer matrix, the magnetic particles tend to settle out at rest or during storage. This results in non-uniform dispersion of magnetic particles in the polymer matrix and poor heat dissipation during use.

The volume fraction of the magnetic particles in superparamagnetic nanocomposites is much smaller than that of the matrix polymer, and therefore the resulting magnetic level is not high. Thus, applications of superparamagnetic nanocomposites are limited.

Superparamagnetic nanocomposites are further limited by their lack of solubility in common solvents. This prevents them from being used in the preparation of intrinsically homogeneous magnetic fluids (liquid magnets). Thus, magnetic particles (e.g., iron oxide or ferrite) are suspended in a carrier liquid to prepare so-called ferrofluids, and they are used in industry. Ferrofluids are characterized as suspensions of magnetic particles in a carrier fluid, and they suffer from the same problem as superparamagnetic nanocomposites in that the magnetic particles tend to aggregate and also sediment at rest.

Ferrofluids currently in use are typically suspensions containing magnetic particles (iron oxide or ferrite for example) with typical volume fractions of 0.3-0.4 in a carrier fluid (typically silicone oil). There is another type of suspensions of magnetic particles, referred to as magnetorheological fluid (MR) fluid. The difference between ferrofluids and MR fluids lies in the size of magnetic particles. Whereas the sizes of magnetic particles used to prepare ferrofluids are about 5-20 nanometers (nm), the sizes of the magnetic particles used to prepared MR fluids are about 5-20 micrometers (μm), i.e., about 1000 times larger the particle size normally used for the preparation of ferrofluids. The conventional, commercially available MR fluids typically contain an organic additive in order to stabilize the dispersion of aggregates of magnetic particles. Due to the large difference in density between the magnetic particles (having a density of 5-6 $g/cm^3$) and a typical carrier fluid (having a density less than 1 $g/cm^3$), the conventional MR fluids have serious technical problems. In particular, the magnetic particles in the conventional MR fluids settle out over a relatively short period of time (i.e., in a few minutes to a few hours). Another technical difficulty is related to the lack of redispersibility of the magnetic particles in the conventional MR fluids. After the magnetic particles settle, they form highly dense aggregates, the extent of which depends on the chemical structure of a carrier fluid. To help disperse the aggregates of magnetic particles in a heterogeneous MR fluid, considerable efforts have been spent on treating the particles with a surfactant or a polymeric gel during the preparation of such MR fluids, but these attempts have not resolved the deficiencies.

Notwithstanding the state of the art as described herein, there is a need for further improvements in molecule-based (i.e., homogeneous) magnetic fluids and polymers. These types of fluids and polymers (without the presence of magnetic nanoparticles) would have numerous applications and would enable the preparation of intrinsically homogeneous liquid magnets without the need for magnetic particles, which can then replace ferrofluids or MR fluids that have inherent difficulties of sedimentation and aggregation of magnetic particles, and other deficiencies.

It would be worthwhile to have molecule-based magnetic polymers that may alleviate these deficiencies.

SUMMARY OF THE INVENTION

One embodiment of this invention provides molecule-based magnetic polymers and methods of preparing such polymers. New monomers having multiple unpaired electrons ("spins") are prepared, which then play the role of electron-donators resulting in the formation of donor-acceptor polymers with an electron acceptor with at least one transition metal, for example iron, cobalt, or nickel that is located within a ferrocene-, cobaltocene-, or nickelocene-containing monomer. The two monomers can then be polymerized to obtain covalently linked molecule-based magnetic polymers. The synthesized polymers are soluble in organic solvents, since they may have long flexible, bulky side chains.

Another embodiment of this invention provides a magnetic polymer having repeating units of a metallocene-containing electron-donor monomer covalently bonded to a monomer having a plurality of unpaired electrons. Such polymers can be synthesized by covalent bonding, for instance, between a metallocene-containing electron-donor monomer and an electron-acceptor organic-based monomer with unpaired electrons.

In a further embodiment of this invention provides a new method of preparing a magnetic polymer. The method includes the steps of preparing a metallocene-containing electron-donor monomer, preparing a monomer having a plurality of unpaired electrons, and polymerizing the metallocene-containing electron-donor monomer and monomer having a plurality of unpaired electrons to form a magnetic polymer.

In still yet another embodiment of this invention, an intrinsically homogeneous magnetic fluid (liquid magnet) includes a carrier fluid and is devoid of magnetic particles, while the molecule-based magnetic polymer in the carrier fluid solvent comprises repeating units of an organometallic monomer covalently bonded to a monomer having a plurality of unpaired electrons.

A further embodiment of this invention provides molecule-based magnetic fluids and polymers and methods of preparing these fluids and polymers. For example, a series of monomers having multiple unpaired electrons ("spins") are prepared and thus provide an electron acceptor resulting in the formation of donor-acceptor polymers with an electron donor with at least one transition metal. Such transition metals may be iron, cobalt, or nickel or others, that may be located within a ferrocene-, cobaltocene-, or nickelocene-containing and biferrocene-, bicobaltocene-, or binickelocene-containing monomer. The two monomers can then be polymerized to obtain covalently linked molecule-based magnetic polymers. The synthesized polymers may be soluble in organic solvents, since they may have long flexible, bulky side chains.

Yet another embodiment of this invention provides a magnetic polymer having repeating units of a metallocene-containing electron-donor monomer covalently bonded to a monomer having a plurality of unpaired electrons. Further materials and methods are disclosed.

In a particular embodiment, this invention provides a magnetic polymer of formula 4:

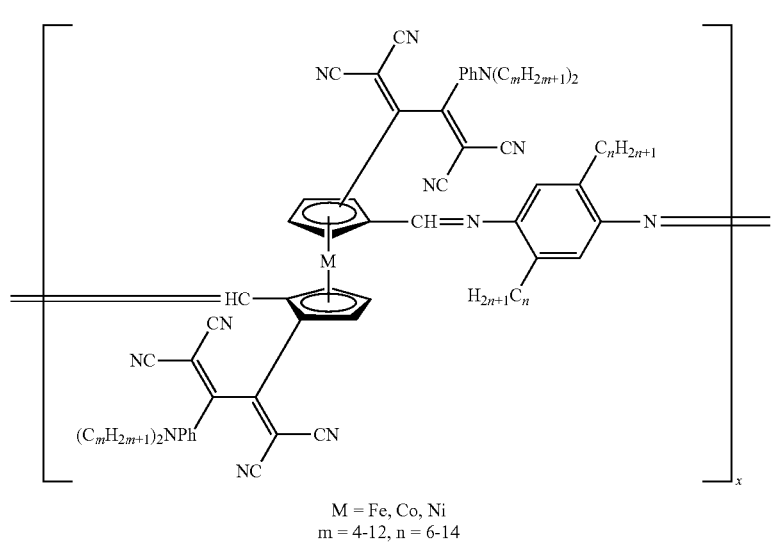

M = Fe, Co, Ni
m = 4-12, n = 6-14 wherein M is iron (Fe), cobalt (Co) or nickel (Ni), m is from 4 to 12 and n is from 6 to 14 and x represents the number of repeating units.

In yet another embodiment, this invention provides a method of preparing a magnetic polymer, the method comprising the steps of (a) preparing an organometallic monomer; (b) preparing a monomer having a functional group that polymerizes with the organometallic monomer; (c) reacting the organometallic monomer of (a) with the monomer of (b), to yield an electron-donating polymer; and (d) reacting the electron-donating polymer of step (c) with an electron acceptor, thereby directly bonding the electron acceptor to the organometallic unit of the reaction product of step (c), thereby producing an electron donor-acceptor magnetic polymer.

In yet another embodiment, this invention provides a method of preparing a magnetic polymer, the method comprising the steps of (a) preparing an organometallic monomer including a metallocene, a triple bond and flexible side chains and an aldehyde group; (b) preparing a monomer having an azide group and flexible side chains; (c) reacting the organometallic monomer of (a) with the monomer of (b), in solvent, to yield an electron-donating polymer, the azide group reacting at the aldehyde group; and (d) reacting the electron-donating polymer of step (c) with an electron acceptor, thereby reacting the electron acceptor at the triple bond to directly bond the electron acceptor to the metallocene. In a particular embodiment, the electron acceptor is tetracyanoethylene (TCNE)

DETAILED DESCRIPTION OF THE INVENTION

Figure 1:
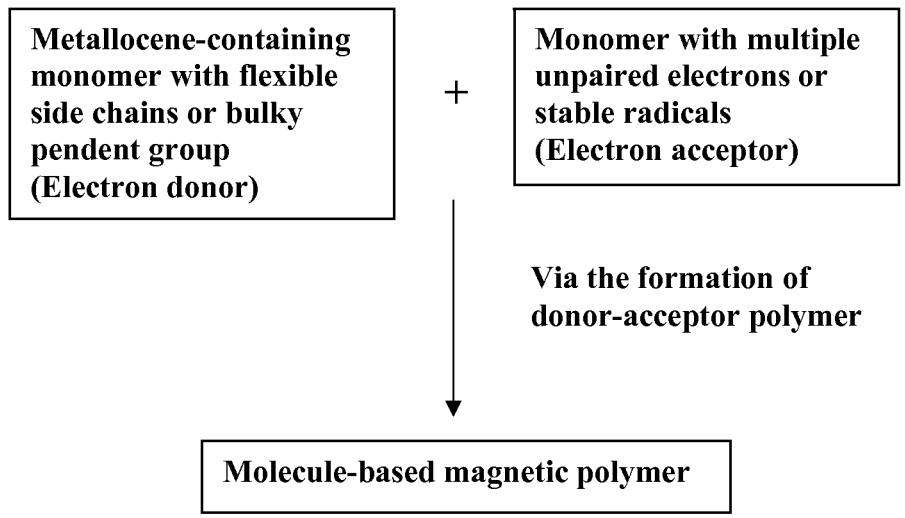
FIG. 1 describes examples of synthesis routes for the molecule-based magnetic polymers according to the invention.
Figure 1:
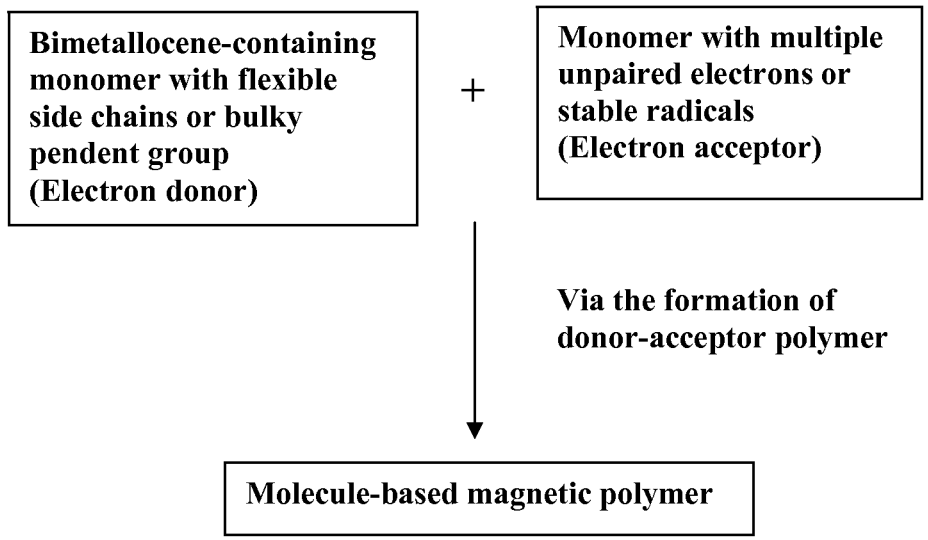

This disclosure provides synthesis procedures for examples of a series of molecule-based magnetic polymers. This disclosure also provides representative properties of the exemplary magnetic polymers. These molecule-based magnetic polymers may be soluble in common solvents, offering good processability. The term "molecule-based", as used herein, refers to the state of covalent bonding between elements and/or atoms during the formation of large molecules, i.e. polymers. The molecule-based magnetic polymers, as described herein, are intrinsically homogeneous in nature. This allows the fabrication and use for a wide variety of applications. The Curie temperature of the magnetic polymer according to the invention will depend on the chemical structure of the particular molecule-based magnetic polymer, and can vary accordingly. It is noted that the Curie temperature denotes the highest temperature at which magnetic behavior can be observed, i.e., at temperatures above the Curie temperature of a magnetic polymer, the polymer ceases to exhibit magnetic characteristics. The Curie temperature should be above the temperatures to be expected in the application and environment in which the magnetic polymer is to be used to prevent degradation of the magnetic characteristics thereof.

The design and synthesis of molecule-based magnetic polymers may be based on the following theoretical considerations. Namely, (a) the macromolecular chains must have magnetic centers with unpaired electrons, (b) the unpaired electrons should have their spins aligned parallel along a given direction, (c) conjugated structure plays an important role in intramolecular spin coupling along the macromolecular chain, (d) the distance between electron donating center and electron accepting center should be as small as possible, ensuring the largest spin coupling, and (e) spin coupling must extend to three dimensions, due to the cooperative effect of magnetism, which can be realized from the spin delocalization and spin polarization along the macromolecular chains, and intermolecular exchange interactions.

These molecule-based magnetic polymers may provide a new generation of ferromagnetic materials having numerous practical applications. These applications include diagnostics, bioassays and life sciences research, as they provide a means of separation of substances from complex mixtures. In brief, a ligand (e.g., antibody or antigen), is either non-covalently or covalently attached to the magnetic polymers through chemical means. Other applications include exclusion seals for computer disc drives, applications such as seals for bearings, for pressure and vacuum sealing devices, for heat transfer and damping fluids in audio speaker devices. Further applications include magnetic toner and inkjet formulations. Further, the magnetic polymers can be used to prepare intrinsically homogeneous magnetic fluids (liquid magnets) for numerous practical applications.

Intrinsically homogeneous magnetic fluids may be used in many different applications. For instance, in the automotive industry, magnetic fluids may be used for electrically controllable shock absorbers, clutches, inertial damper, actuators, and engine mounts. The reason for the use of magnetic fluids in such applications lies in that an applied magnetic field induces an orientation of spins in electrons along the direction of magnetic field, giving rise to a very high resistance to flow, often referred to as "yield stress." Field-induced yield stress is a very unique characteristic of magnetic fluids. The rheological properties of magnetic fluids (such as viscosity, yield stress, and stiffness) can be altered by an external magnetic field. The unique features of these changes are fast (on the order of milliseconds for example), significant, and nearly completely reversible. Specifically, in the "off" state (when no magnetic field is applied), the magnetic centers are randomly distributed, and thus the magnetic fluid behaves like a Newtonian fluid, whereas, in the "on" state (when a magnetic field is applied), the magnetic centers orient in the direction of applied magnetic field, which causes the magnetic fluid to exhibit semisolid behavior with increased yield stress, characteristic of Bingham fluids. The viscosity of magnetic fluids is dependent on the magnitude and direction of the applied magnetic field as well as the shear rate. For example, field-induced yield stress will help a driver to stop a car quickly.

The invention therefore is directed to homogeneous molecule-based magnetic polymers, with such polymers usable as polymers and in intrinsically homogeneous magnetic fluids. The term "homogeneous", as used herein, refers to a substantially "single phase" state in which no free magnetic particles or extraneous foreign particles exist in the synthesized magnetic polymer product in the bulk state, for solids, or in the liquid state, for fluids.

Previous attempts to synthesize molecule-based magnetic polymers were unsuccessful. In the present invention, theoretical considerations were used to develop the synthesis of the chemical structures from monomers that enhance spin-spin interactions between the constituent components, which then leads to molecule-based magnetic polymers after polymerization. It was considered previously that the synthesis of molecule-based magnetic polymers with high $T_c$ would not be possible without using a monomer having a metallic element (e.g., iron. cobalt, or nickel).

Thus, as examples of the invention, a series of monomers have been synthesized as an electron acceptor resulting in the formation of donor-acceptor polymer with an electron donor with at least one transition metal-containing organometallic compound, for example a metallocene, that includes iron, cobalt, or nickel in ferrocene-, cobaltocene-, or nickelocene-containing or biferrocene-, bicobaltocene-, binickelocene-containing monomer. The two monomers were then polymerized to obtain covalently linked molecule-based magnetic polymers. A variety of polymerization approaches may be suitable, and an example is the Staudinger reaction between one monomer with azide groups and another monomer with phosphine groups. The Staudinger reaction advantageously does not require the use of any catalyst. Most metal-containing catalysts would form complexes with electron-accepting monomers, and, in turn, lose their catalyzing properties. This can occur in neutral conditions at room temperature. The synthesized polymers may be soluble in carrier fluids or solvents, because they may contain flexible side chains or bulky pendent groups. Another promising mechanism of polymerization may resort to the Knoevenagel reaction. Judicious modification of both electron-accepting and electron-donating monomers would enable the Knoevenagel reaction to occur in a weak-base solution under mild conditions to produce magnetic polymers. On the other hand, since tetracyanoethylene (TCNE) has extremely high reactivity with ethynyl group in the presence of strong electron donating groups like amino group, it is wise to synthesize metallocene-containing conjugated polymers having ethynyl group and amino group in such a way that TCNE can react with ethynyl group in this polymer after polymerization and accordingly afford the electron donating and accepting charge transfer complex along the macromolecular chain. The rationale behind this idea lies in that a plethora of catalyst systems that are commonly employed in the synthesis of conjugated polymers may be used to achieve high molecular weight metallocene-containing conjugated polymers, circumventing the situation of possible coordination of tetracyano group with metal ion-containing catalysts. In an embodiment of the invention, synthesis routes for molecule-based magnetic polymers are shown in FIG. 1.

In one embodiment, suitable carrier fluids or solvents for the preparation of homogeneous magnetic fluid may include, but are not limited to, organic fluids and oil-based fluids. Suitable carrier fluids which may be used include tetrahydrofuran, N,N-dimethylformamide, chloroform, dichloromethane, natural fatty oils, mineral oils, polyphenylethers, dibasic acid esters, neopentylpolyol esters, phosphate esters, synthetic cycloparaffins and synthetic paraffins, unsaturated hydrocarbon oils, monobasic acid esters, glycol esters and ethers, silicate esters, silicone oils, silicone copolymers, synthetic hydrocarbons, perfluorinated polyethers and esters and halogenated hydrocarbons, and mixtures or blends thereof. Other suitable classes of carrier fluids include hydrocarbons such as mineral oils, paraffins, cycloparaffins (also known as naphthenic oils) and synthetic hydrocarbons. In certain examples, the carrier fluid or solvent is an aqueous based fluid. In one example, the carrier fluid comprises substantially all one fluid. In another example, the carrier fluid is a mixture of one or more carrier fluids. In a further example, the carrier fluid comprises an aliphatic hydrocarbon.

The magnetic properties of molecule-based polymers are dependent upon the chemical nature of electron donating and electron accepting units as well as the bridge linking these units. With this understanding, the following magnetic polymers based on 11,11,12,12-tetracyano-9,10-anthraquinodimethane (TCNAQ), 7,7,8,8-tetracyano-p-quinodi-amine (TCNQ) and tetracyanoethylene (TCNE) have been synthesized.

In one embodiment of this invention, TCNAQ-based magnetic polymers are synthesized. TCNAQ is worthwhile due to the facile synthesis by Lehnert's reagent and stability of molecular structure as well as the feasibility of modifying TCNAQ with functional groups for polymerization. For this reason, the electron-accepting monomers based on TCNAQ has been synthesized and functionalized with azide groups, which react with the phosphine groups in metallocene or bimetallocene monomers to afford the corresponding magnetic polymers.

Synthesis of TCNAQ-Based Electron Accepting Monomers

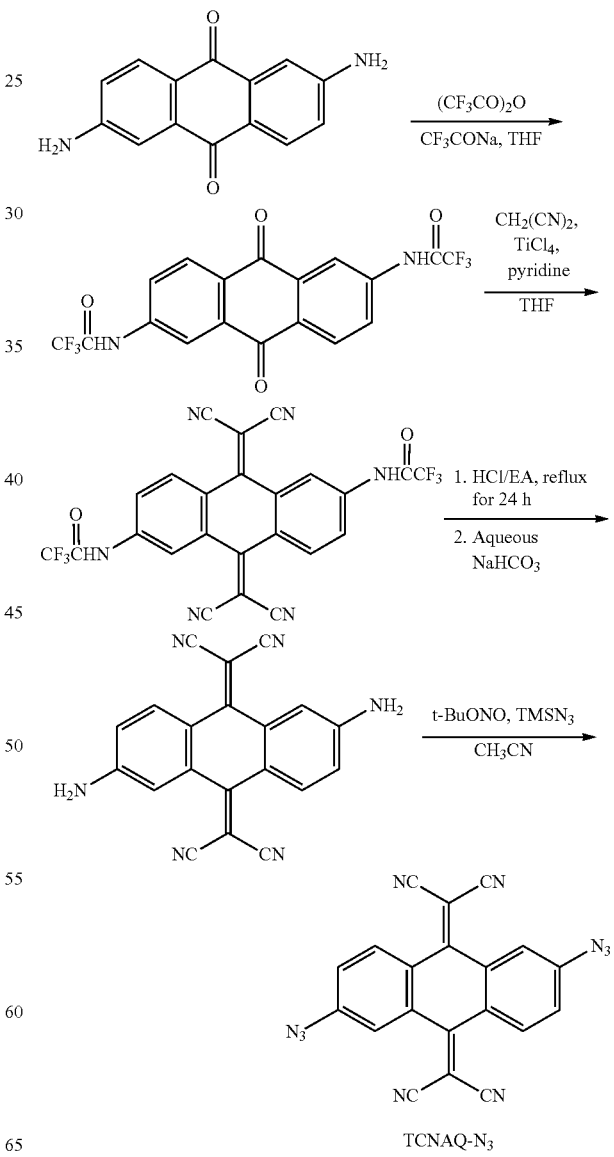

Example 1

Preparation of 2,6-diazido-11,11,12,12-tetracyanoanthraquinodimethane (TCNAQ-N₃)

(i) Preparation of 2,6-diamineanthraquinone trifluorodiacetate

Figure 2:
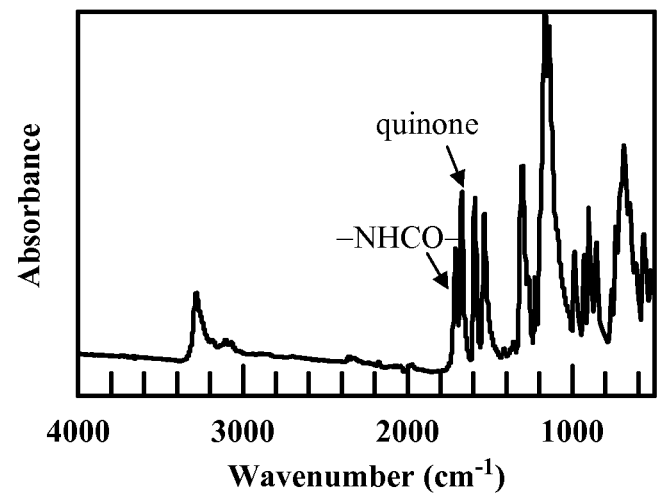
FIG. 2 describes the FTIR spectrum of 2,6-diamineanthraquinone trifluorodiacetate.
Figure 3:
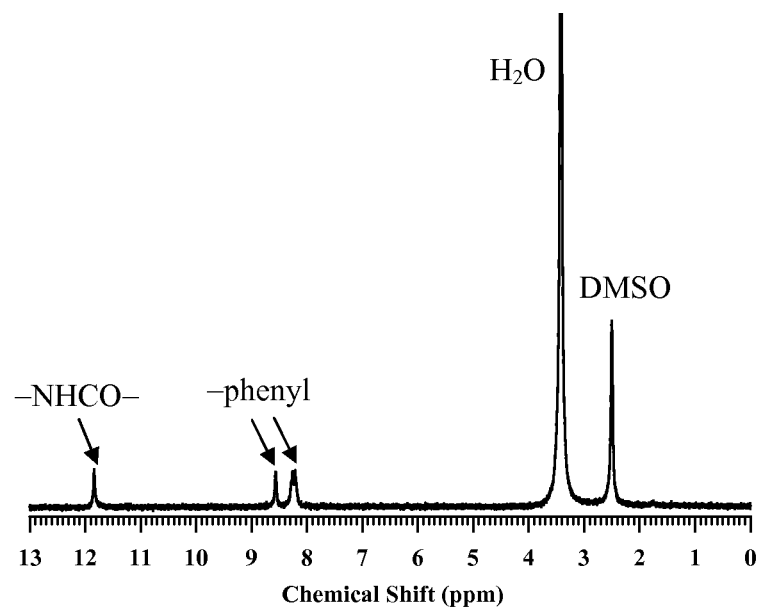
FIG. 3 describes the $^1$H NMR spectrum of 2,6-diamineanthraquinone trifluorodiacetate in DMSO.

The purpose of this reaction is to protect the amino group. 2,6-Diamineanthraquinone (2.4 g, 10 mmol) and sodium trifluoroacetae (4.2 g, 30 mmol) were dissolved in 50 mL anhydrous tetrahydrofuran (THF), and then 10 mL trifluoroacetic anhydride was added in portions. After that, the reaction mixture was heated to reflux in a stream of argon gas overnight. The solution was then allowed to cool down to room temperature and poured into 200 mL cold water. The precipitate was filtered and washed with water, followed by recrystallizing from ethanol three times to give 4.0 g light yellow powder. Yield: 92%. $^1$H NMR (δ, DMSO): 8.25 (m, 4H, —CH—), 8.56 (s, 2H, —CH—), 11.88 (s, 2H, —NH—). FTIR spectrum (cm$^{-1}$): 3280 (—NHCO—), 3070, 1710 (—CO—), 1670 (quinone), 1590 (-phenyl). The Fourier transform infrared (FTIR) spectrum of 2,6-diamineanthraquinone trifluorodiacetate is shown in FIG. 2, and the (proton nuclear magnetic resonance ($^1$H NMR) spectrum of 2,6-diamineanthraquinone trifluorodiacetate in DMSO is shown in FIG. 3.

Figure 4:
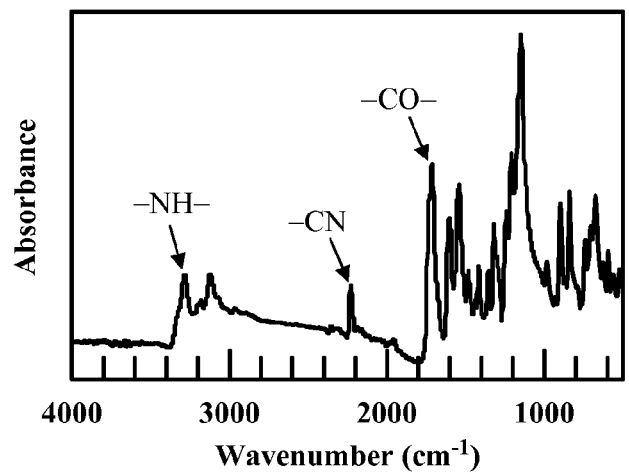
FIG. 4 describes the FTIR spectrum of 2,6-diamine-11,11,12,12-tetracyanoanthraquinodimethane trifluorodiacetate.
Figure 5:
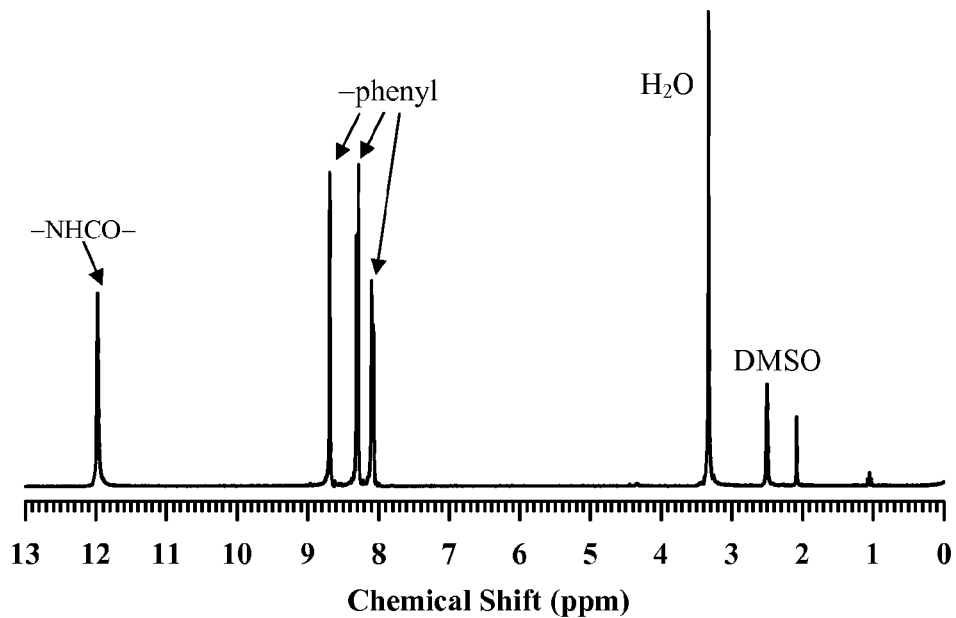
FIG. 5 describes the $^1$H NMR spectrum of 2,6-diamine-11,11,12,12-tetracyanoanthraquino dimethane trifluorodiacetate in DMSO.

(ii) Preparation of 2,6-diamine-11,11,12,12-tetracyanoanthraquinodimethane trifluorodiacetate To a solution of 2,6-diamineanthraquinone trifluorodiacetate (2.1 g, 5 mmol) and malononitrile (1.6 g, 25 mmol) in 30 mL anhydrous tetrahydrofuran was added dropwise 3.3 mL TiCl$_4$ (30 mmol), followed by 4.8 mL anhydrous pyridine (60 mmol) over 60 min at 0° C. After the mixture was refluxed overnight, the solvent was removed under reduced pressure. The residue was treated with icy water and extracted with ethyl acetate. The combined organic layers were dried over anhydrous MgSO$_4$. After filtration and removal of solvent, the crude product was purified over silica gel column chromatography using hexane/ethyl acetate (1:1, v/v) as an eluent, and then recrystallized from hexane/ethyl acetate (1:3, v/v) to afford 1.4 g yellowish powder. Yield: 55%. $^1$H NMR (δ, DMSO): 8.10 (d, 2H, —CH—), 8.32 (d, 2H, —CH—), 8.32 (d, 2H, —CH—), 11.96 (s, 2H, —NH—). FTIR spectrum (cm$^{-1}$): 3290 (—NHCO—), 3120, 1710 (—CO—), 1600 (-phenyl). The FTIR spectrum of 2,6-diamine-11,11,12,12-tetracyanoanthraquinodimethane trifluorodiacetate is shown in FIG. 4, and the $^1$H NMR spectrum of 2,6-diamine-11,11,12,12-tetracyanoanthraquinodimethane trifluorodiacetate in DMSO is shown in FIG. 5.

Figure 6:
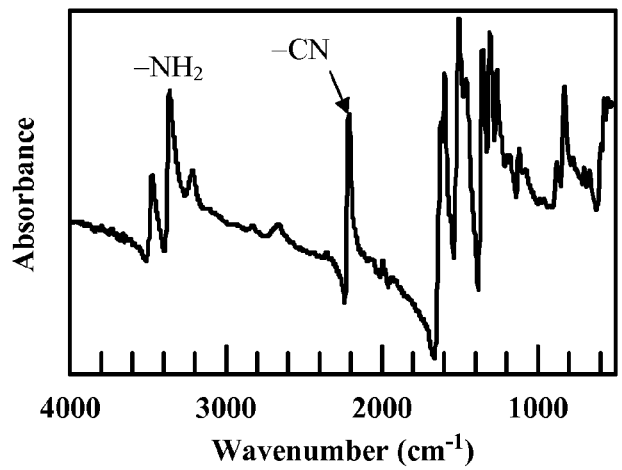
FIG. 6 describes the FTIR spectrum of 2,6-diamine-11,11,12,12-tetracyanoanthraquinodimethane.
Figure 7:
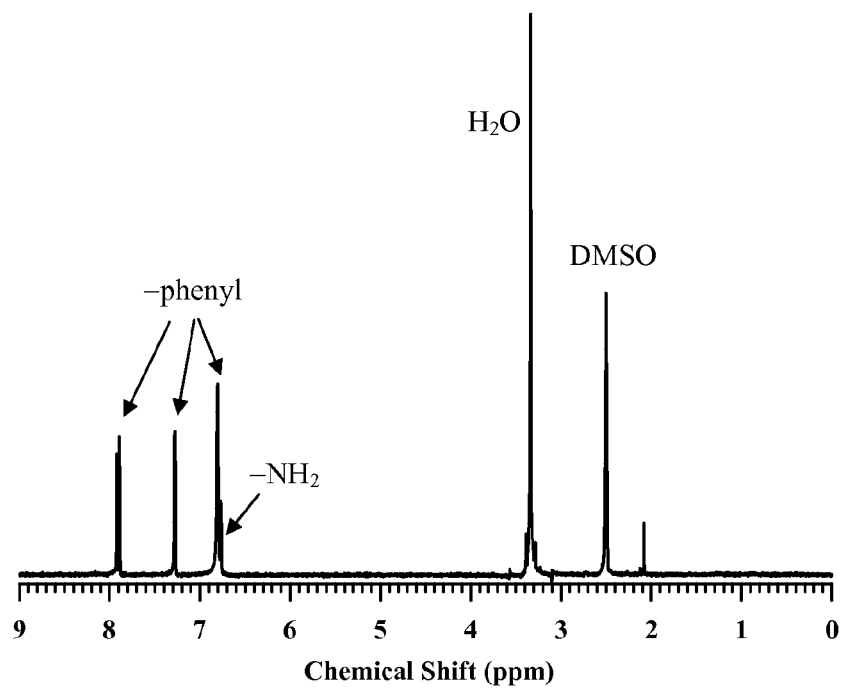
FIG. 7 describes the $^1$H NMR spectrum of 2,6-diamine-11,11,12,12-tetracyanoanthraquino-dimethane in DMSO.
Figure 8:
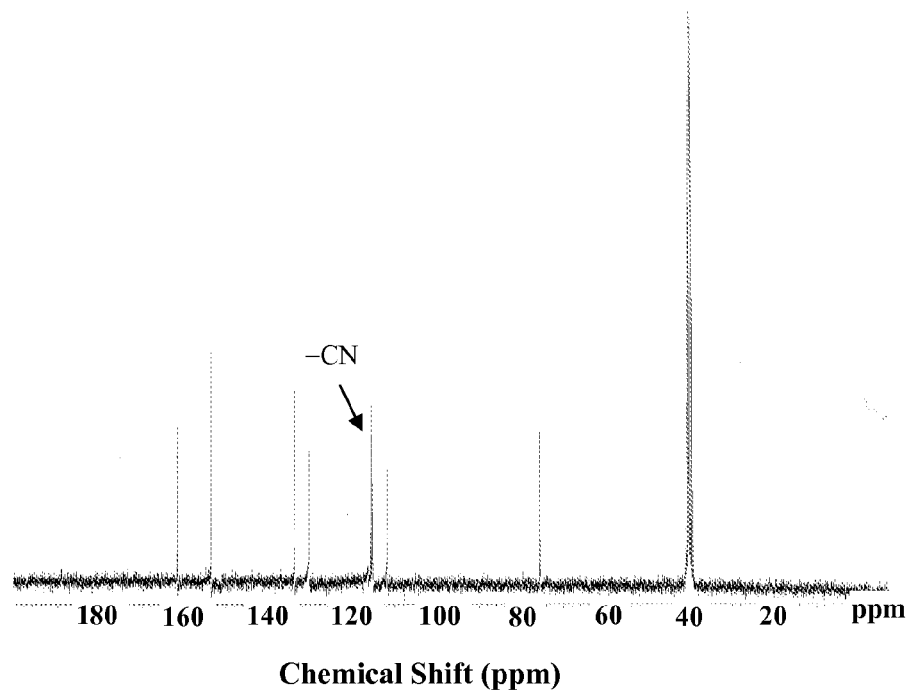
FIG. 8 describes the $^{13}$C NMR spectrum of 2,6-diamine-11,11,12,12-tetracyanoanthraquino-dimethane in DMSO.
Figure 9:
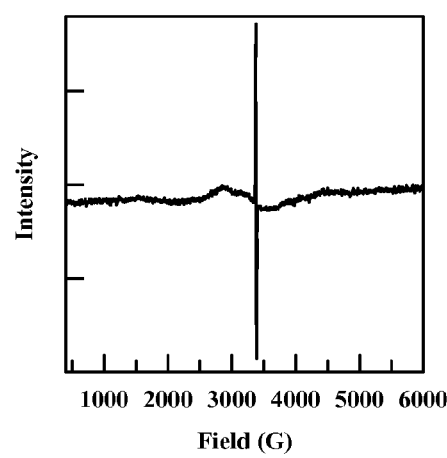
FIG. 9 describes the ESR spectrum of 2,6-diamine-11,11,12,12-tetracyanoanthraquinodimethane at room temperature.

(iii) Preparation of 2,6-diamine-11,11,12,12-tetracyanoanthraquinodimethane 2,6-Diamine-11,11,12,12-tetracyanoanthraquinodimethane trifluorodiacetate (2.6 g, 5 mmol) was dissolved in 50 mL ethyl acetate, to which 50 mL of mixed solution of concentrated HCl/ethyl acetate (1/3, v/v) was added dropwise. The reaction mixture was heated to reflux for 24 h, during which white precipitate was formed. After cooling to 0° C., the solution was slowly added to 200 mL saturated NaHCO$_3$ aqueous solution. The organic layer was separated and washed three times with distilled water, and then dried over Na$_2$SO$_4$. After the solvent was removed under vacuum, the crude product was purified over silica gel column chromatography using hexane/acetone (4:3, v/v) as an eluent, and then recrystallized from hexane/ethyl acetate (1:1, v/v) to give 1.1 g dark red powder. Yield: 65%. $^1$H NMR (δ, DMSO): 6.79 (d, 4H, —NH$_2$), 6.80 (d, 2H, —CH—), 7.29 (d, 2H, —CH—), 7.93 (d, 2H, —CH—). $^{13}$C NMR (δ, DMSO): 75.9, 112.1, 116.1, 116.6, 116.8, 131.2, 134.0, 153.8, 161.9. FTIR spectrum (cm$^{-1}$): 3470 (—NH$_2$), 3360 (—NH$_2$), 3220 (—NH$_2$), 2210 (—CN), 1620 (—NH$_2$), 1600 (-phenyl). The FTIR spectrum of 2,6-diamine-11,11,12,12-tetracyanoanthraquinodimethane is shown in FIG. 6, the $^1$H NMR spectrum of 2,6-diamine-11,11,12,12-tetracyanoanthraquinodimethane in DMSO is shown in FIG. 7, the (carbon-13 nuclear magnetic resonance) ($^{13}$C NMR) spectrum of 2,6-diamine-11,11,12,12-tetracyanoanthraquinodimethane in DMSO is shown in FIG. 8, and the electron spin resonance (ESR) spectrum of 2,6-diamine-11,11,12,12-tetracyanoanthraquino-dimethane at room temperature is shown in FIG. 9.

(iv) Preparation of 2,6-diazido-11,11,12,12-tetracyanoanthraquinodimethane

Figure 10:
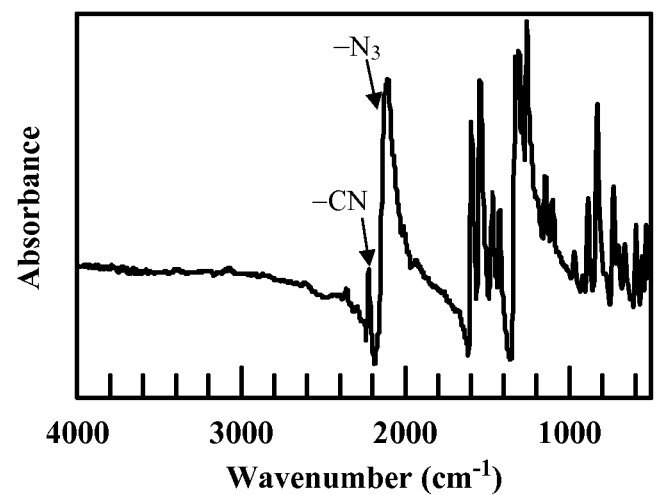
FIG. 10 describes the FTIR spectrum of 2,6-diazido-11,11,12,12-tetracyanoanthraquinodimethane.
Figure 11:
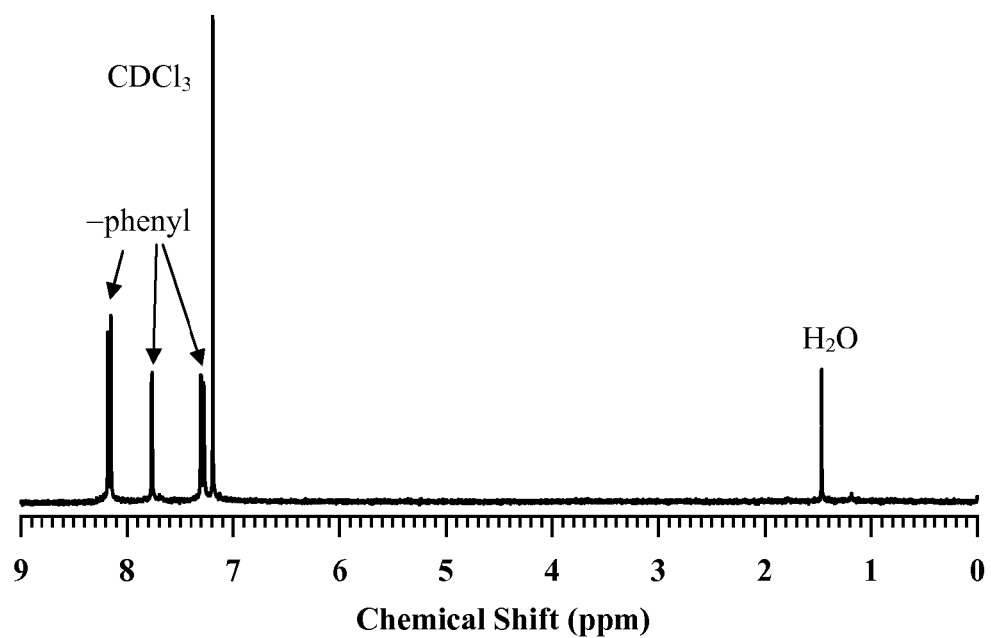
FIG. 11 describes the $^1$H NMR spectrum of 2,6-diazido-11,11,12,12-tetracyanoanthraquino-dimethane in CDCl$_3$.

In a 250 mL round-bottom flask, 2,6-diamine-11,11,12,12-tetracyanoanthraquinodimethane (3.3 g, 10 mmol) was dissolved in 50 mL anhydrous acetonitrile and cooled to 0° C. in an ice bath. To this stirred mixture was added 4.0 mL tert-butyl nitrite (30 mmol) followed by 4.2 mL azidotrimethylsilane (30 mmol) dropwise. The resulting solution was stirred at room temperature for 20 h. The reaction mixture was concentrated under vacuum, and the crude product was purified by silica gel chromatography using CH$_2$Cl$_2$ as an eluent. After removing CH$_2$Cl$_2$, 20 mL tetrahydrofuran was added to dissolve the product and then precipitated in hexanes for three times, giving 2.1 g brown powder. Yield: 55%. $^1$H NMR (δ, CDCl$_3$): 7.29 (d, 2H, —CH—), 7.78 (s, 2H, —CH—), 8.15 (d, 2H, —CH—). FTIR spectrum (cm$^{-1}$): 2220 (—CN), 2110 (—N$_3$), 1600 (-phenyl). The FTIR spectrum of 2,6-diazido-11,11,12,12-tetracyanoanthraquino-dimethane is shown in FIG. 10 and the $^1$H NMR spectrum of 2,6-diazido-11,11,12,12-tetracyanoanthraquinodimethane in CDCl$_3$ is shown in FIG. 11.

In another example, the synthesis of electron donating metallocene or bimetallocene monomers is described.

One of the existing problems that must be overcome to synthesize a truly molecule-based magnetic polymer is the solubility of the polymer in commercially available solvents. In one embodiment of the invention, a metallocene or bimetallocene monomer with flexible side chains was prepared. Previous research showed that a ferromagnetic polymer synthesized without flexible side chains was not soluble in organic solvents. Therefore, when a magnetic polymer is not soluble in a solvent, its practical use is very limited in that the fabrication of many useful industrial products would not be possible.

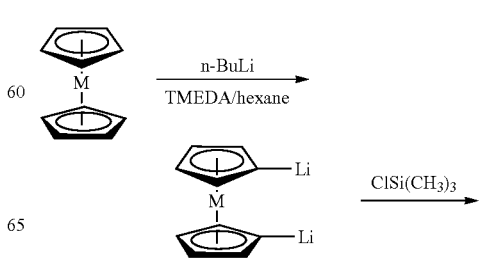

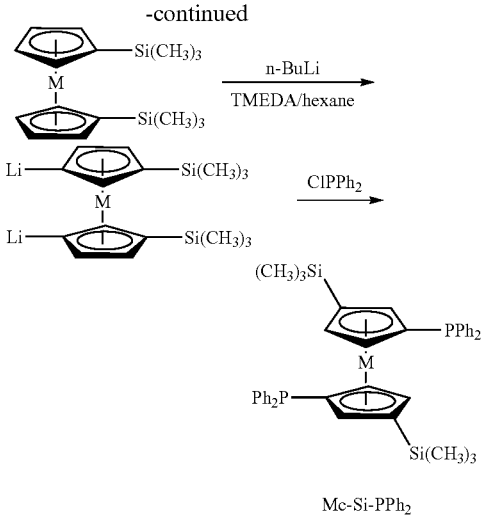

M = Fe, Co, Ni

In the synthesis of bimetallocenes, doubling the number of metallocene groups may enhance significantly the ferromagnetic behavior of the polymers to be synthesized, because of their easy formation of mixed-valence Fe(II)—Fe(III) species and charge transfer complex.

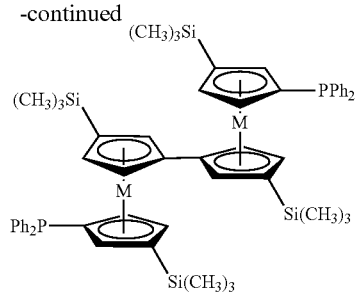

M = Fe, Co, Ni

In order to reduce the shielding effects of bulky groups like trimethylsilyl and diphenylphosphine groups on the metallocene center, another metallocene monomer with phosphine having bis(diethylamino) groups was synthesized according to the following reaction scheme:

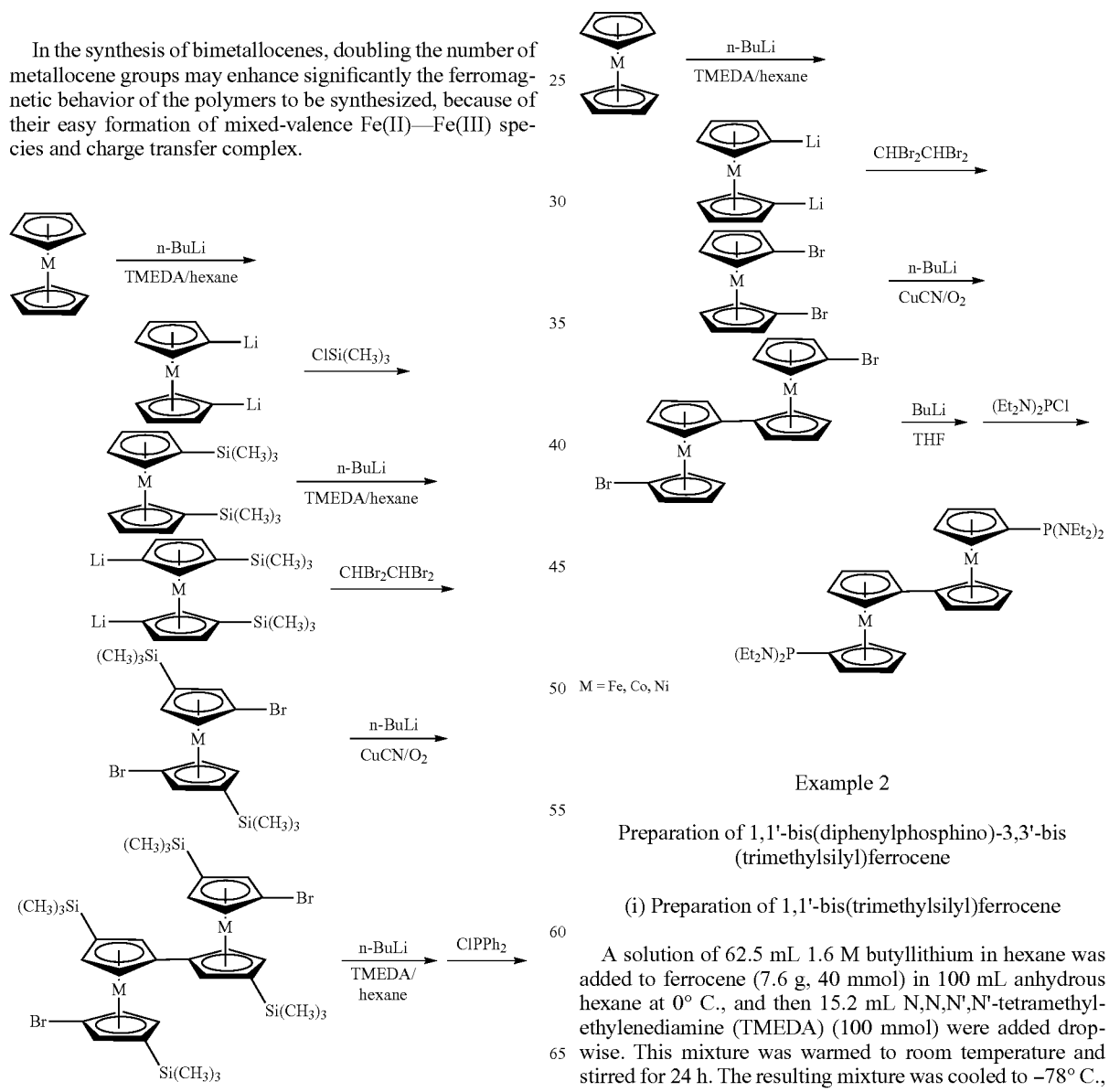

M = Fe, Co, Ni

Example 2

Figure 12:
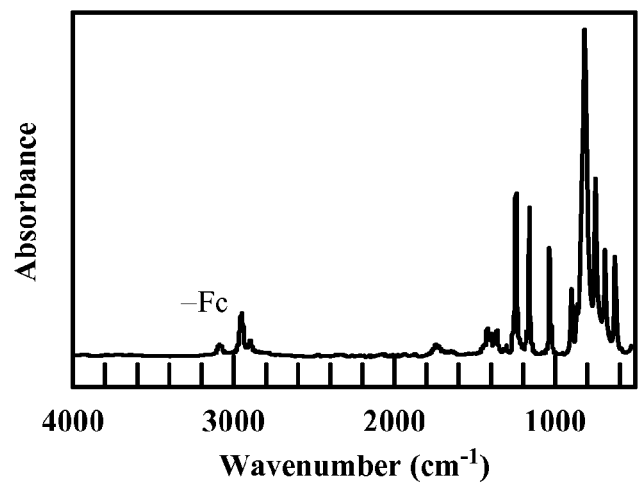
FIG. 12 describes the FTIR spectrum of 1,1'-bis(trimethylsilyl)ferrocene.
Figure 13:
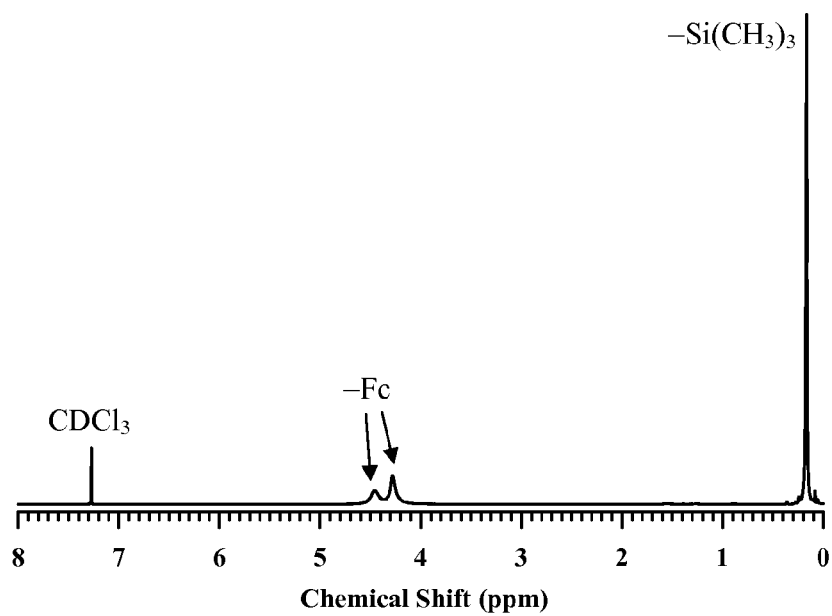
FIG. 13 describes the $^1$H NMR spectrum of 1,1'-bis(trimethylsilyl)ferrocene in CDCl$_3$.

Preparation of 1,1'-bis(diphenylphosphino)-3,3'-bis(trimethylsilyl)ferrocene (i) Preparation of 1,1'-bis(trimethylsilyl)ferrocene A solution of 62.5 mL 1.6 M butyllithium in hexane was added to ferrocene (7.6 g, 40 mmol) in 100 mL anhydrous hexane at 0° C., and then 15.2 mL N,N,N',N'-tetramethylethylenediamine (TMEDA) (100 mmol) were added dropwise. This mixture was warmed to room temperature and stirred for 24 h. The resulting mixture was cooled to −78° C., and trimethylsilyl chloride was added slowly and stirred at this temperature for 2 h. Subsequently, the reaction mixture was allowed to warm to room temperature and stirred overnight. After the reaction was complete, the solution was poured into 200 g ice, and extracted with hexane (4×100 mL). Then, the organic layers were combined, dried over MgSO$_4$, and concentrated under reduced pressure. The residue was separated by silica gel flash chromatography using hexane as an eluent to give 8.6 g red liquid. Yield: 65%. $^1$H NMR (δ, CDCl$_3$): 0.18 (d, 18H, —Si(CH$_3$)$_3$), 4.28 (s, 4H, -Fc), 4.46 (s, 4H, -Fc). FTIR spectrum (cm$^{-1}$): 3090 (-Fc), 2950, 1420, 1380, 1240, 1160, 1040, 818, 750, 688, 629. The FTIR spectrum of 1,1'-bis(trimethylsilyl)ferrocene is shown in FIG. 12 and the $^1$H NMR spectrum of 1,1'-bis(trimethylsilyl)ferrocene in CDCl$_3$ is shown in FIG. 13.

Figure 14:
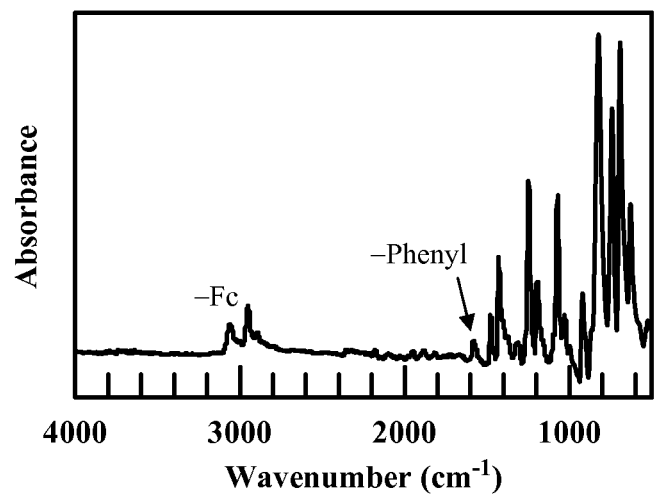
FIG. 14 describes the FTIR spectrum of 1,1'-bis(diphenylphosphino)-3,3'-bis(trimethylsilyl) ferrocene.
Figure 15:
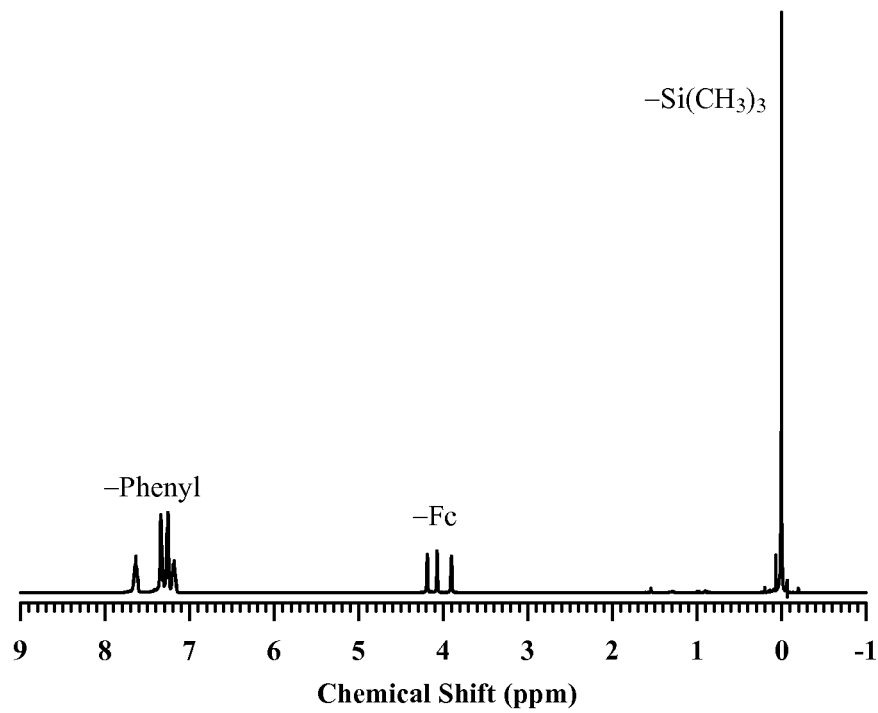
FIG. 15 describes the $^1$H NMR spectrum of 1,1'-bis(diphenylphosphino)-3,3'-bis(trimethylsilyl) ferrocene in CDCl$_3$.
Figure 16:
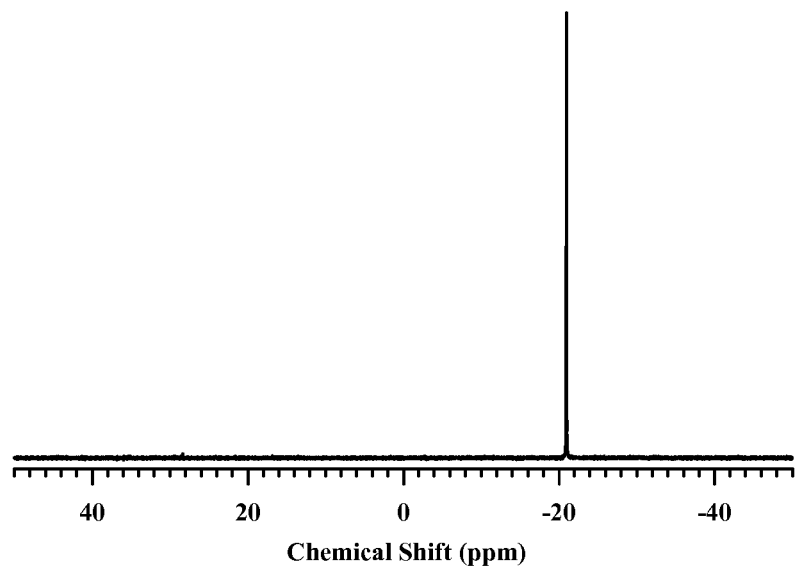
FIG. 16 describes the $^{31}$P NMR spectrum of 1,1'-bis(diphenylphosphino)-3,3'-bis(trimethylsilyl) ferrocene in CDCl$_3$ using phosphorus acid as an external reference.

(ii) Synthesis of 1,1'-bis(diphenylphosphino)-3,3'-bis(trimethylsilyl)ferrocene 18.8 mL 1.6 M butyllithium in hexane (30 mmol) was added to 1,1'-bis(trimethylsilyl)ferrocene (3.3 g, 10 mmol) in 100 mL anhydrous ether at 0° C., and then 4.6 mL TMEDA (30 mmol) were added dropwise. This mixture was warmed to room temperature and stirred for 24 h. The resulting mixture was then cooled to −78° C., and 4.6 mL chlorodiphenylphosphine (25 mmol) was added dropwise and maintained for a further 2 h. After that, the reaction mixture was allowed to warm to room temperature and stirred for 24 h. After cooling to 0° C., it was carefully quenched with 100 mL icy water and the organic layer was separated, followed by washing with 100 mL distilled water twice. The organic layer was dried over Na$_2$SO$_4$, and concentrated under reduced pressure. The residue was separated by silica gel column chromatography using hexane/chloroform (2:1, v/v) as an eluent, and then recrystallized from hexane twice to obtain 2.8 yellow crystals. Yield: 40%. $^1$H NMR (δ, CDCl$_3$): 0.01 (d, 18H, —Si(CH$_3$)$_3$), 3.91 (d, 2H, -Fc), 4.08 (s, 2H, -Fc), 4.20 (d, 2H, -Fc), 7.25 (t, 8H, -phenyl), 7.33 (t, 8H, -phenyl), 7.62 (d, 4H, -phenyl). $^{31}$P NMR (δ, CDCl$_3$, H$_3$PO$_4$ as an external reference): 20.4. FTIR spectrum (cm$^{-1}$): 3070 (-Fc), 2950, 1590 (-phenyl). The FTIR spectrum of 1,1'-bis(diphenylphosphino)-3,3'-bis(trimethylsilyl) ferrocene is shown in FIG. 14, $^1$H NMR spectrum of 1,1'-bis(diphenylphosphino)-3,3'-bis(trimethylsilyl)ferrocene in CDCl$_3$ is shown in FIG. 15, and the (phosphine-31 nuclear magnetic resonance) ($^{31}$P NMR) spectrum of 1,1'-bis(diphenylphosphino)-3,3'-bis(trimethylsilyl)ferrocene in CDCl$_3$ using phosphorus acid as an external reference is shown in FIG. 16.

Polymerization of TCNAQ-Based Magnetic Polymers

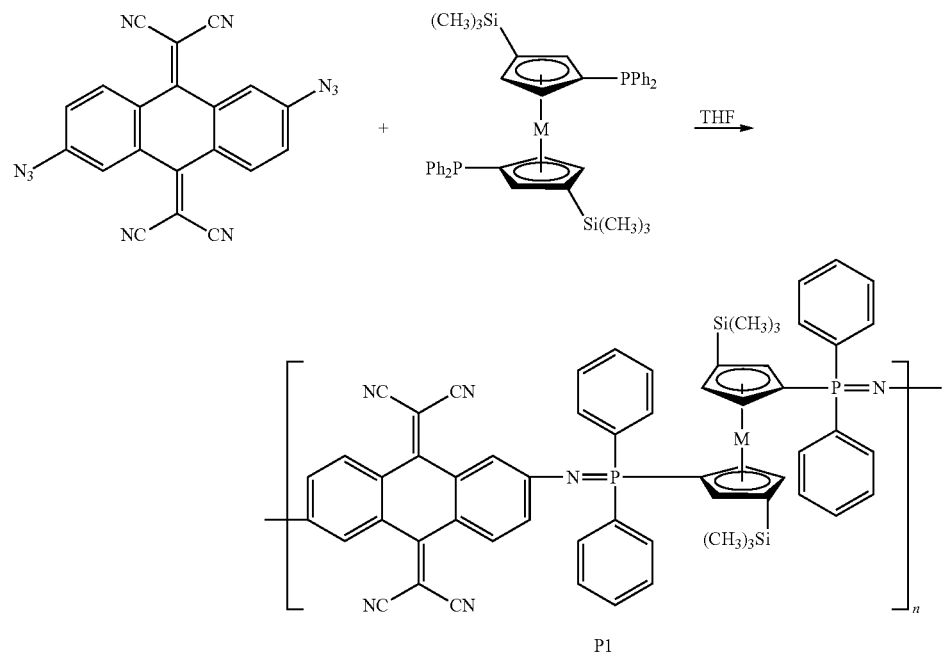

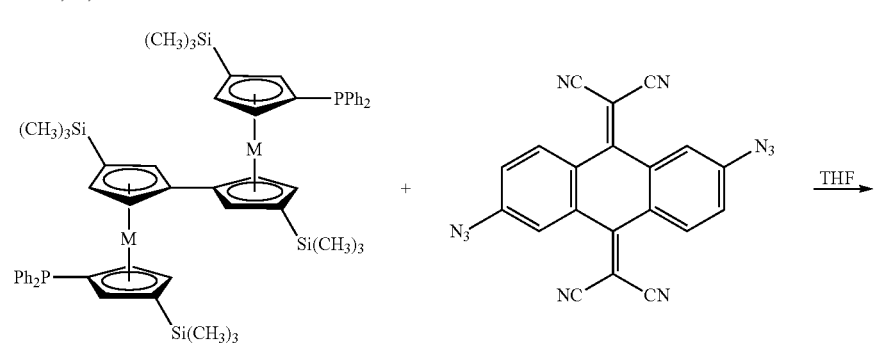

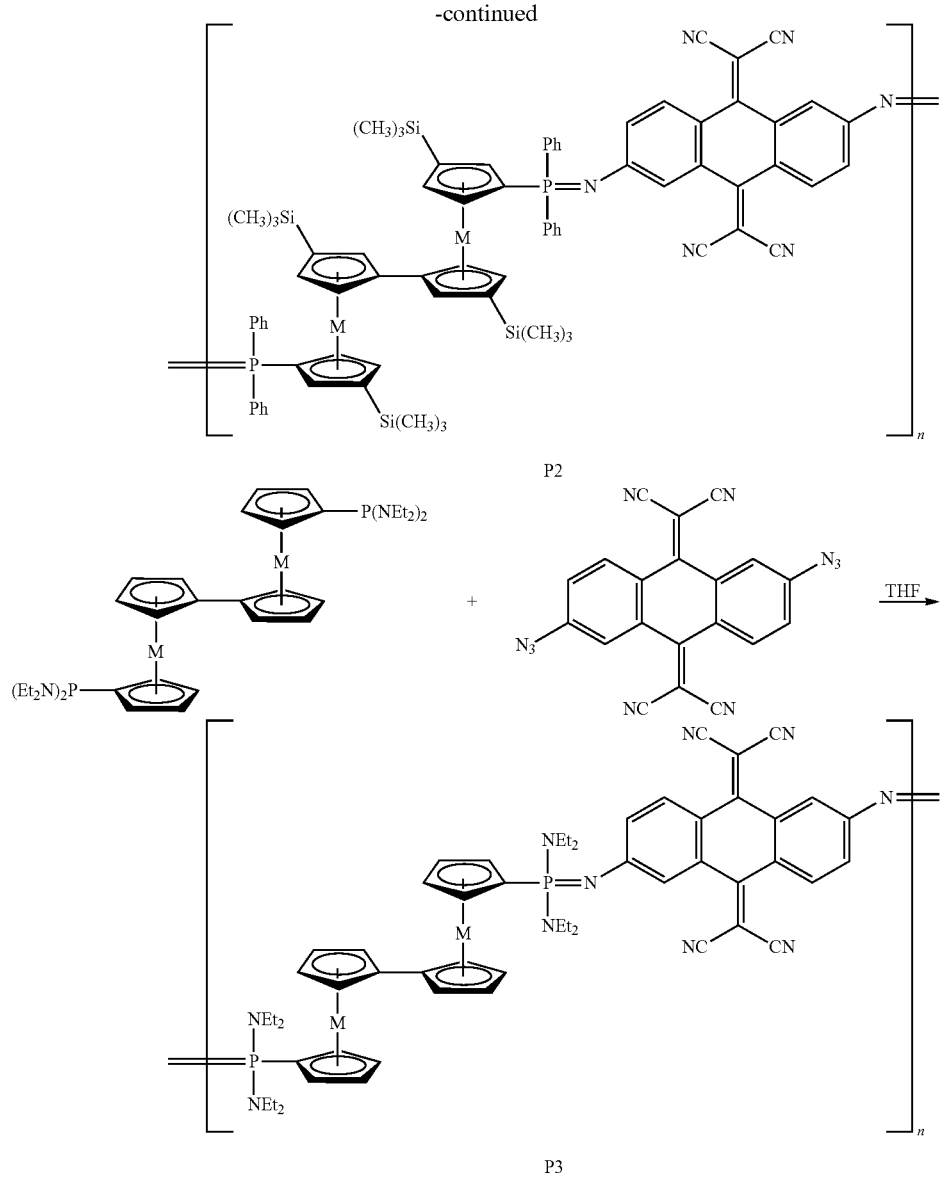

M = Fe, Co, Ni

Example 3

Polymerization of Molecule-Based Magnetic Polymer P1

Figure 17:
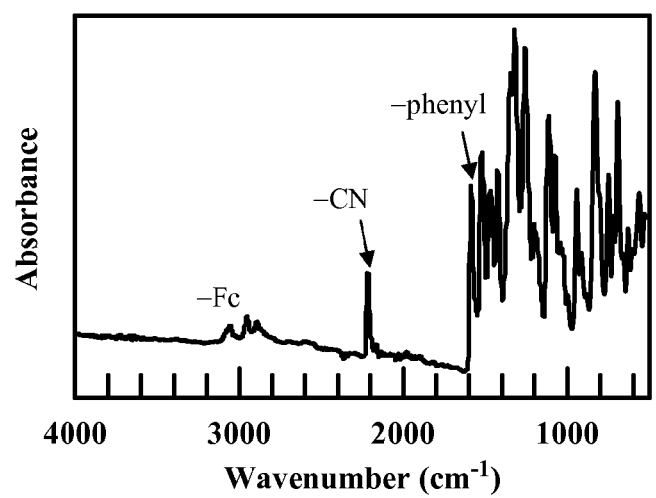
FIG. 17 describes the FTIR spectra of a molecule-based polymer P1.
Figure 18:
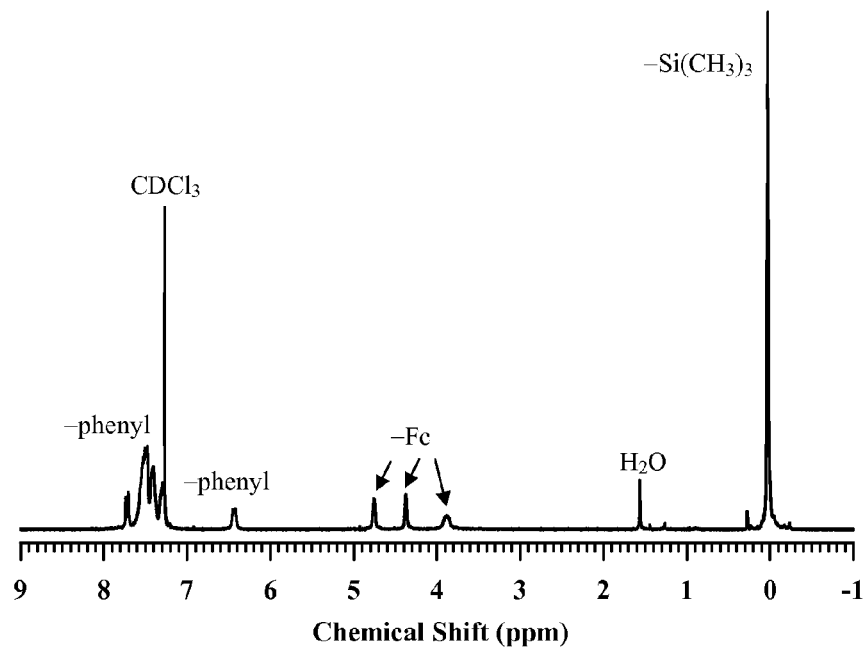
FIG. 18 describes the $^1$H NMR spectra of a molecule-based polymer P1 in CDCl$_3$.
Figure 19:
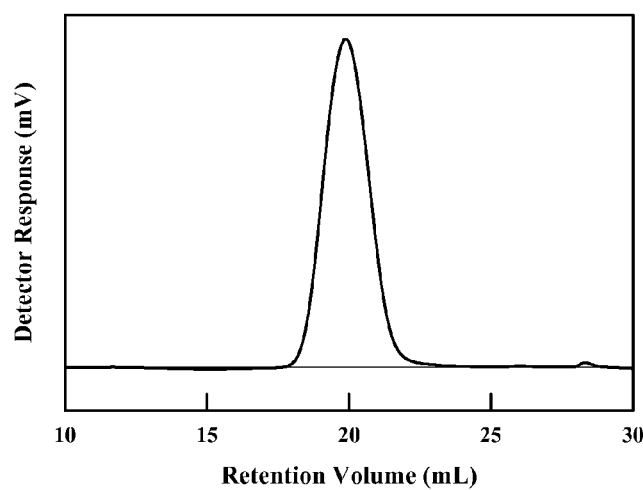
FIG. 19 describes the GPC scan of a molecule-based polymer P1 using polystyrene as a standard, with a number-average molecular weight ($M_n$) of 38,720, weight-average molecular weight ($M_w$) of 53,670, and polydispersity ($M_w/M_n$) of 1.39.

Equimolar amounts of monomers, 2,6-diazido-11,11,12,12-tetracyanoanthraquinodimethane (3.9 g, 10 mmol) and 1,1'-bis(diphenylphosphino)-3,3'-bis(trimethylsilyl)ferrocene (7.0 g, 10 mmol) were placed in a 250 mL three neck round bottom flask, and then 100 mL anhydrous tetrahydrofuran was added at 0° C. The reaction mixture was thoroughly deoxygenated, filled with high-purity argon gas, and then slowly warmed to room temperature and reacted for 72 h, followed by slightly increasing the temperature to 35° C. for another 11 days. Then, the solution was precipitated in hexane, filtered, and dried in vacuo at 60° C. to give 9.7 g brown product. Yield: 95%. In order to remove the low molecular weight fraction, gradient precipitation fractionation was employed by dissolving the polymer in THF followed by slowly adding hexane and then collecting the precipitating samples in portions. Finally, the high molecular weight fractions were combined to afford 6.0 g product with narrow molecular weight distribution. $^1$H NMR ($\delta$, $CDCl_3$): 0.01 (d, 18H, —Si($CH_3$)$_3$), 3.89 (s, 2H, -Fc), 4.38 (d, 2H, -Fc), 4.76 (d, 2H, -Fc), 6.43 (s, 2H, -phenyl), 6.30 (d, 2H, -phenyl), 7.50 (m, 20H, -phenyl), 7.74 (d, 2H, -phenyl). FTIR spectrum ($cm^{-1}$): 3060 (-Fc), 2950, 2890, 2220 (—CN), 1590 (-phenyl). The FTIR spectra of a molecule-based polymer P1 is shown in FIG. 17 and the $^1$H NMR spectra of a molecule-based polymer P1 in $CDCl_3$ is shown in FIG. 18. The GPC measurement that P1 has an $M_n$ of 38,720, an $M_w$ of 53,670, and polydispersity ($M_w/M_n$) of 1.38 is shown in FIG. 19.

Figure 20:
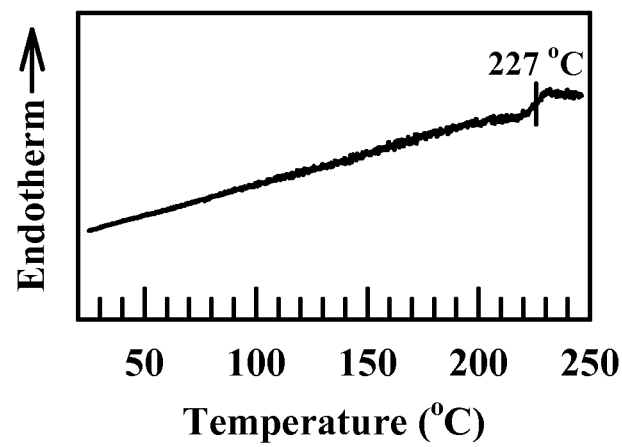
FIG. 20 describes the differential scanning calorimetric (DSC) thermogram of a molecule-based polymer P1 at a heating rate of 10° C./min.
Figure 21:
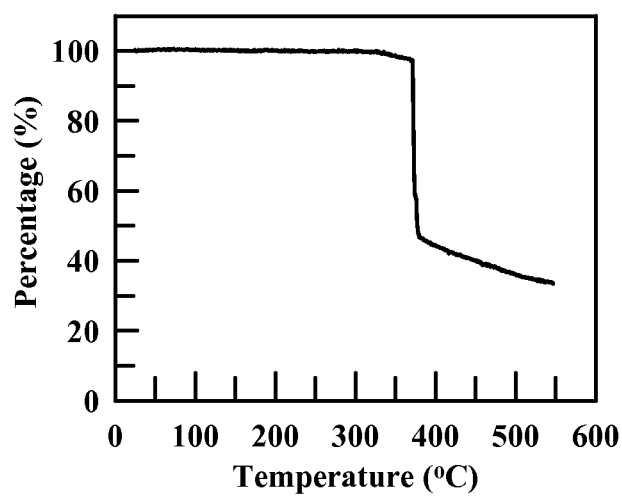
FIG. 21 describes the thermogravimetric analysis (TGA) trace of a molecule-based polymer P1 at a heating rate of 10° C./min.

Due to its rigid conjugated structure and the strong electron donor-acceptor interactions (both intermolecular and intramolecular), P1 has a glass transition temperature ($T_g$) at a very high temperature of 227° C. as shown in FIG. 20. The thermal degradation temperature was determined to be above 350° C. as observed from thermogravimetric analysis (TGA) data as shown in FIG. 21. The TGA data given in FIG. 21 indicates that thermal degradation would occur at temperatures above 350° C.

Figure 22:
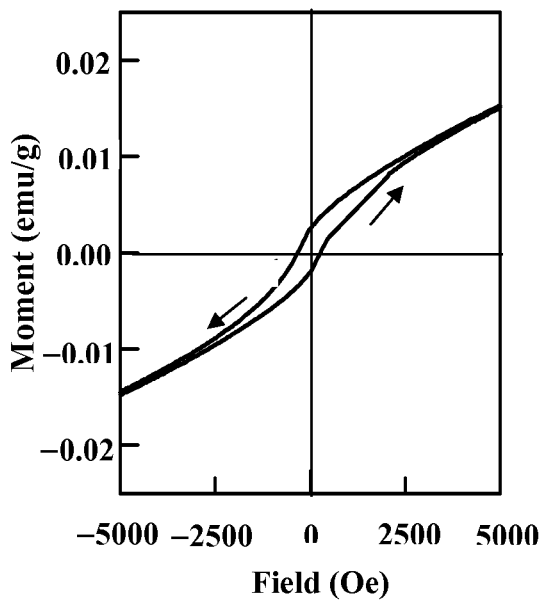
FIG. 22 describes the magnetic behavior of a molecule-based polymer P1: plot of magnetization versus magnetic field at 200 K.
Figure 23:
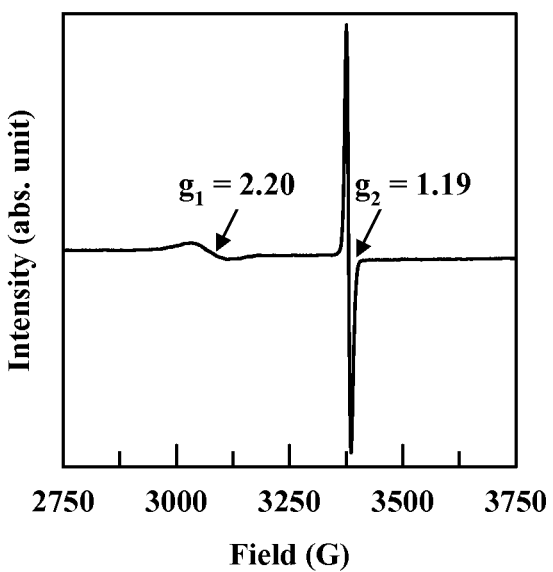
FIG. 23 describes the ESR spectra of a molecule-based polymer P1 at 300 K.

The molecule-based polymer P1 exhibits a ferromagnetic behavior as determined from magnetometry experiment shown in FIG. 22, and also from ESR experiment as shown in FIG. 23. Further it has been found that the molecule-based polymer P1 does not contain any trace of foreign material (e.g., iron oxide) as determined from X-ray diffraction (XRD) experiment shown in FIG. 24*a*. For comparison, XRD patterns of iron oxide are shown in FIG. 24*b* exhibiting several X-ray intensity peaks characteristic of typical iron oxide.

Figure 25:
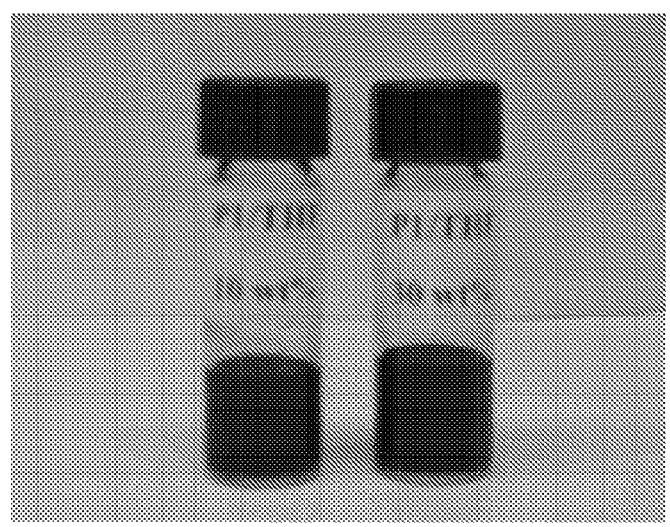
FIG. 25 describes photographs of homogeneous solutions prepared from a molecule-based magnetic polymer P1 in tetrahydrofuran at 10 wt % and 30 wt %.

It has been found that the molecule-based polymer P1 is soluble in common solvents such as tetrahydrofuran, N,N-dimethylformamide, chloroform, and dichloromethane. Photographs of the solutions of molecule-based polymer P1 are shown in FIG. 25, demonstrating that indeed an intrinsically homogeneous magnetic fluid (i.e., liquid magnet) has been prepared from the molecule-based magnetic polymer P1.

Synthesis of TCNQ-Based Magnetic Polymers

The Knoevenagel reaction is a modified version of the Aldol reaction, where aldehydes perform condensation having compounds with the structure Z—CH$_2$—Z', here Z and/or Z' are electron withdrawing groups, such as CHO, COR, COOH, COOR, CN, NO$_2$, SOR, and SO$_2$R. The Knoevenagel reaction has become a suitable approach to synthesize high molecular weight conjugated polymers. Since 7,7,8,8-tetracyanoquinodimethane (TCNQ) is a very strong electron withdrawing group, modification of TCNQ with —CH$_2$CN would make this monomer fairly ready for reacting with a electron donating monomer with aldehyde groups. Therefore, weak base like piperidine can be employed as a catalyst, which may not influence the stability of tetracyano group. Also, because the reactivity of polymerization is high, low temperature polymerization may become possible.

Synthesis of TCNQ-Based Electron Accepting Monomers

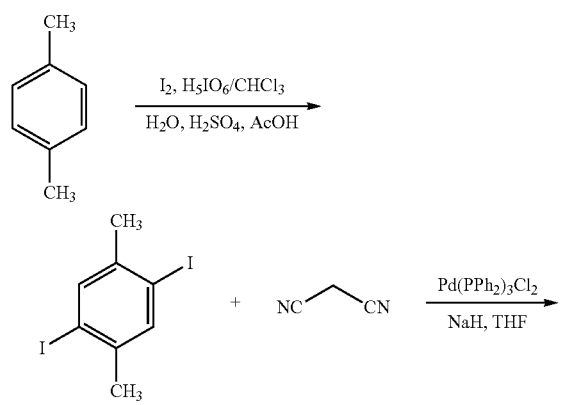

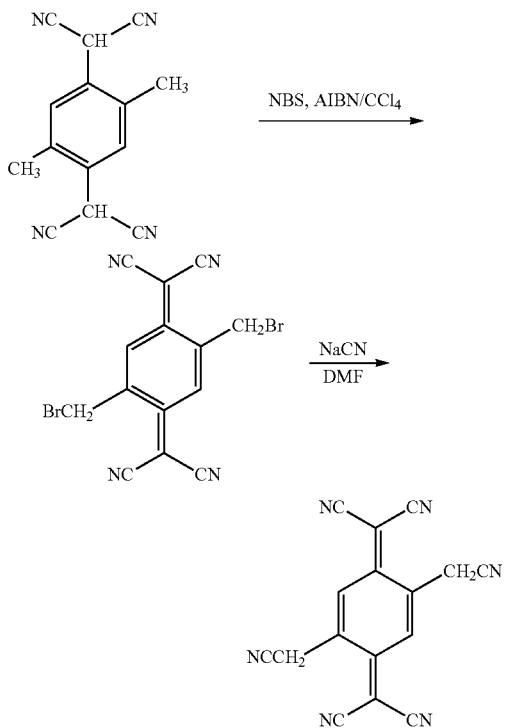

Synthesis of Electron Donating Metallocene or Bimetallocene Monomers

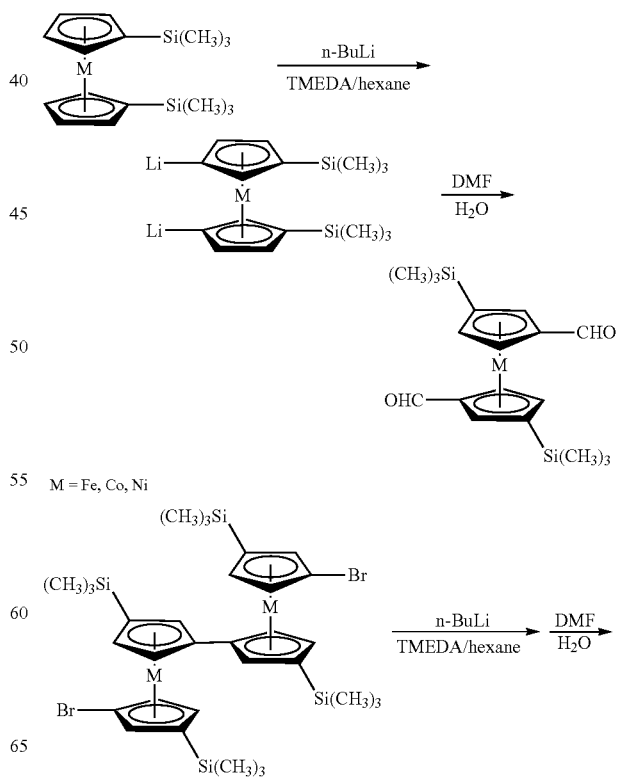

-continued

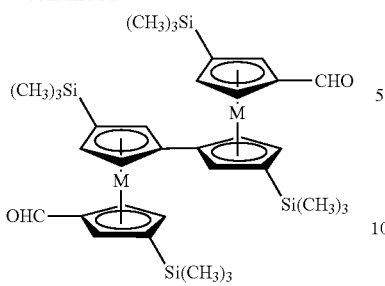

M = Fe, Co, Ni

The bimetallocene monomers with aldehyde groups would stabilize the molecule, because the distance between two aldehyde functional groups has been largely increased.

Polymerization of TCNQ-Based Magnetic Polymers

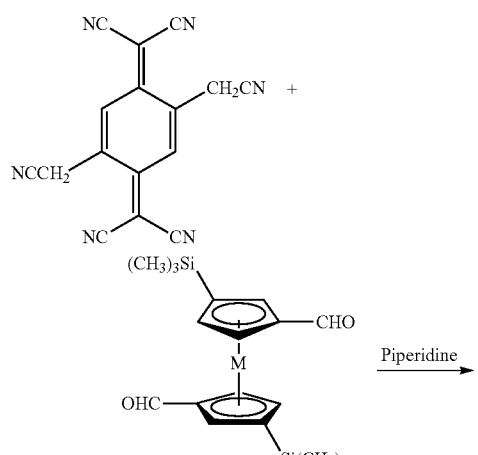

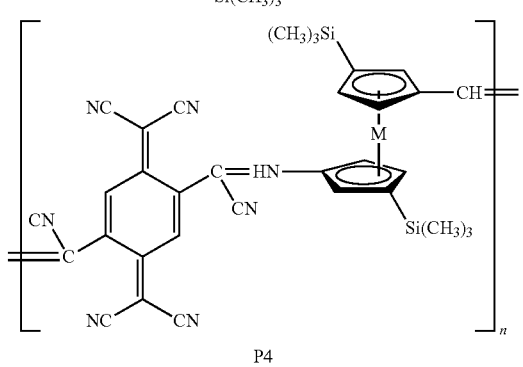

P4

M = Fe, Co, Ni

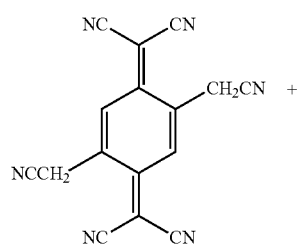

-continued

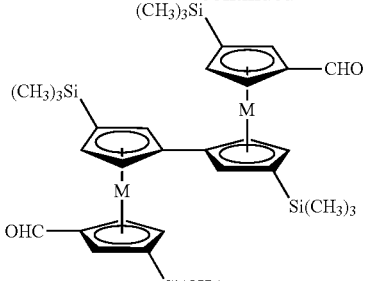

P5

M = Fe, Co, Ni

Synthesis of TCNE-Based Magnetic Polymers

1. Tetracyanoethylene (TCNE) as a strong electron donating molecule undergoes numerous reactions and exists in structural motifs of a variety of organic or inorganic compounds. Of particular interests, TCNE was reported to react with electron-rich acetylenes to afford TCNE derivatives, which were considered to be formed by a ring-opening reaction of initially produced [2+2] cycloadducts. Such reaction mechanism paves a new way to synthesize TCNE-based electron donating monomers having phosphine groups, which would in turn react with metallocene monomers to give molecule-based magnetic polymers.

Synthesis of TCNE-Based Electron Donating Monomers

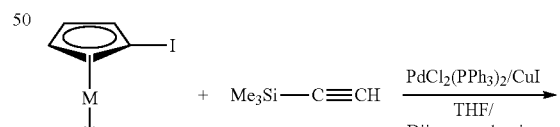

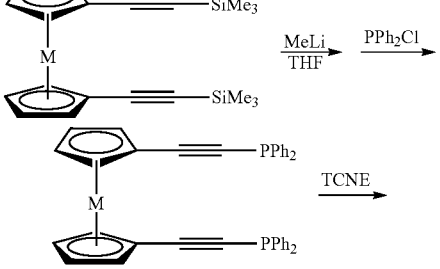

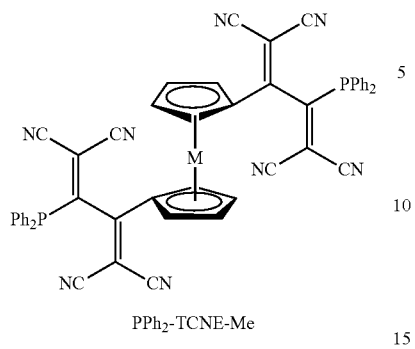

PPh₂-TCNE-Me

M = Fe, Co, Ni

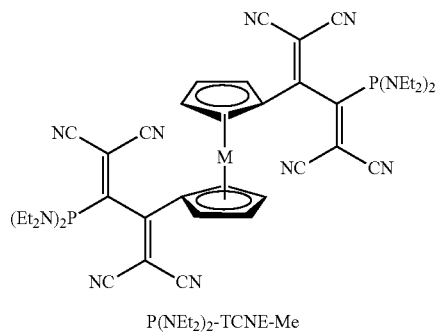

P(NEt₂)₂-TCNE-Me

M = Fe, Co, Ni

Both PPh₂-TCNE-Mc and P(NEt₂)₂-TCNE-Mc possess a metallocene center, which directly connects with two TCNE units and facilitates the strong intramolecular interactions between electron donating and electron accepting constituents. The diethylamino groups in P(NEt₂)₂-TCNE-Mc may make its reaction with TCNE much easier. The flexible side chains would reduce the steric hindrance. Due to its easy formation of mixed-valence Fe(II)—Fe(III) species and charge transfer complex, bimetallocenes were also synthesized according to the following reaction schemes:

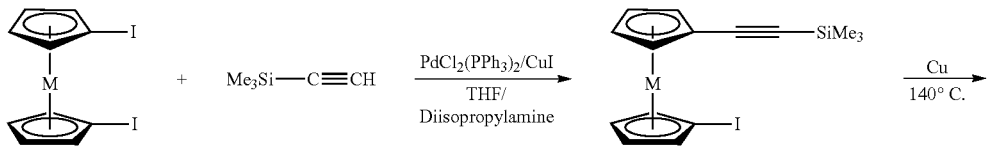

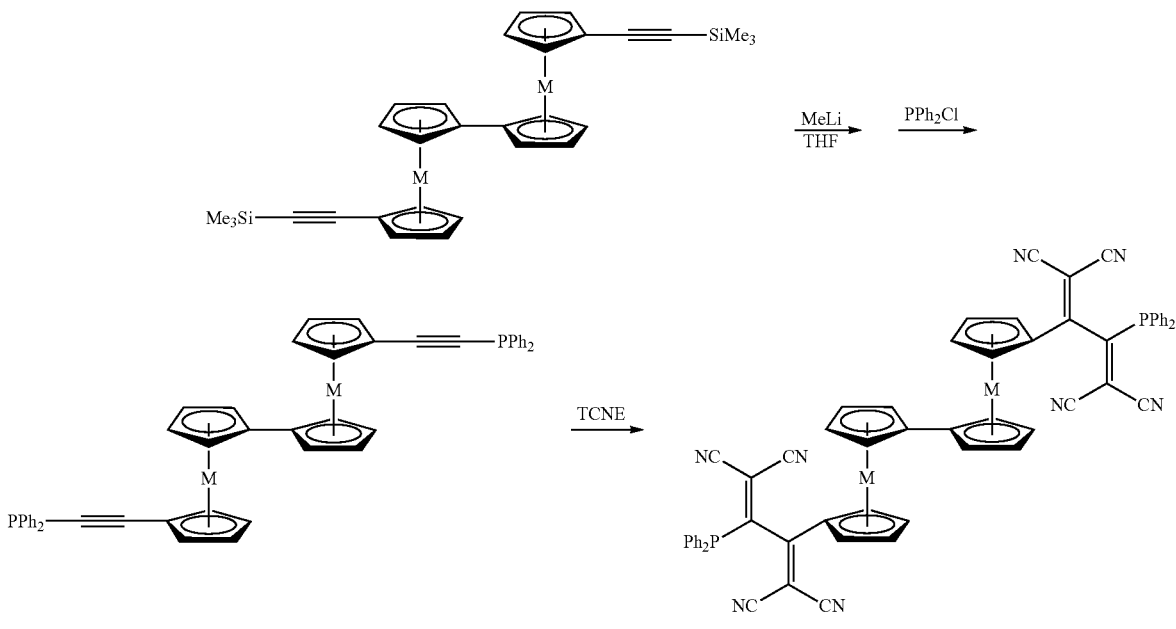

PPh₂-TCNE-BiMc

M = Fe, Co, Ni

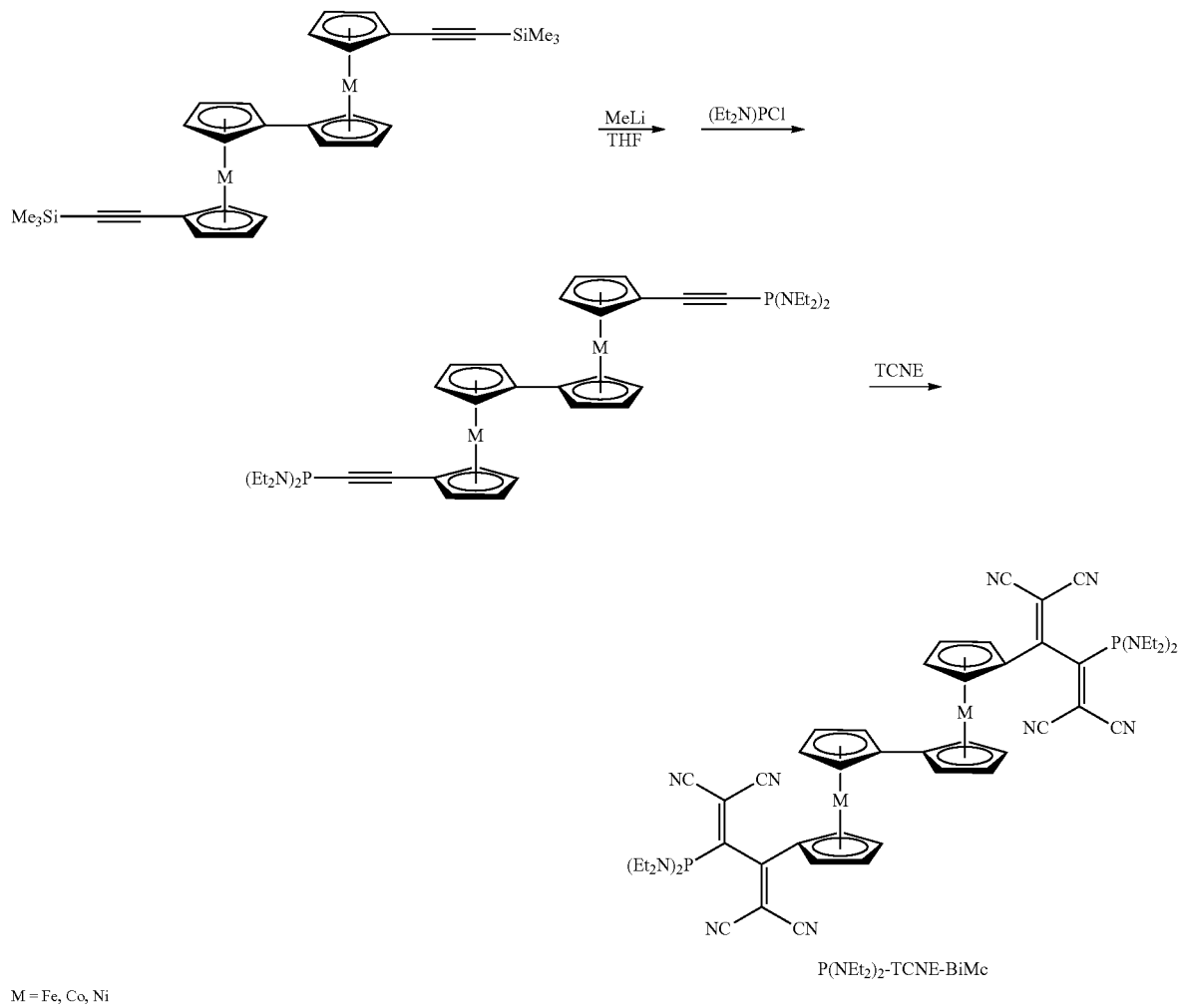

M = Fe, Co, Ni

Synthesis of Electron Donating Bimetallocene Monomers 1,1'-diazidoferrocene is unstable above 50° C., and rather sensitive to light under ambient conditions. Therefore, a more stable diazido-monomer based on bimetallocene was synthesized, because the number of carbon is largely greater than that of nitrogen and the distance between two azido-groups has been dramatically enlarged.

-continued

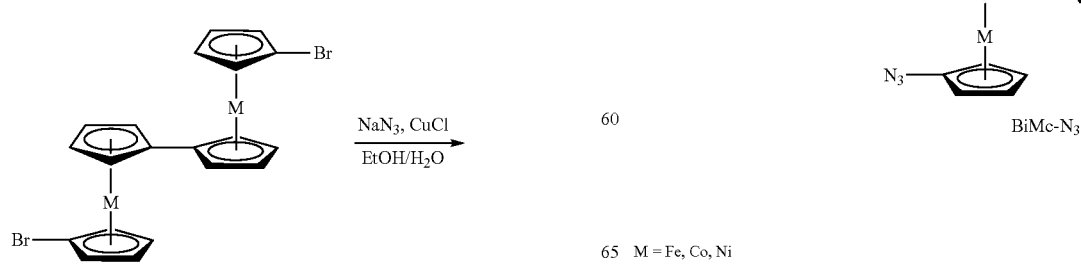

M = Fe, Co, Ni

Polymerization of TCNE-Based Magnetic Polymers
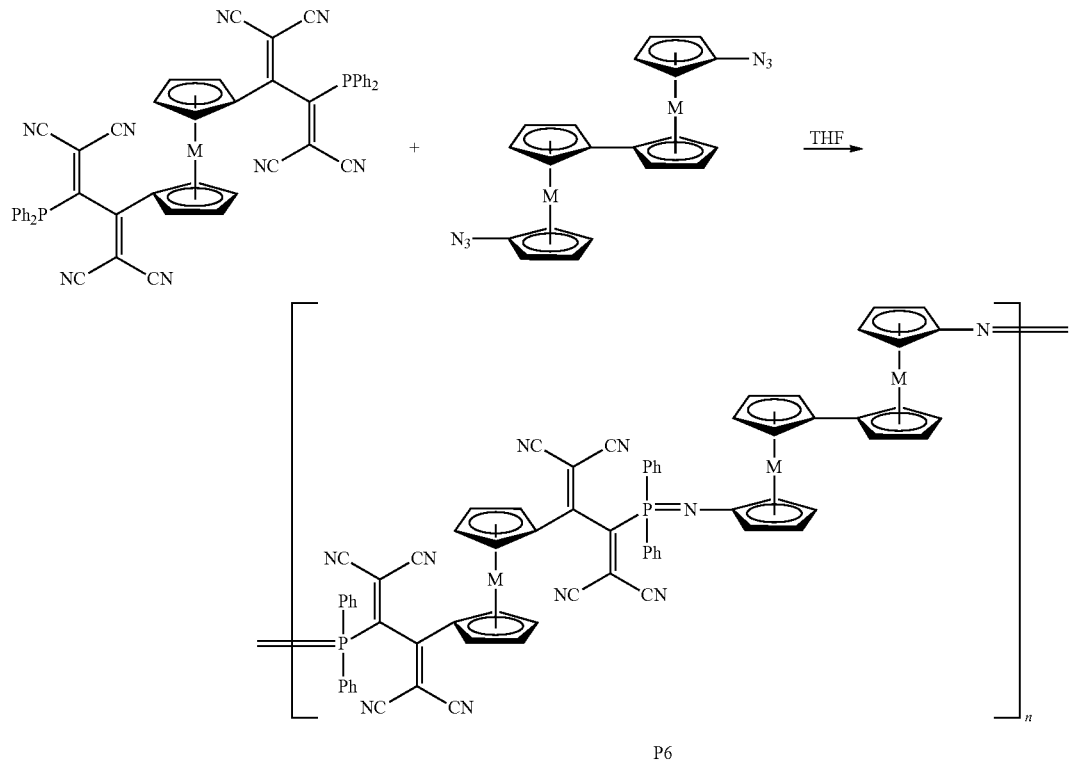
P6
M = Fe, Co, Ni
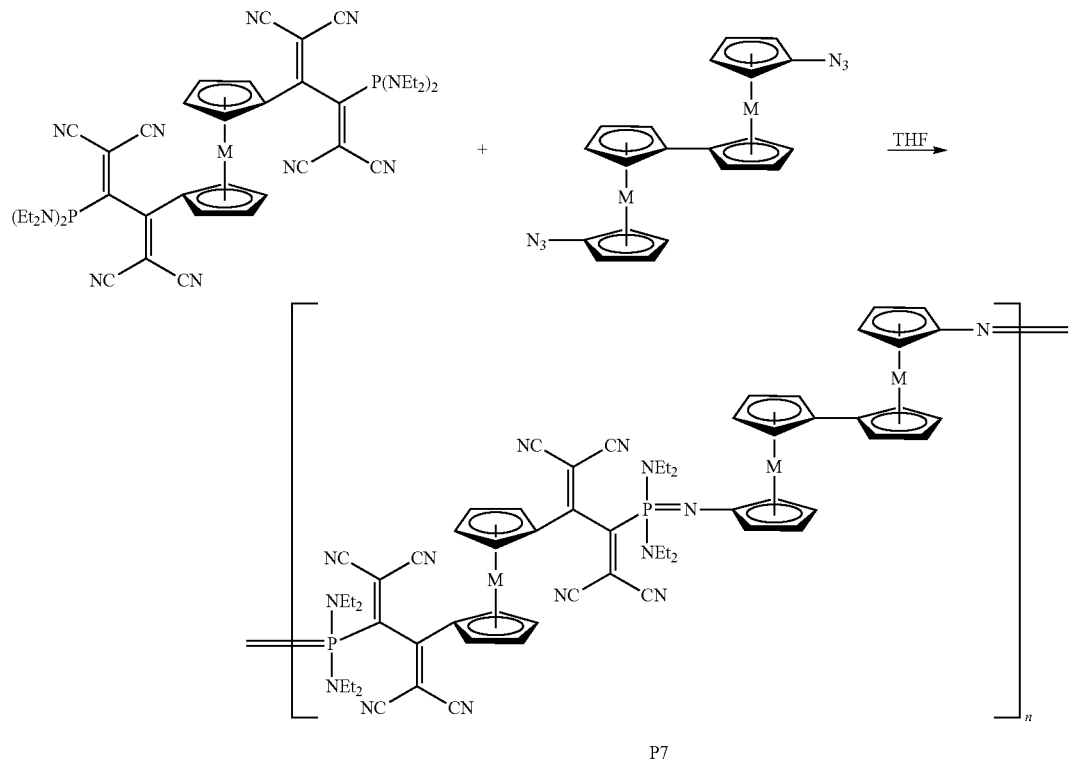
P7
M = Fe, Co, Ni -continued
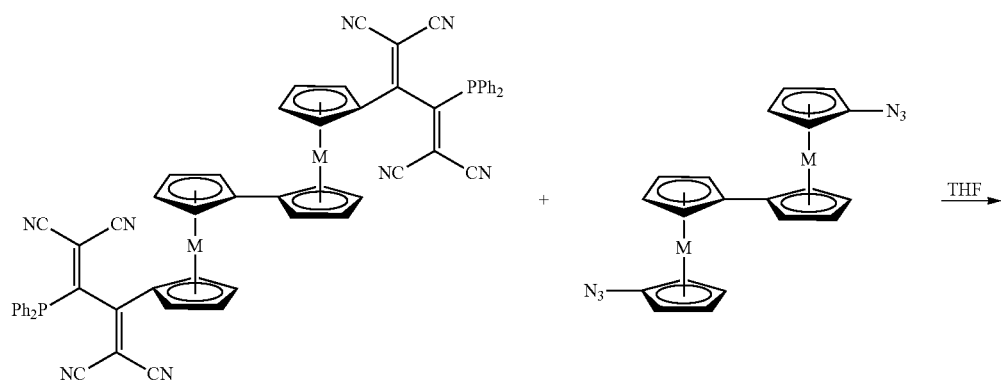
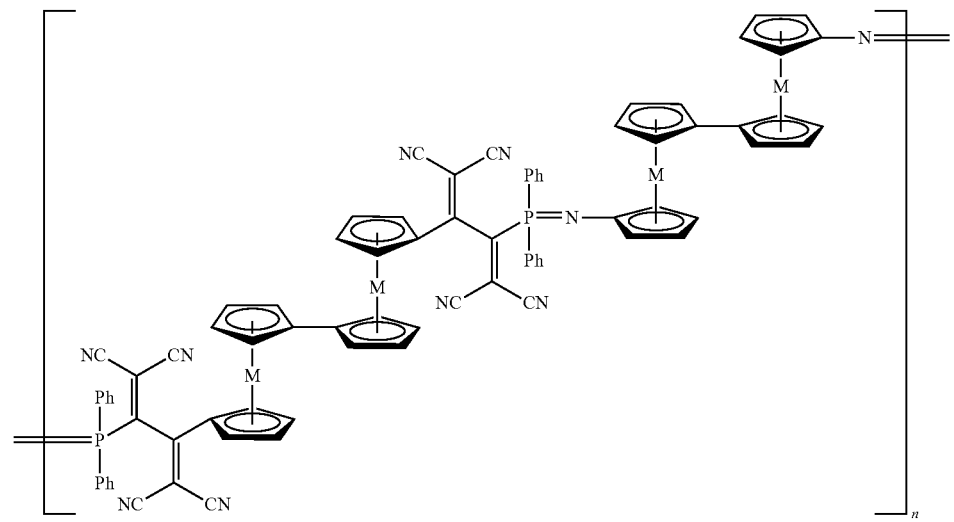
P8
M = Fe, Co, Ni
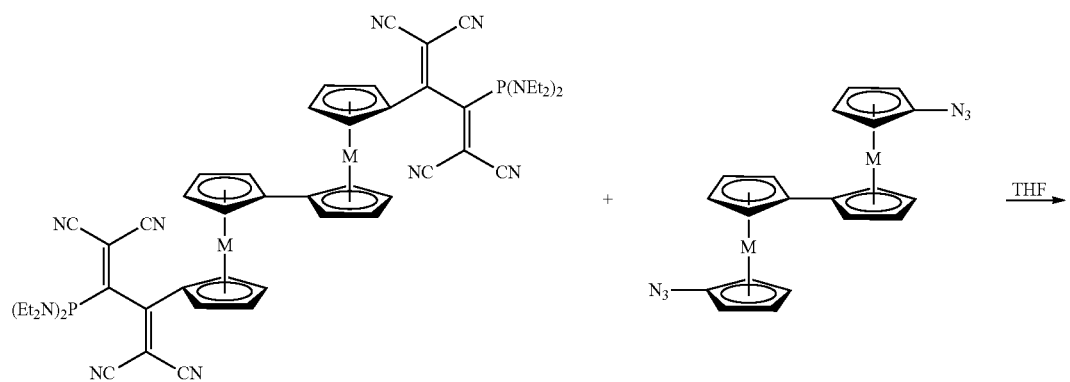

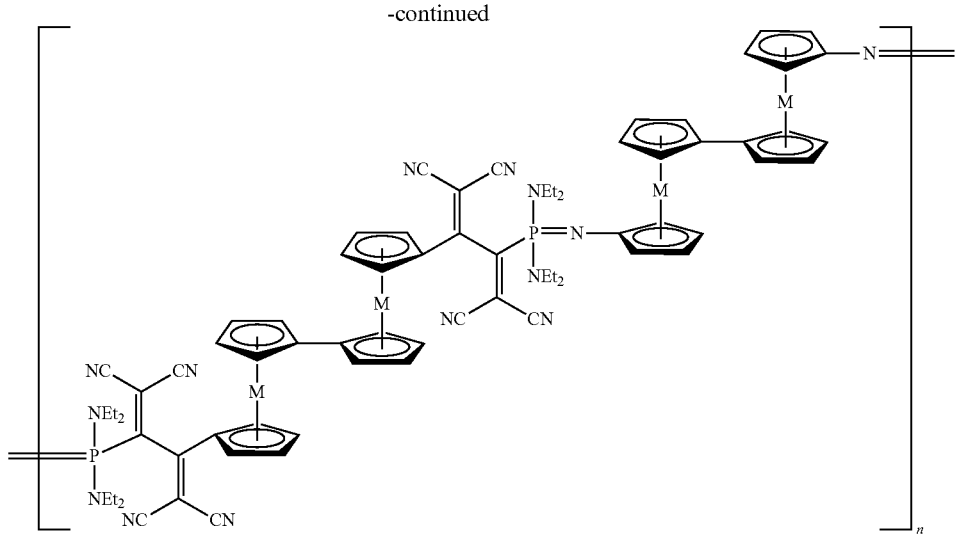

P9

M = Fe, Co, Ni

Synthesis of TCNE-Based Magnetic Polymers via Post-Polymerization Reaction

Considering the high reactivity of TCNE with ethynly group in the presence of strong electron donating groups such as amonio group, we synthesized three additional TCNE-based magnetic polymers by incorporating TCNE units either in the main chain or in the side chain. Specifically, we first synthesized metallocene-containing conjugated polymers having ethynyl groups and amino groups through carbon-carbon coupling reactions using different metal-ion containing catalyst systems. After that, these conjugated polymers performed further reaction with TCNE to afford the respective magnetic polymers.

(a) Main-Chain TCNE-Based Bimetallocene Magnetic Polymers

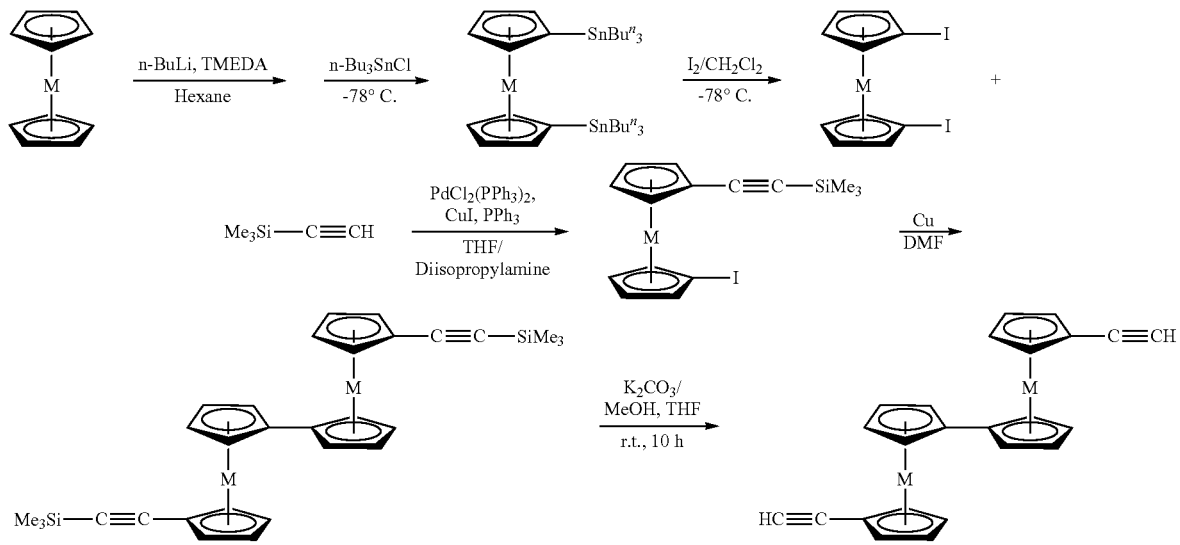

M = Fe, Co, Ni

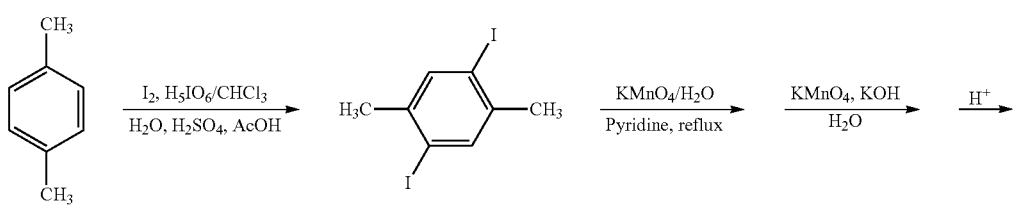

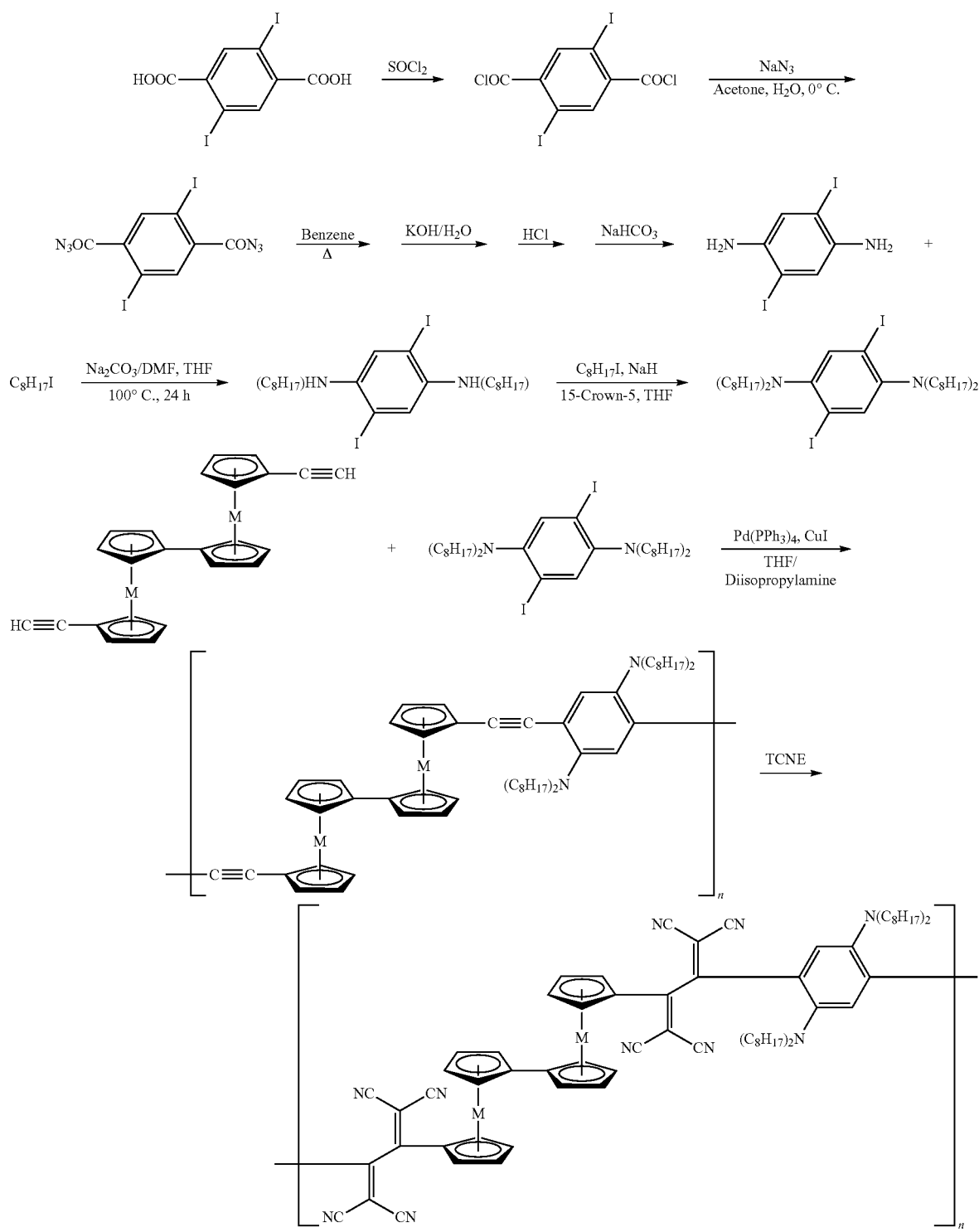
P10
M = Fe, Co, Ni
The conjugated bimetallocene polymer is obtained by the Sonogashira cross-coupling reaction or the Wittig reaction. The amino groups on the benzene ring will ensure the high reactivity of ethynyl group with TCNE, while the bimetallocene will facilitate both ethynyl groups in each repeat unit to react with TCNE.

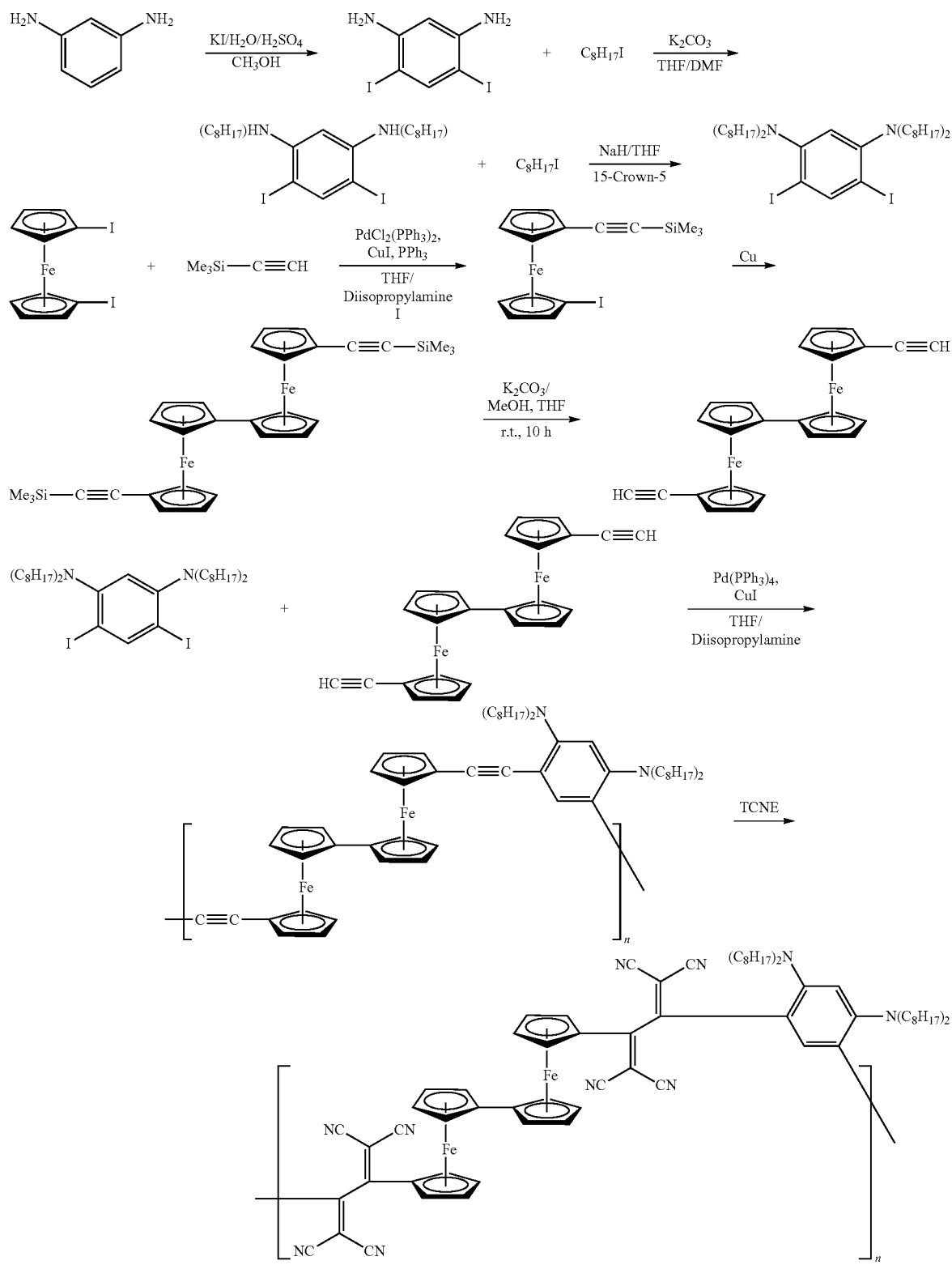

The unique feature of the polymer P11 is that the amino group lies in the para-position of the triple bond, which would give rise to a large increase in the reactivity of the triple bond with TCNE. Since P11 has amino groups in para- and ortho- positions of the triple bond in this polymer, it is quite possible that both triple bonds in each repeat unit would react with TCNE. Also, the meta-benzene unit in P11 would further improve the solubility of the polymer.

(b) Side-Chain TCNE-Based Magnetic Polymers

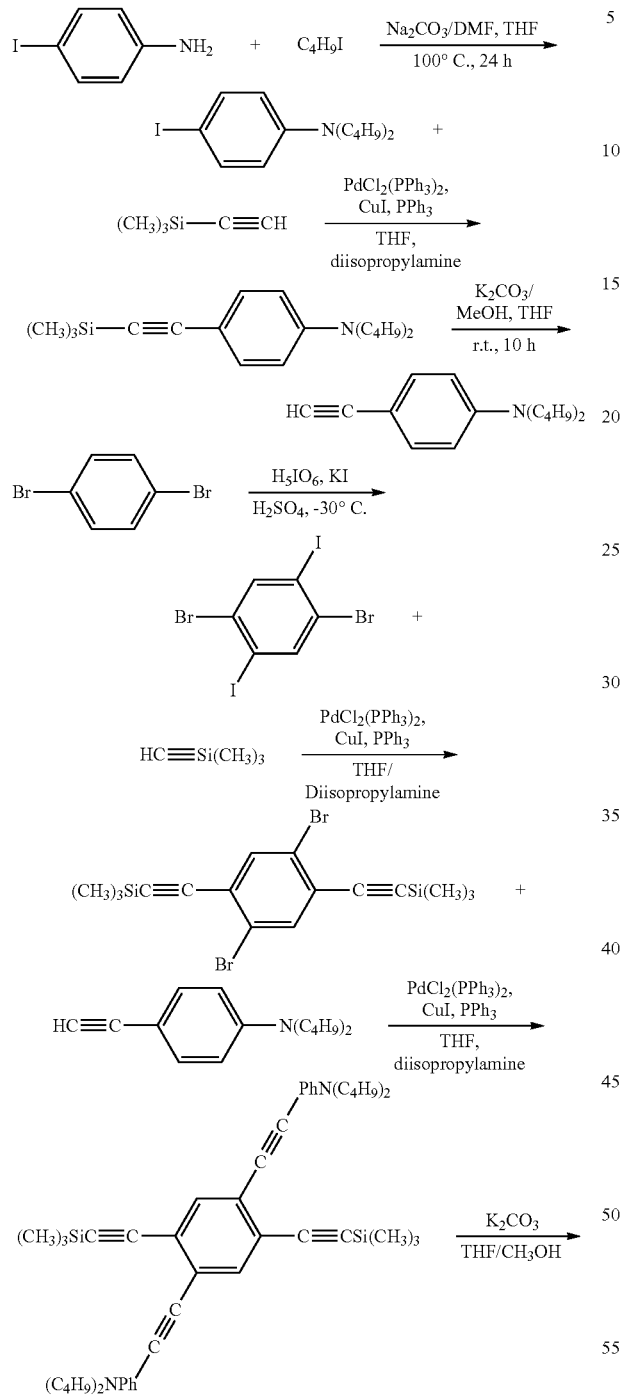

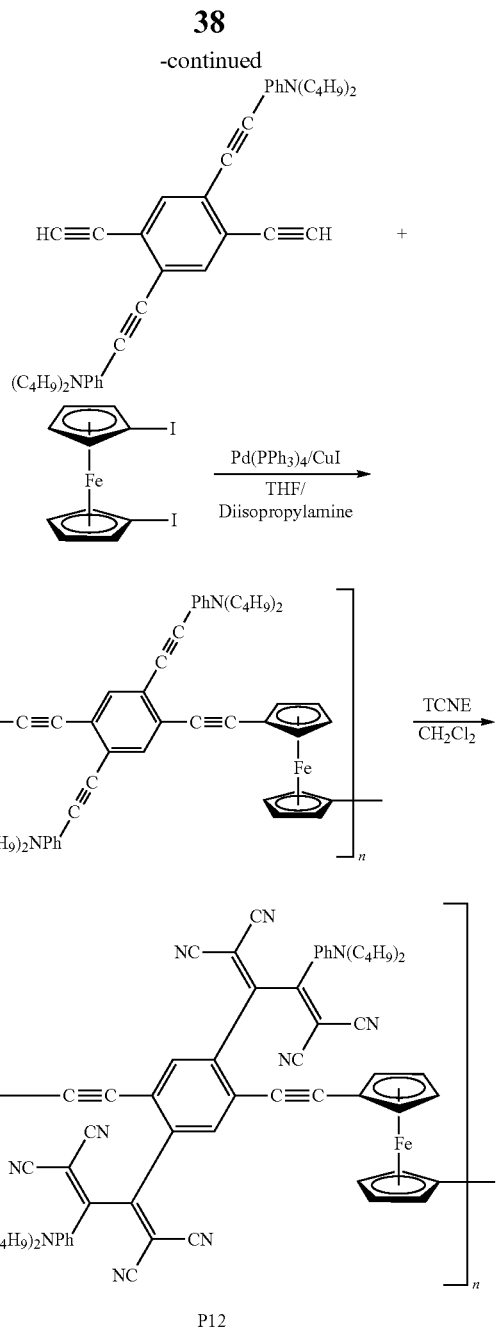

The metallocene conjugated polymer is also achieved by the Sonogashira cross-coupling reaction. In the chemical structure of this conjugated polymer, the two ethynyl groups in the side chain of each repeating unit are much easier to react with TCNE and form a very strong electron donating center, and consequently the two ethynyl groups in the main chain would become rather difficult to react with TCNE.

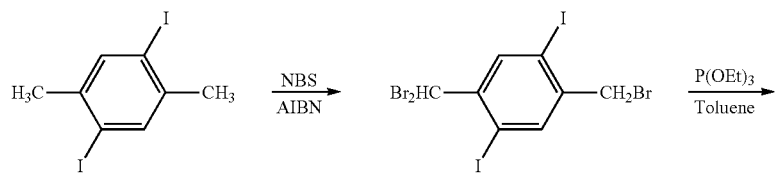

-continued
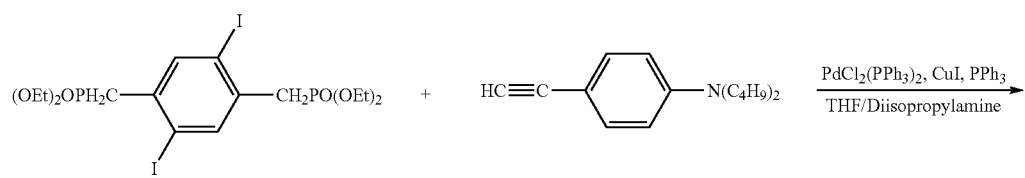
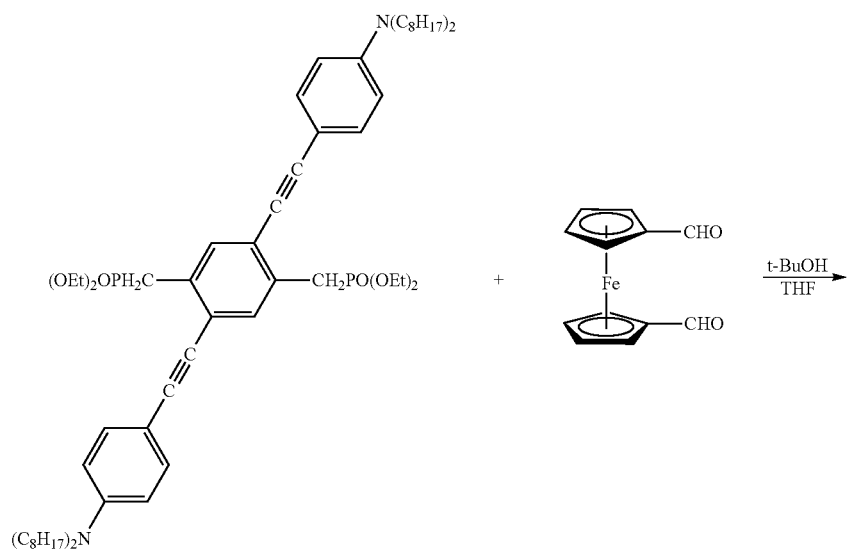
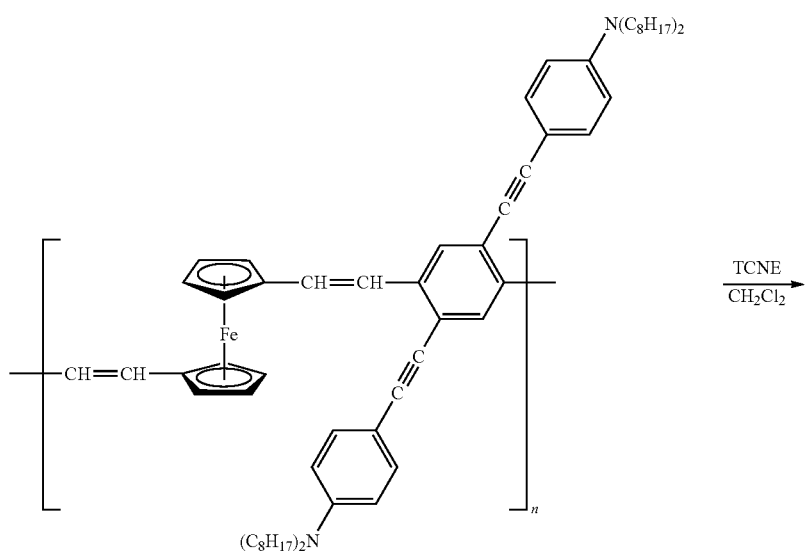

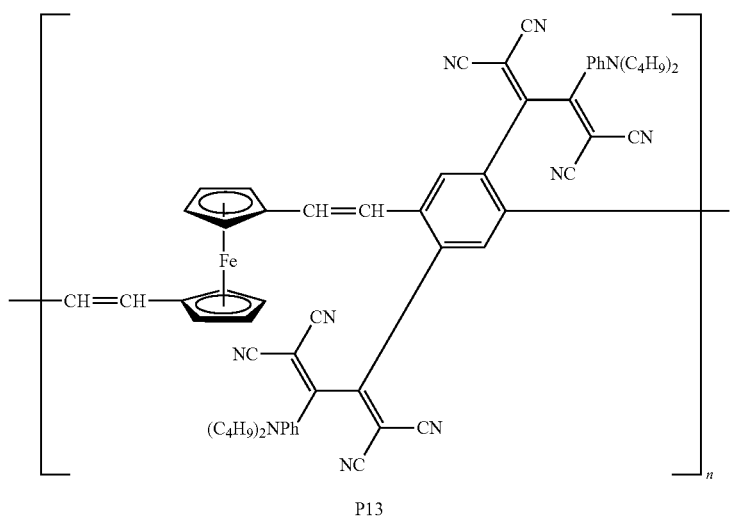

P13

Since the chemical structure of P12 is very rigid, it has only limited solubility in solvents and relatively low molecular weight. Therefore, another magnetic polymer P13 was first polymerized by the Horner-Wadsworth-Emmons olefination reaction of dialdehydes and bisphosphonates and then reacted with TCNE. The solubility of P13 would be enhanced considerably due to the use of the ethylene group, which has less rigidity than the ethynyl group, and the longer flexible side chains.

(c) Side-Chain TCNE-Based Magnetic Polymers with TCNE in the Metallocene Unit

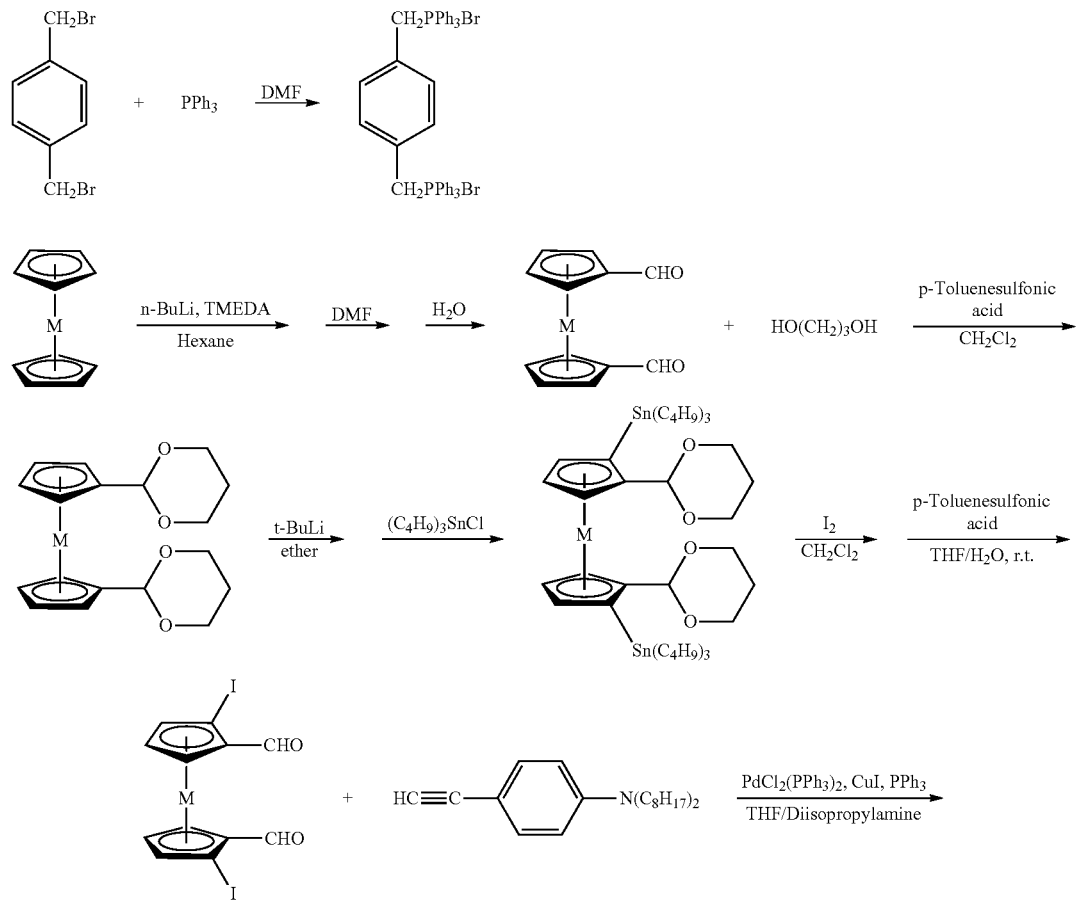

-continued

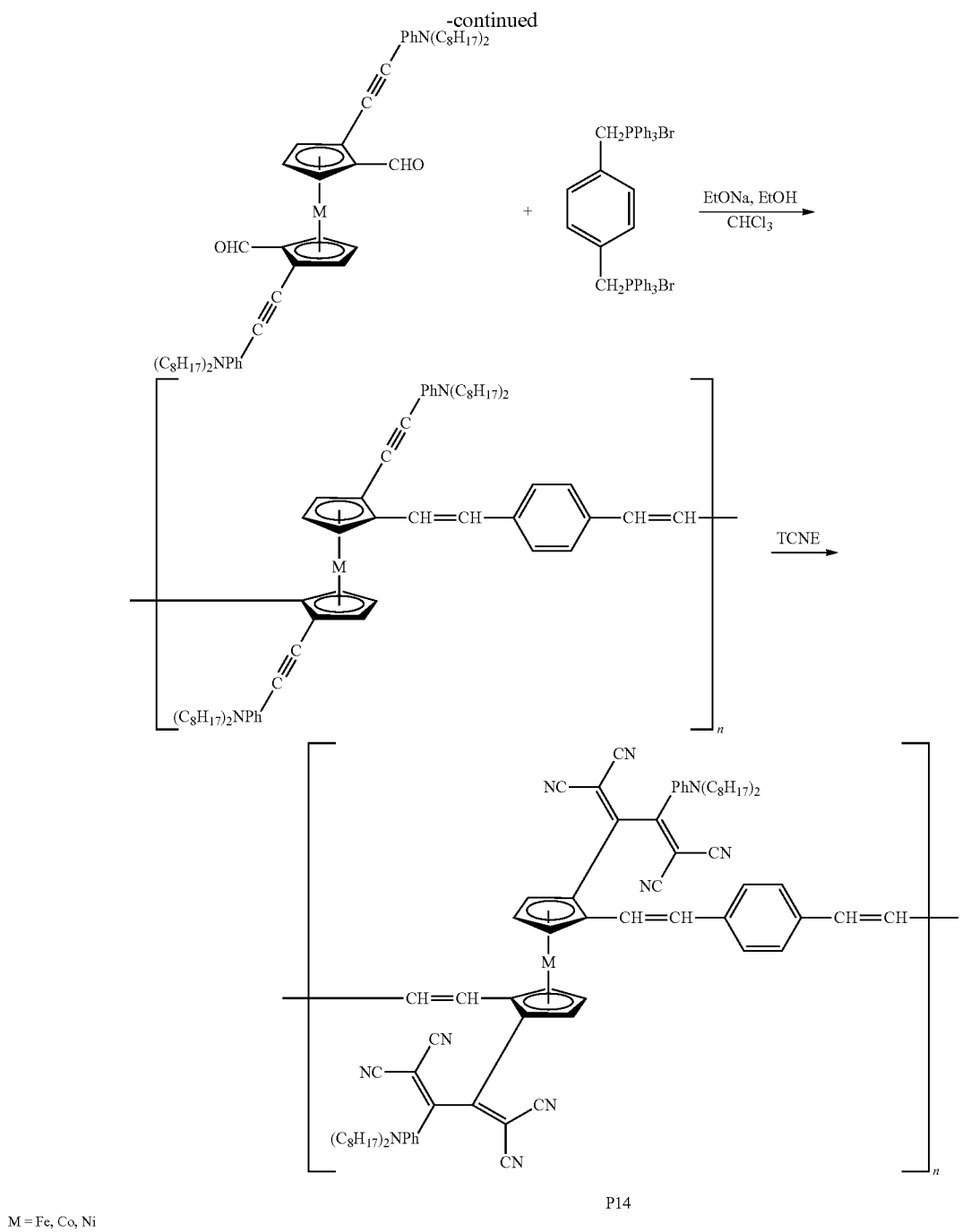

M = Fe, Co, Ni

In the chemical structure of metallocene conjugated polymer P14, which is also polymerized by the Wittig reaction, the two ethynyl groups in the side chain are directly linked to metallocene unit, and thus form the charge transfer complexes in the side chain.

The synthesis procedures for a series of molecule-based magnetic polymers are provided along with the presentation of representative properties of the synthesized magnetic polymers via electron spin resonance (ESR) spectrometry and X-ray diffraction (XRD). FIG. 23 gives an ESR spectrum of the molecule-based magnetic polymer P1. The ESR spectrum indicates the presence of spin-spin interactions between the constituent monomers that constitute the P1 magnetic polymer. As seen in FIG. 24a, XRD pattern (intensity versus two-theta (2θ) angle) for the molecule-based magnetic polymer P1 is given. The XRD pattern for P1 is clearly distinct from the XRD pattern for iron oxide as shown in FIG. 24b. In particular, the XRD pattern for P1 has no reflection peaks for the values of 2θ ranging from 30 to 70 degrees, whereas iron oxide has several reflection peaks in the same range of 2θ values. Thus we can conclude that P1 is substantially devoid of iron oxide.

Figure 24:
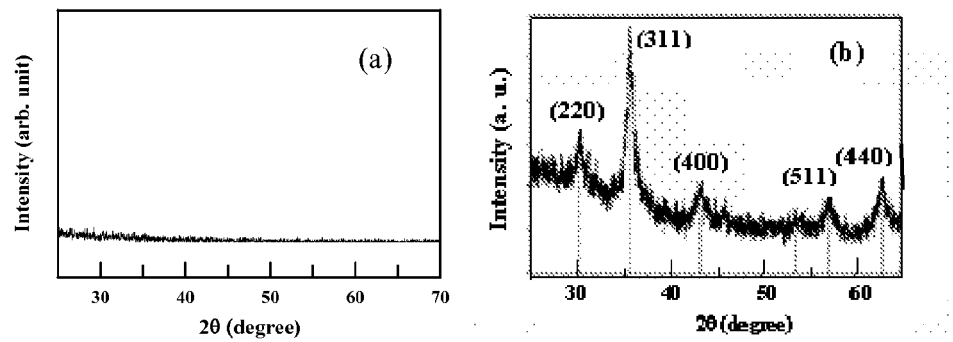
FIG. 24 describes the XRD pattern of (a) a molecule-based polymer P1 and (b) iron oxide.

As can be seen in FIGS. 23-25, the molecule-based magnetic polymer P1, for example, have the following features:

(1) it exhibits the presence of spin-spin interactions between the constituent components within the polymer (FIG. 23), (2) it is free of any magnetic metallic particles and thus is homogeneous (FIG. 24a), and (3) it is soluble in common solvents, as shown in FIG. 25, offering good processability.

In one embodiment of the invention, the magnetic fluids (liquid magnets), which can be prepared from the molecule-based magnetic polymers P1-P14 are intrinsically homogeneous. Hence, these liquid magnets can replace conventional ferrofluids or MR fluids, which are suspensions of magnetic nanoparticles, currently found in the marketplace.

Figure 26:
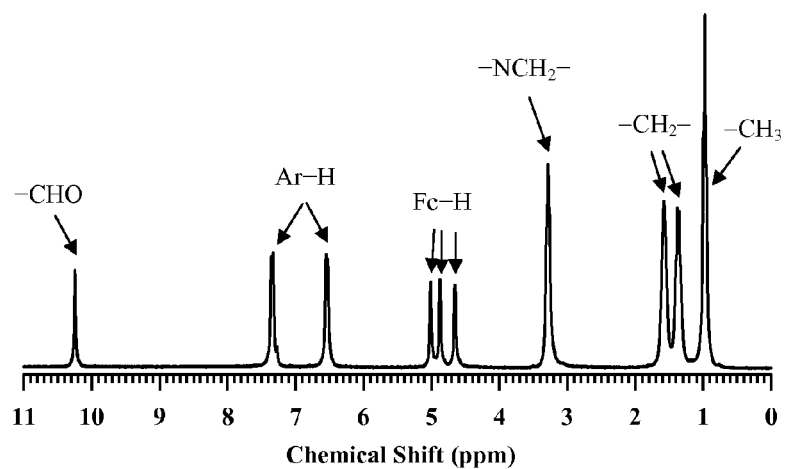
FIG. 26 describes the $^1$H nuclear magnetic resonance (NMR) spectrum of 1,1'-dialdehyde-2,2'-bis[p-(N,N-dibutylamino) phenylethynyl]ferrocene (compound 1 with m=4)
Figure 27:
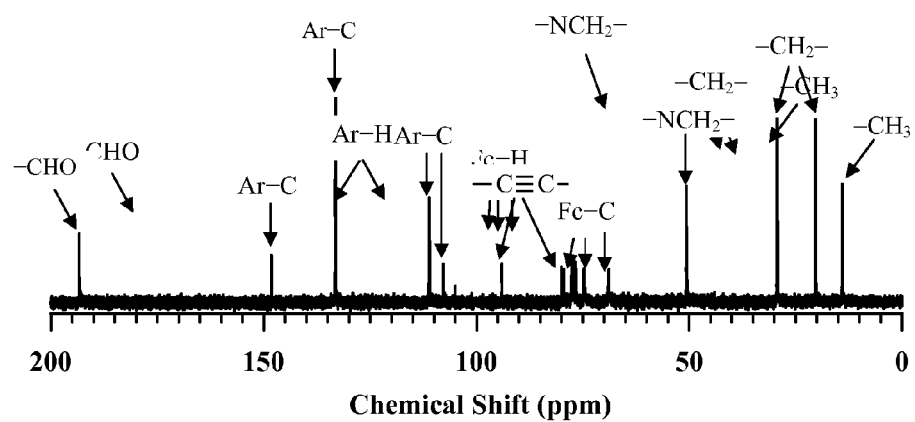
FIG. 27 describes the $^{13}$C NMR spectrum of 1,1'-dialdehyde-2,2'-bis[p-(N,N-dibutylamino) phenylethynyl]ferrocene (compound 1 with m=4)
Figure 28:
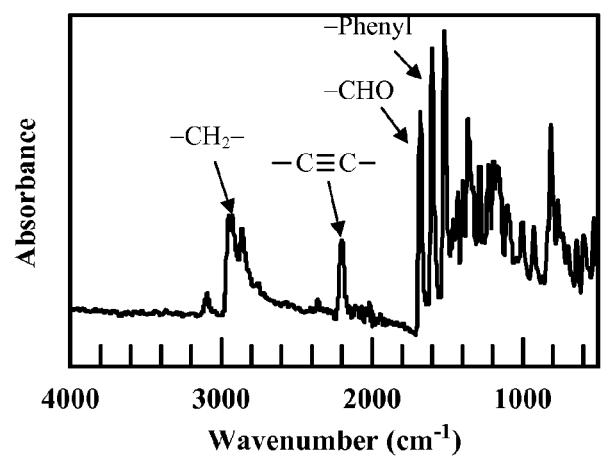
FIG. 28 describes the Fourier transform infrared spectroscopy (FTIR) spectrum of 1,1'-dialdehyde-2,2'-bis[p-(N,N-dibutylamino) phenylethynyl]ferrocene (compound 1 with m=4)

In another example, synthesis of a molecule-based magnetic polymer was performed via the aza-Wittig reaction followed by adduction to with TCNE. A metallocene conjugated type polymer 3 is achieved by the aza-Wittig reaction following the synthesis scheme shown below. In the synthesis scheme an electron-donating compound 1 having aldehyde groups is first synthesized. Characteristics of compound 1 are shown in FIGS. 26-28. FIG. 26 describes the $^1$H nuclear magnetic resonance (NMR) spectrum of 1,1'-dialdehyde-2,2'-bis[p-(N,N-dibutylamino) phenylethynyl]ferrocene (compound 1 with m=4). In FIG. 27, there is shown the $^{13}$C NMR spectrum of 1,1'-dialdehyde-2,2'-bis[p-(N,N-dibutylamino) phenylethynyl]ferrocene (compound 1 with m=4). In FIG. 28, the Fourier transform infrared spectroscopy (FTIR) spectrum of 1,1'-dialdehyde-2,2'-bis[p-(N,N-dibutylamino) phenylethynyl]ferrocene (compound 1 with m=4) is shown.

Figure 29:
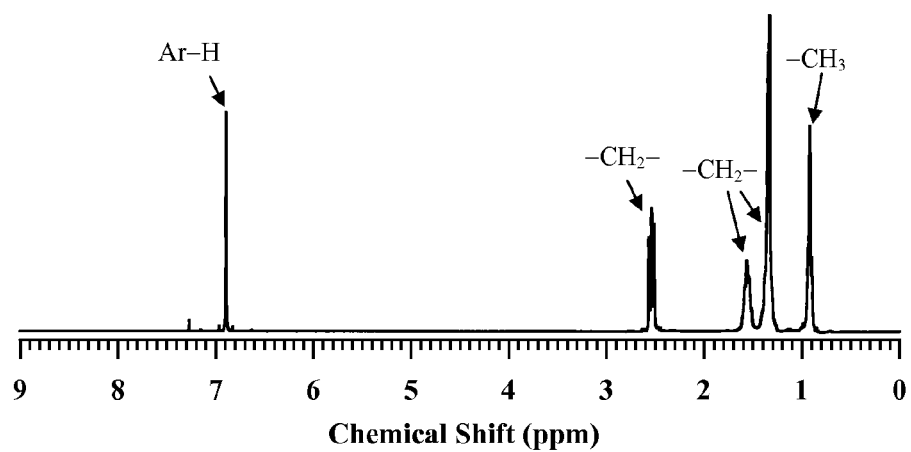
FIG. 29 describes the $^1$H NMR spectrum of 2,5-bis(hexyl) terephthazide (compound 2 with n=6).
Figure 30:
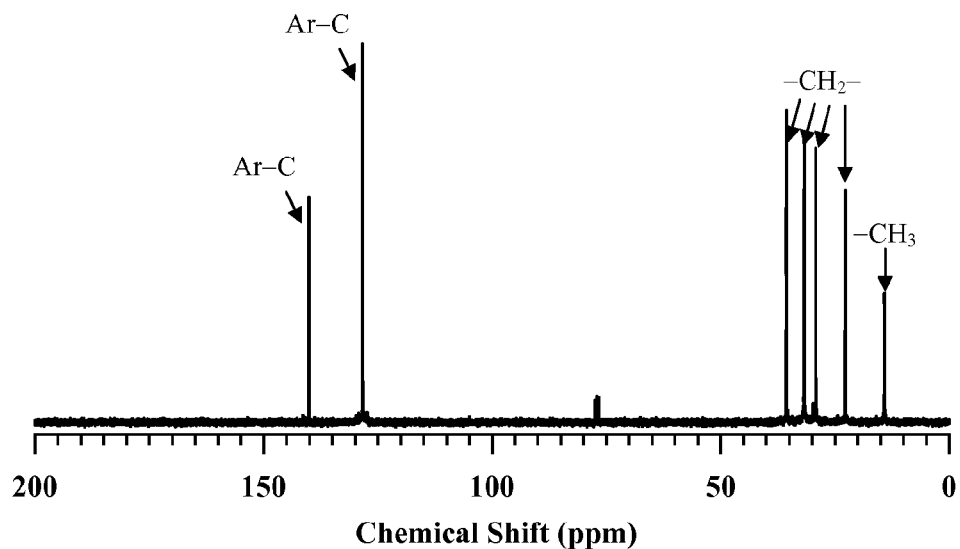
FIG. 30 describes the $^{13}$C NMR spectrum of 2,5-bis(hexyl) terephthazide (compound 2 with n=6).
Figure 31:
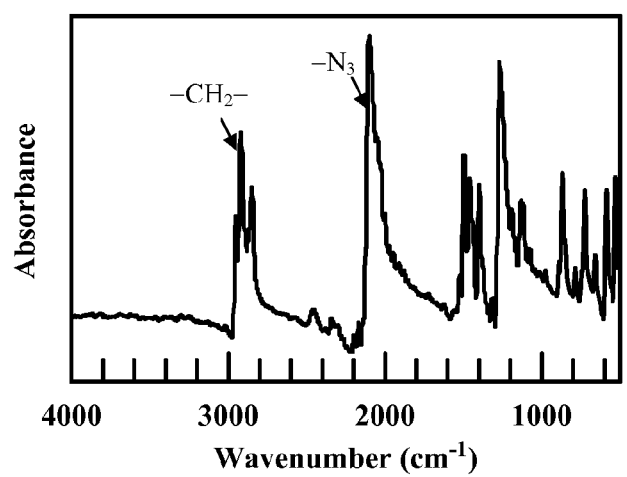
FIG. 31 describes the FTIR spectrum of 2,5-bis(hexyl) terephthazide (compound 2 with n=6).
Figure 32:
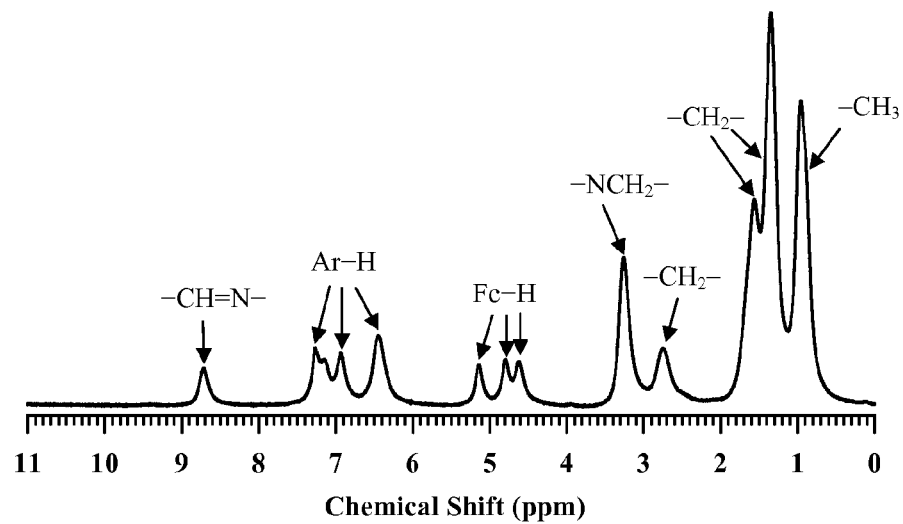
FIG. 32 describes the $^1$H NMR spectrum of 3.
Figure 33:
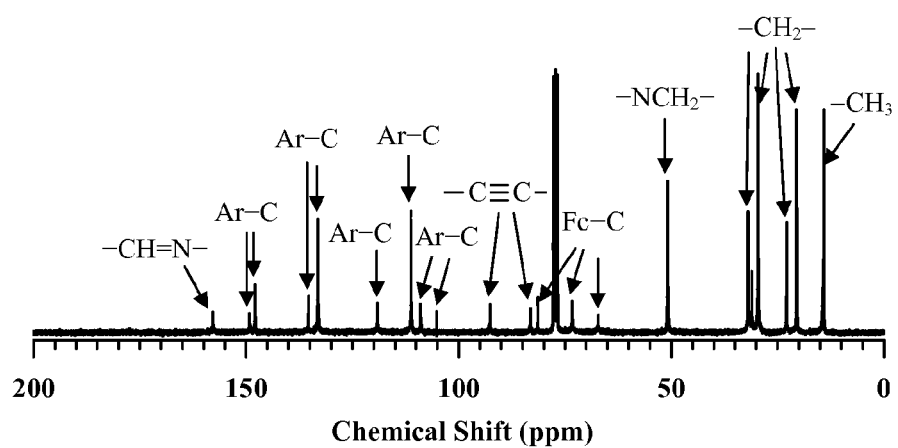
FIG. 33 describes the $^{13}$C NMR spectrum of 3.
Figure 34:
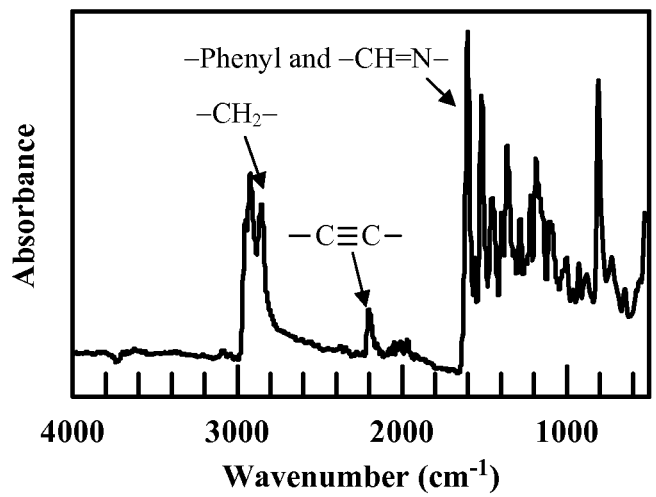
FIG. 34 describes the FTIR spectrum of 3.
Figure 35:
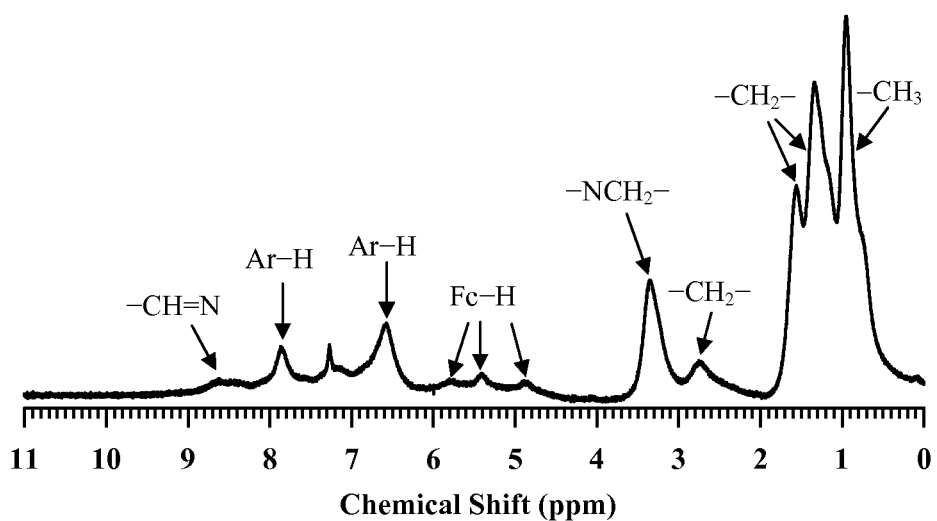
FIG. 35 describes the $^1$H NMR spectrum of 4.
Figure 36:
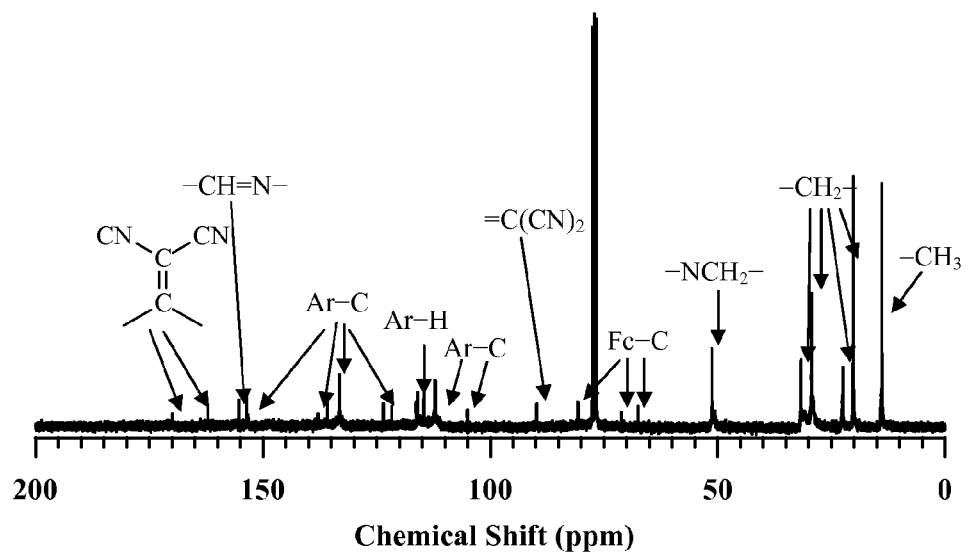
FIG. 36 describes the $^{13}$C NMR spectrum of molecule-based magnetic polymer 4.
Figure 37:
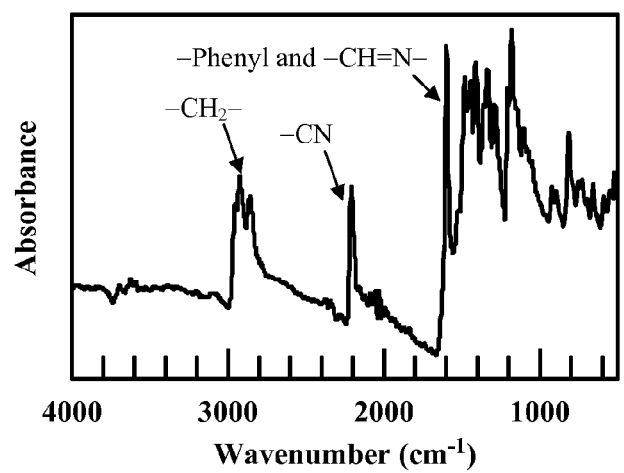
FIG. 37 describes the FTIR spectrum of molecule-based magnetic polymer 4.
Figure 38:
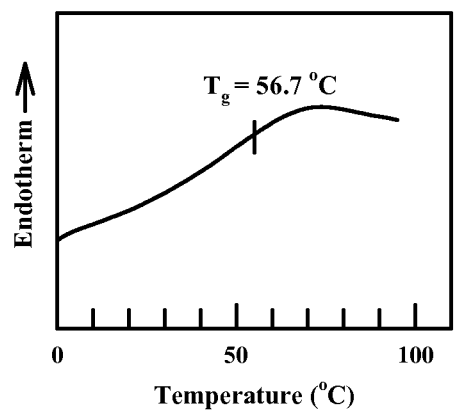
FIG. 38 describes the differential scanning calorimetric (DSC) thermogram of molecule-based magnetic polymer 4 at a heating rate of 10° C./min.
Figure 39:
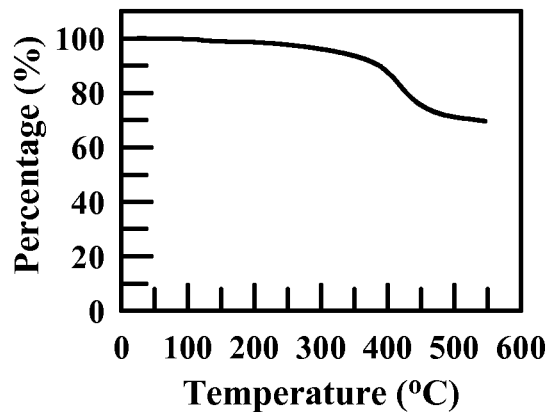
FIG. 39 describes the thermogravimetric analysis (TGA) trace of a molecule-based polymer 4 at a heating rate of 10° C./min.
Figure 40:
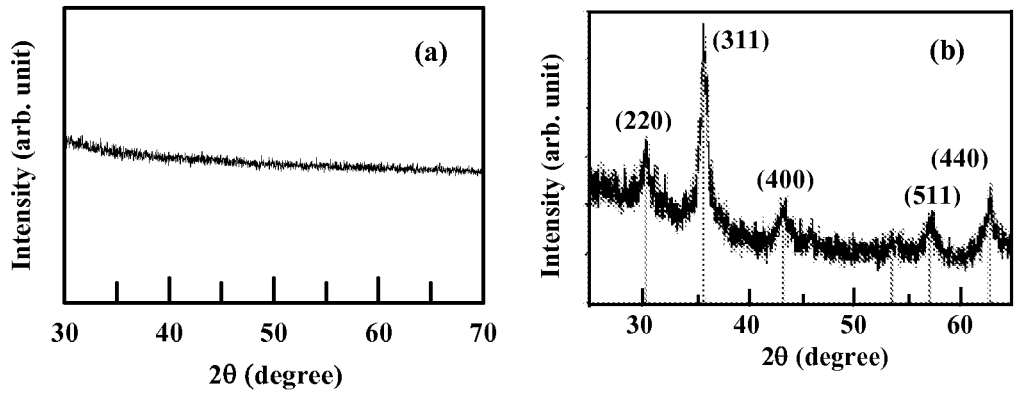
FIG. 40 describes the X-ray diffraction (XRD) pattern of (a) a molecule-based magnetic polymer 4 and (b) iron oxide.
Figure 41:
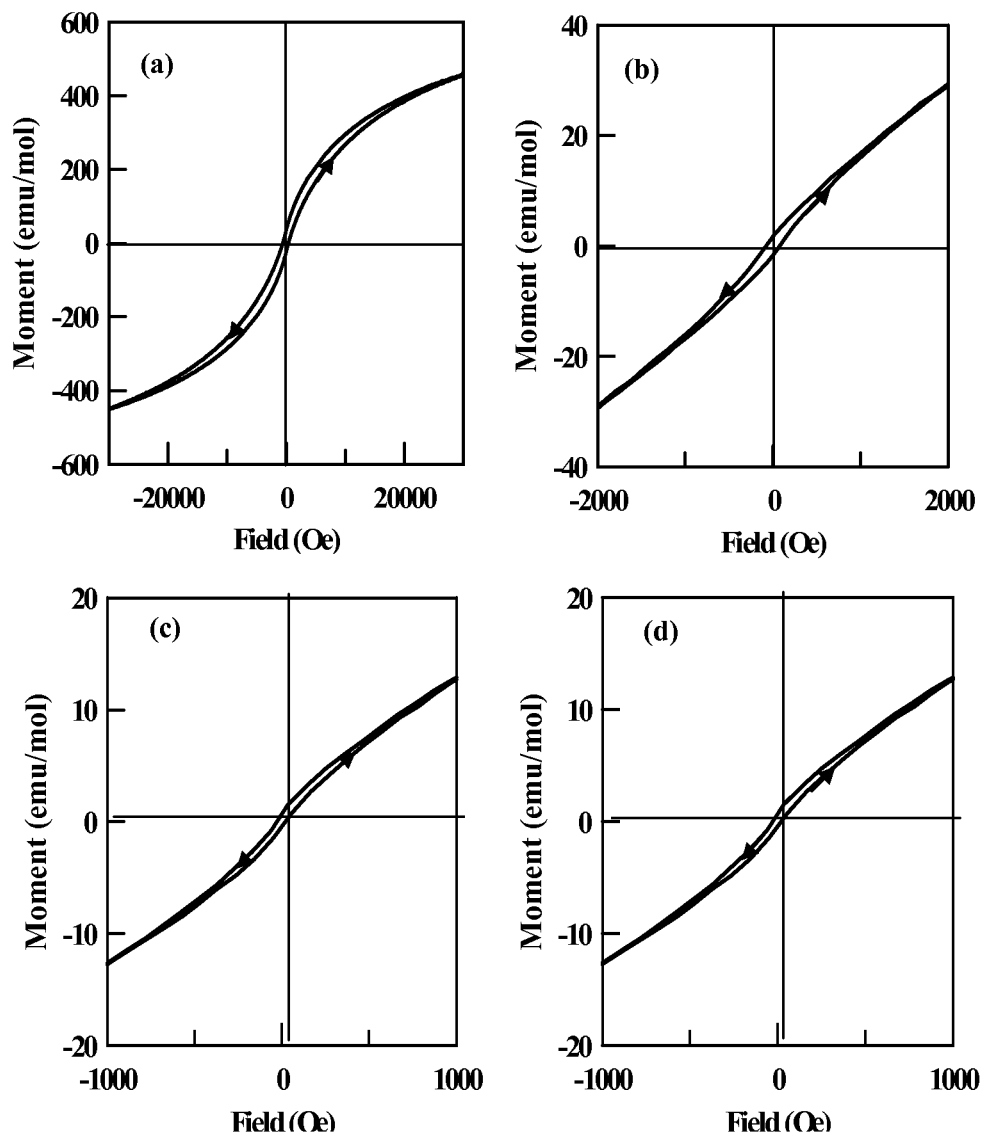
FIG. 41 describes the magnetic behavior of a molecule-based magnetic polymer 4: plots of magnetization (M) versus magnetic field (H) at various temperatures: (a) 2 K, (b) 20 K, (c) 30 K, and (d) 100 K.

Then, compound 1 is reacted with the azide group in compound 2 having flexible spacers, yielding a compound 3 which is still a conjugated type electron-donating polymer. Characteristics of compound 2 are shown in FIGS. 29-31. FIG. 29 describes the $^1$H NMR spectrum of 2,5-bis(hexyl)terephthazide (compound 2 with n=6). FIG. 30 describes the $^{13}$C NMR spectrum of 2,5-bis(hexyl)terephthazide (compound 2 with n=6), and FIG. 31 describes the FTIR spectrum of 2,5-bis(hexyl)terephthazide (compound 2 with n=6). Characteristics of compound 3 are shown in FIGS. 32-34. FIG. 32 describes the $^1$H NMR spectrum of 3, while FIG. 33 describes the $^{13}$C NMR spectrum and FIG. 34 describes the FTIR spectrum of 3. When an electron-accepting TCNE is added to compound 3, a conjugated type donor-acceptor polymer 4 is formed. Characteristics of compound 4 are shown in FIGS. 35-41. FIG. 35 describes the $^1$H NMR spectrum of 4, while FIG. 36 describes the $^{13}$C NMR spectrum of molecule-based magnetic polymer 4 and FIG. 37 describes the FTIR spectrum of molecule-based magnetic polymer 4. In FIG. 38 there is described the differential scanning calorimetric (DSC) thermogram of molecule-based magnetic polymer 4 at a heating rate of 10° C./min. In FIG. 39 there is described the thermogravimetric analysis (TGA) trace of a molecule-based polymer 4 at a heating rate of 10° C./min. FIG. 40 describes the X-ray diffraction (XRD) pattern of (a) a molecule-based magnetic polymer 4 and (b) iron oxide. Further, FIG. 41 describes the magnetic behavior of a molecule-based magnetic polymer 4: plots of magnetization (M) versus magnetic field (H) at various temperatures: (a) 2 K, (b) 20 K, (c) 30 K, and (d) 100 K.

It is noted in the synthesis scheme given above that the added TCNE produces an adduct 4 by reacting, forming covalent bonds, with the triple bonds in compound 1. The long flexible groups $C_mH_{2m+1}$ in compound 1 are introduced into compound 1 which may aid it improving its solubility, and also improving the ability to make the chemical reaction with compound 2 easier. It is noted further in the synthesis scheme given above that a phenylamine(PhN) group is introduced to the triple bond in compound 1. This may be done in order to help increase the reactivity of compound 1 when later TCNE is added to compound 3 because the PhN group plays a role of an electron-donator.

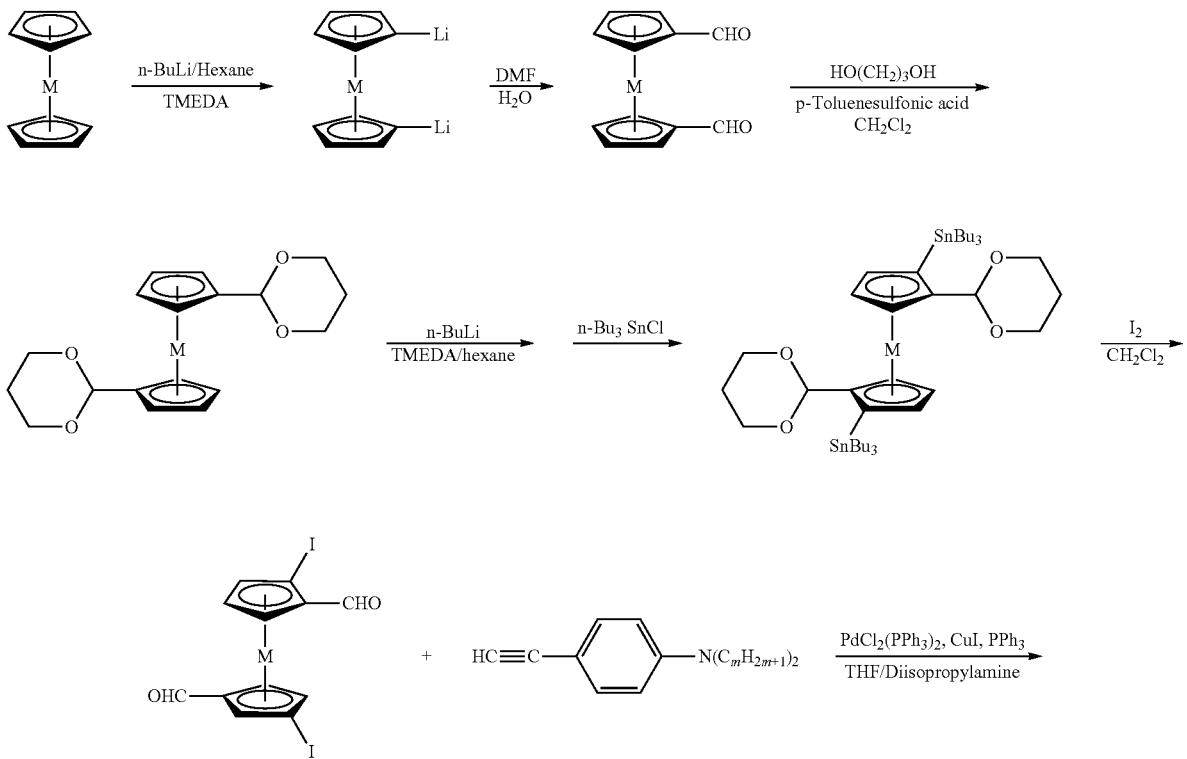

-continued
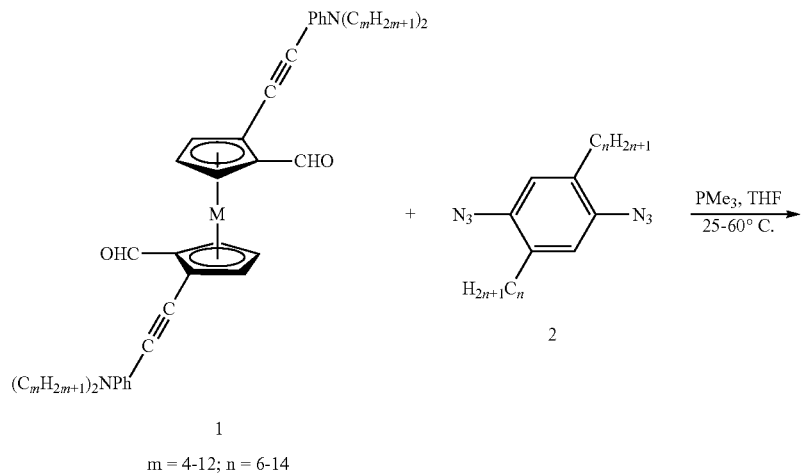
1
m = 4-12; n = 6-14
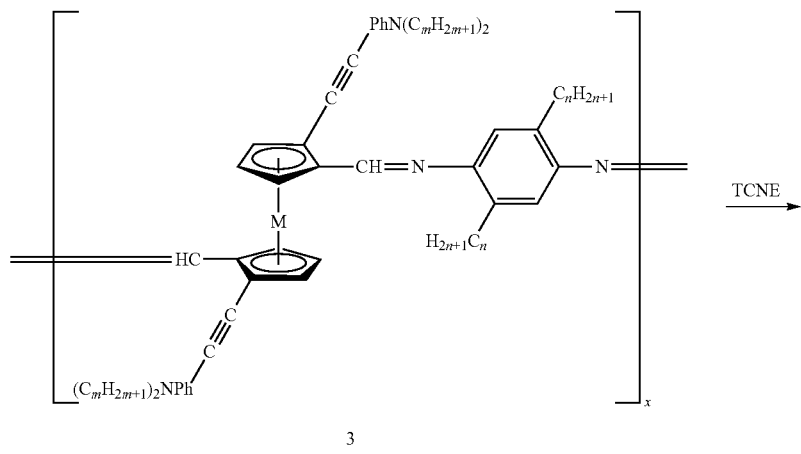
3
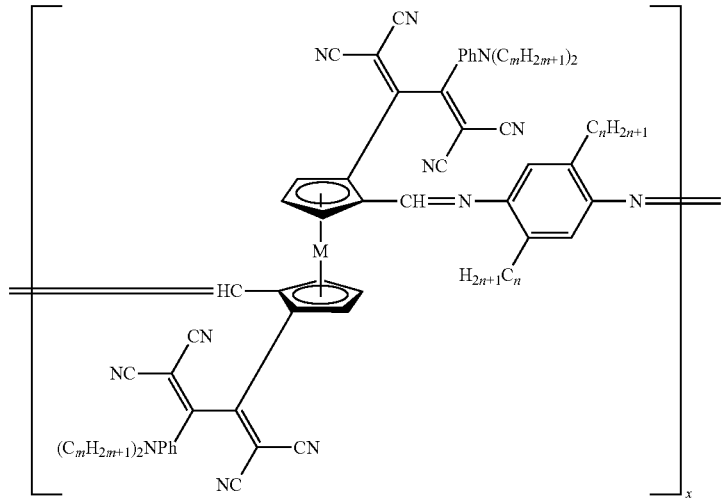
4
m = 4-12; n = 6-14
M = Fe, Co, Ni The synthesis scheme for compound 2 is given below. Long flexible groups $C_nH_{2n+1}$ may be introduced into compound 2 to improve the compound's solubility.

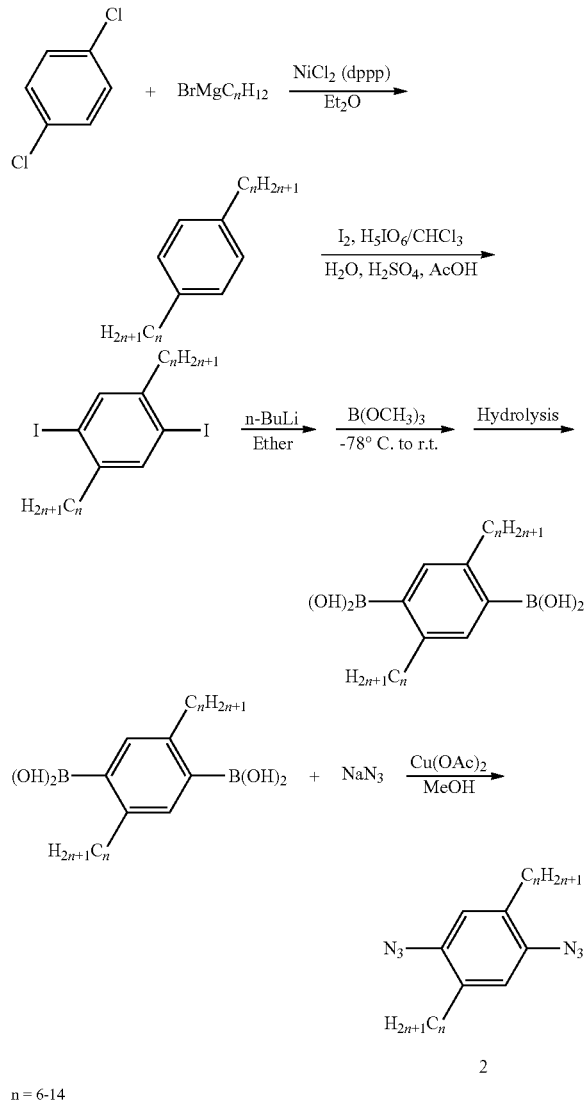

n = 6-14

Example 4

The synthesis procedures to obtain prepolymer 4 with m=4 in compound 1 and n=6 in compound 2.

Preparation of 1,1'-dialdehyde-2,2'-bis[p-(N,N-dibutylamino)phenylethynyl]ferrocene (Compound 1)

(i) Preparation of 4-(N,N-dibutylamino)phenylethyne, the reaction scheme of which is given below.

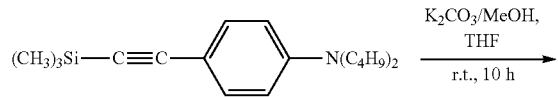

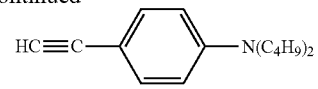

The experimental procedures employed are as follows. 4-trimethylsiylethynyl-N,N-dibutylaniline (3.0 g, 10 mmol) was dissolved in a mixed solvent of 30 mL THF and 20 mL methanol, and then potassium carbonate was added. The entire mixture was stirred at room temperature for 10 h. Upon completion, the mixture was diluted with diethyl ether, washed with aqueous NH₄Cl and water, dried over magnesium sulfate and concentrated in vacuo. The residue was purified over silica gel column chromatography using hexane/ethyl acetate (30/1, v/v) as an eluent to give 1.8 g yellow liquid. Yield: 78%. TLC: $R_f$=0.65 (hexane/ethyl acetate=30/1, v/v). ¹H NMR (300 MHz, CDCl₃, δ/ppm): 0.95 (m, 6H, —CH₃), 1.33 (m, 4H, —CH₂—), 1.54 (m, 4H, —CH₂—), 2.94 (s, 1H, -acetylene), 3.24 (t, J=7.8 Hz, 4H, —NCH₂—), 6.52 (d, J=9 Hz, 2H, Ar—H), 7.32 (d, J=9.3 Hz, 2H, -phenyl). ¹³C NMR (300 MHz, CDCl₃, δ/ppm): 14.1 (—CH₃), 20.4 (—CH₂—), 29.4 (—CH₂—), 50.7 (—CH₂—), 74.6 (-acetylene), 85.2 (-acetylene), 107.6 (Ar—C), 111.1 (Ar—C), 133.4 (Ar—C), 148.2 (Ar—C). FTIR spectrum (cm⁻¹): 3303 (-acetylene), 3086, 3039, 2955 (—CH₂—), 2929 (—CH₂—), 2866 (—CH₂—), 2099 (-acetylene), 1606 (-phenyl), 1576, 1559, 1539, 1513, 1461, 1399, 1365, 1287, 1222, 1179, 1147, 1106, 1008, 928, 811, 738, 642, 571.

(ii) Preparation of 4-trimethylsilylethynyl-N,N-dibutylaniline, the reaction scheme of which is given below.

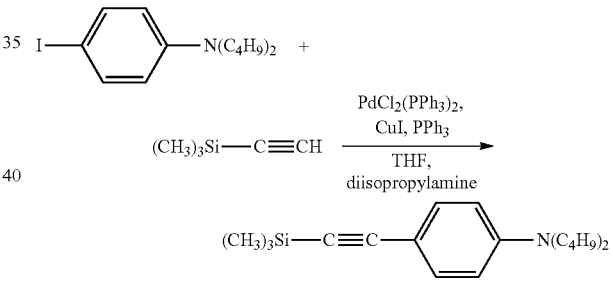

The experimental procedures employed are as follows. Copper(I) iodide (116.6 mg, 0.6 mmol), triphenylphosphine (159 mg, 0.6 mmol) and PdCl₂(PPh₃)₂ (214.8 mg, 0.3 mmol) were added to a solution of N,N-dibutyl-4-iodoaniline (3.3 g, 10 mmol) in a mixed solvent of 50 mL THF and 30 mL diisopropylamine, and the reaction mixture was thoroughly degassed through a freeze-pump-thaw procedure. After that, trimethylsilyl acetylene (1.7 mL, 12 mmol) was added and the degassing procedure was performed once again. The reaction solution was stirred at room temperature under an argon gas atmosphere for 24 h. After the reaction was finished, the ammonia salt was removed by passing through a silica gel plug. The solvent in the filtrate was removed under reduced pressure. Purification of the residue on silica gel flash chromatography using hexane/ethyl acetate (50/1, v/v) as an eluent gave 2.3 g tan oil. Yield: 76%. TLC: $R_f$=0.73 (hexane/ethyl acetate=50/1, v/v). ¹H NMR (300 MHz, CDCl₃, δ/ppm): 0.14 (s, 9H, —Si(CH₃)₃), 0.84 (m, 6H, —CH₃), 1.22 (m, 4H, —CH₂—), 1.41 (m, 4H, —CH₂—), 3.12 (t, J=7.5 Hz, 4H, —NCH₂—), 6.39 (d, J=8.7 Hz, 2H, Ar—H), 7.19 (d, J=9.0 Hz, 2H, Ar—H). ¹³C NMR (300 MHz, CDCl₃, δ/ppm): 0.1 (s, —Si(CH₃)₃), 13.7 (—CH₃), 20.0 (—CH₂—), 29.0

(—CH$_2$—), 50.3 (—CH$_2$—), 90.3 (-ethynyl), 106.6 (-ethynyl), 108.3 (Ar—C), 110.7 (Ar—C), 132.9 (Ar—C), 147.7 (Ar—C). FTIR spectrum (cm$^{-1}$): 3091, 3041, 2956 (—CH$_2$—), 2929 (—CH$_2$—), 2868 (—CH$_2$—), 2145 (-ethynyl), 1604 (-phenyl), 1558, 1540, 1514, 1462, 1400, 1365, 1287, 1246, 1222, 1185, 1150, 1105, 1012, 928, 859, 837, 812, 758, 727, 698, 632.

(iii) 4-(N,N-dibutylamino)phenylethyne, the reaction scheme of which is given below.

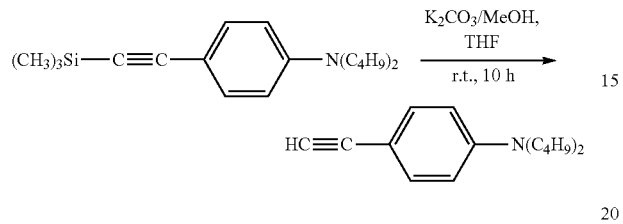

The experimental procedures employed are as follows. 4-trimethylsiylethynyl-N,N-dibutylaniline (3.0 g, 10 mmol) was dissolved in a mixed solvent of 30 mL THF and 20 mL methanol, and then potassium carbonate was added. The whole mixture was stirred at room temperature for 10 h. Upon completion, the mixture was diluted with diethyl ether, washed with aqueous NH$_4$Cl and water, dried over magnesium sulfate and concentrated in vacuo. The residue was purified over silica gel column chromatography using hexane/ethyl acetate (30/1, v/v) as an eluent to give 1.8 g yellow liquid. Yield: 78%. TLC: R$_f$=0.65 (hexane/ethyl acetate=30/1, v/v). $^1$H NMR (300 MHz, CDCl$_3$, δ/ppm): 0.95 (m, 6H, —CH$_3$), 1.33 (m, 4H, —CH$_2$—), 1.54 (m, 4H, —CH$_2$—), 2.94 (s, 1H, -acetylene), 3.24 (t, J=7.8 Hz, 4H, —NCH$_2$—), 6.52 (d, J=9 Hz, 2H, Ar—H), 7.32 (d, J=9.3 Hz, 2H, -phenyl). $^{13}$C NMR (300 MHz, CDCl$_3$, δ/ppm): 14.1 (—CH$_3$), 20.4 (—CH$_2$—), 29.4 (—CH$_2$—), 50.7 (—CH$_2$—), 74.6 (-acetylene), 85.2 (-acetylene), 107.6 (Ar—C), 111.1 (Ar—C), 133.4 (Ar—C), 148.2 (Ar—C). FTIR spectrum (cm$^{-1}$): 3303 (-acetylene), 3086, 3039, 2955 (—CH$_2$—), 2929 (—CH$_2$—), 2866 (—CH$_2$—), 2099 (-acetylene), 1606 (-phenyl), 1576, 1559, 1539, 1513, 1461, 1399, 1365, 1287, 1222, 1179, 1147, 1106, 1008, 928, 811, 738, 642, 571.

(iv) Preparation of 1,1'-ferrocenedicarbaldehyde, the reaction scheme of which is given below.

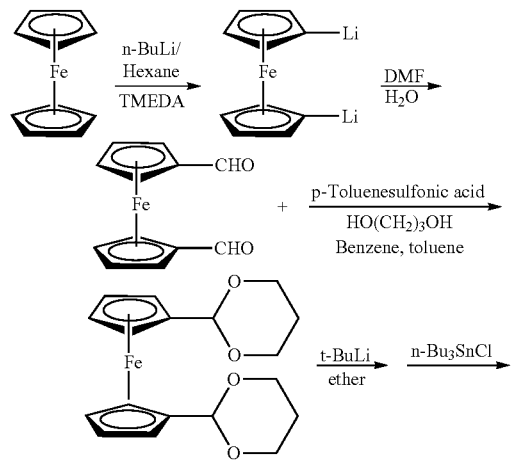

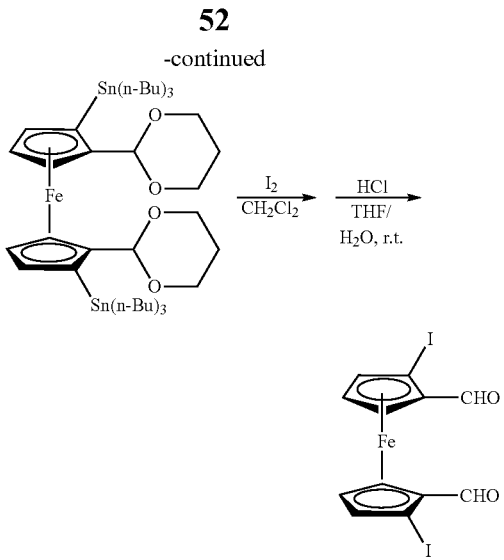

The experimental procedures employed are as follows. 1'-bis(1,3-dioxane-2-yl)-2,2'-bis-tri-n-butylstannyl ferrocene (9.4 g, 10 mmol) in 50 mL dichloromethane was cooled to −78° C. and then treated with iodine (in 100 mL dichloromethane under an argon atmosphere. The dark green mixture was brought to warming to room temperature and was stirred overnight. The mixture was then washed twice with 1M solutions of sodium thiosulphate (50 mL), and the organic layer was separated and flashed through a small portion of silica gel using dichloromethane as the eluent. The solvent was then evaporated under reduced pressure. The obtained product was dissolved in 30 mL THF and 2 mL 10% aqueous hydrogen chloride solution. The reaction mixture was stirred at room temperature with the exclusion of light overnight. Upon the completion of reaction, the organic layer was extracted with dichloromethane twice, and the combined organic layers were dried over magnesium sulfate followed by removal of the solvent in vacuo. The crude product was purified by column chromatography using chloroform/ethyl acetate (20/1, v/v) as an eluent, and then recrystallized from hexane/ethyl acetate (1/1, v/v) to give 2.8 g red solid. Yield: 57%. TLC: R$_f$=0.7 (chloroform/ethyl acetate=20/1, v/v). $^1$H NMR (300 MHz, CDCl$_3$, δ/ppm): 4.72 (t, J=2.7 Hz, 4H, -Fc), 4.80 (q, J=1.5 Hz, 4H, -Fc), 4.98 (q, J=1.2 Hz, 2H, -Fc), 9.99 (s, 2H, —CHO). $^{13}$C NMR (300 MHz, DMSO, δ/ppm): 43.2 (I-Fc-C), 71.6 (Fc-C), 78.4 (Fc-C), 78.8 (Fc-C), 84.2 (CHO-Fc-C), 194.3 (—CHO). FTIR spectrum (cm$^{-1}$): 3097 (Fc-Cp), 2831, 1662 (—CHO), 1429, 1388, 1352, 1301, 1248, 1052, 1026, 951, 817 (—I), 743, 606, 552.

(v) Preparation of 1,1'-dialdehyde-2,2'-bis[p-(N,N-dibutylamino)phenylethynyl]ferrocene (Compound 1 with m=4), the reaction scheme of which is given below.

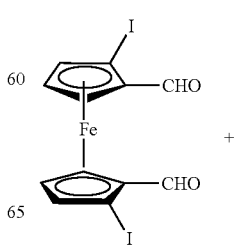

-continued

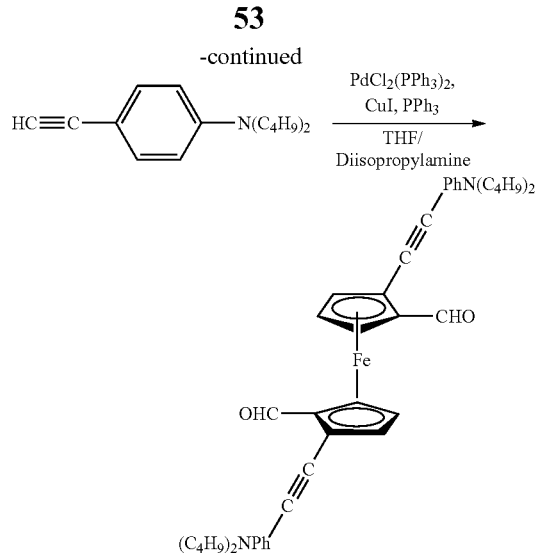

The experimental procedures employed are as follows. Copper(I) iodide (38.9 mg, 0.2 mmol), triphenylphosphine (53 mg, 0.2 mmol) and PdCl$_2$(PPh$_3$)$_2$ (71.6 mg, 0.1 mmol) were added to a solution of 4-(N,N-dibutylamino) phenylethyne (1.4 g, 6 mmol) and 1,1'-dialdehyde-2,2'-diiodoferrocene (0.99 g, 2 mmol) in 20 mL THF and 10 mL diisopropylamine. The reaction mixture was thoroughly degassed through a freeze-pump-thaw procedure. The resulting mixture was stirred at 65° C. for three days. After the reaction mixture was cooled, the ammonia salts were removed by passing through a short silica gel plug, and the solvent was removed under reduced pressure. The residue was subjected to silica gel column chromatography with chloroform/ethyl acetate (30/1, v/v) as an eluent. The collected was concentrated under reduced pressure, and then recrystallized from hexane/ethyl acetate (3/1, v/v) to give 0.54 g red crystals. Yield: 39%. TLC: R$_f$=0.68 (chloroform/ethyl acetate=30/1, v/v). $^1$H NMR (300 MHz, CDCl$_3$, δ/ppm): 0.98 (m, 12H, —CH$_3$), 1.37 (d, J=6.6 Hz, 8H, —CH$_2$—), 1.58 (s, 8H, —CH$_2$—), 3.29 (s, 8H, —NCH$_2$—), 4.65 (s, 2H, Fc-H), 4.88 (s, 2H, Fc-H), 5.01 (s, 2H, Fc-H), 6.54 (d, J=8.1 Hz, 4H, Ar—H), 7.34 (d, J=7.8 Hz, 4H, Ar—H), 10.25 (s, 2H, —CHO). $^{13}$C NMR (300 MHz, CDCl$_3$, 6/ppm): 14.0 (—CH$_3$), 20.3 (—CH$_2$—), 29.3 (—CH$_2$—), 50.7 (—NCH$_2$—), 68.9 (Fc-C), 74.6 (Fc-C), 74.8 (Fc-C), 77.6 (Fc-C), 79.4 (Fc-C), 80.0 (-ethynyl), 94.1 (-ethynyl), 107.8 (Ar—C), 111.1 (Ar—C), 133.1 (Ar—C), 148.1 (Ar—C), 193.3 (—CHO). FTIR spectrum (cm$^{-1}$): 3093 (Fc-Cp), 2952 (—CH$_2$—), 2927 (—CH$_2$—), 2864 (—CH$_2$—), 2202 (-ethynyl), 1679 (—CHO), 1601 (-phenyl), 1518, 1458, 1432, 1399, 1363, 1285, 1226, 1195, 1169, 1102, 1004, 927, 811, 766, 698, 642, 595.

Preparation of 2,5-bis(hexyl)terephthazide (Compound 2 with n=6)

(i) Preparation of 1,4-dihexylbenzene, the reaction scheme of which is given below.

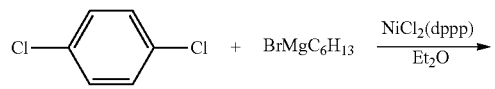

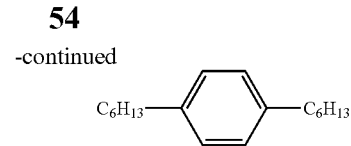

The experimental procedures employed are as follows. To a solution of 1,4-dichlorobenzene (7.4 g, 50 mmol) and [1,3-bis(diphenylphosphino)propane]dichloronickel(II) (0.27 g, 0.5 mmol) in 100 mL diethyl ether was added dropwise 2.0 M solution of hexylmagnesium bromide in diethyl ether (60 mL, 120 mmol) at 0° C. Then, the reaction mixture was heated to 50° C. overnight. After that, the reaction was carefully quenched by pouring the mixture into 100 g crushed ice, and then treated with 50 mL of 3 M aqueous HCl. The aqueous layer was separated and extracted several times with hexane, the combined organic layers were washed with water and brine and dried over MgSO$_4$. After removing the solvent under reduced pressure, the crude product was purified over silica gel column chromatography using hexane as an eluent to give 11.3 g colorless liquid. Yield: 92%. TLC: R$_f$=0.85 (hexane). $^1$H NMR (300 MHz, CDCl$_3$, δ/ppm): 1.01 (m, 6H, —CH$_3$), 1.44 (m, 12H, —CH$_2$—), 1.72 (m, 4H, —CH$_2$—), 2.69 (m, 4H, —CH$_2$—), 7.20 (s, 4H, Ar—H). $^{13}$C NMR (300 MHz, CDCl$_3$, δ/ppm): 14.2 (—CH$_3$), 22.7 (—CH$_2$—), 29.2 (—CH$_2$—), 31.7 (—CH$_2$—), 31.9 (—CH$_2$—), 35.7 (—CH$_2$—), 128.3 (Ar—C), 140.1 (Ar—C). FTIR spectrum (cm$^{-1}$): 2955 (—CH$_2$—), 2923 (—CH$_2$—), 2853 (—CH$_2$—), 1512, 1460, 1375, 1116, 1018, 809, 723, 512.

(ii) Preparation of 2,5-dihexyl-1,4-diiodobenzene, the reaction scheme of which is given below.

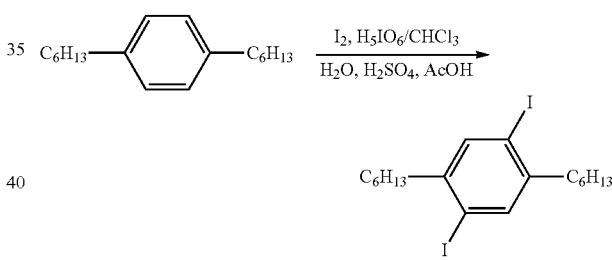

The experimental procedures employed are as follows. Iodine (5.1 g, 20 mmol), periodic acid (2.3 g, 10 mmol), and 1,4-dihexylbenzene (6.2 g, 25 mmol) were dissolved in a mixed solvent of 15 mL acetic acid, 3 mL 30% sulfuric acid, 5 mL chloroform. The mixture was heated at reflux for 1 day. After cooling to room temperature, the reaction mixture was poured on crushed ice (100 g), and then extracted with chloroform (100 mL×3). The combined organic layers were washed with 10% NaOH until a yellow solution, water and brine, was obtained. After drying over MgSO$_4$, the solvent was removed in vacuo. The crude product was passed through a short silica gel plug using chloroform as the eluent. After removal of the solvent, the solid was recrystallized from hexane to give 8.3 g white needles. Yield: 67%. TLC: R$_f$=0.73 (chloroform). $^1$H NMR (300 MHz, CDCl$_3$, δ/ppm): 0.92 (m, 6H, —CH$_3$), 1.36 (m, 12H, —CH$_2$—), 1.56 (m, 4H, —CH$_2$—), 2.60 (t, J=8.4 Hz, 4H, —CH$_2$—), 7.61 (s, 2H, Ar—H). $^{13}$C NMR (300 MHz, CDCl$_3$, δ/ppm): 14.2 (—CH$_3$), 22.7 (—CH$_2$—), 29.1 (—CH$_2$—), 30.2 (—CH$_2$—), 31.7 (—CH$_2$—), 39.9 (—CH$_2$—), 100.5 (Ar—C), 139.3 (Ar—C), 144.8 (Ar—C). FTIR spectrum (cm$^{-1}$): 2914 (—CH$_2$—), 2848 (—CH$_2$—), 1583 (-phenyl), 1456, 1352, 1298, 1271, 1188, 1113, 1032, 976, 879 (—I), 828, 787, 717, 628.

(iii) Preparation of 2,5-dihexyl-1,4-phenylenediboronic acid, the reaction scheme of which is given below.

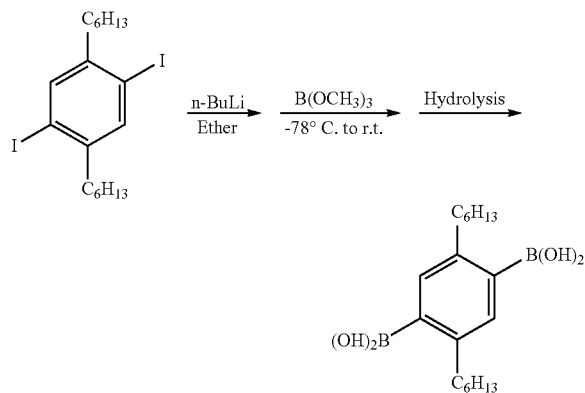

The experimental procedures employed are as follows. To a solution of 2,5-dihexyl-1,4-diiodobenzene (5.0 g, 10 mmol) in 100 mL anhydrous diethyl ether was added to 1.6 M solution of n-butyllithium in hexane (31.2 mL, 50 mmol) dropwise at 0° C. The reaction mixture was then warmed to room temperature overnight. After the solution was cooled to −78° C., trimethyl borate (6.8 mL, 60 mmol) was added drop wise to the reaction mixture via a syringe, followed by stirring at this temperature for 2 h. Consequently, the reaction mixture was warmed to room temperature gradually and stirred overnight. After the reaction was completed, 100 mL 10% aqueous HCl was added. The resulting precipitate was collected, washed with water and diethyl ether. The crude product was suspended in 20 mL ethyl acetate and then 50 mL hexane was added. The precipitates were isolated by filtration and dried to give 1.9 g white solid. Yield: 57%. $^1$H NMR (300 MHz, DMSO, δ/ppm): 0.85 (m, 6H, —CH$_3$), 1.26 (s, 12H, —CH$_2$—), 1.48 (s, 4H, —CH$_2$—), 2.65 (t, J=8.1 Hz, 4H, —CH$_2$—), 7.14 (s, 2H, Ar—H), 7.88 (s, 4H, B—OH). $^{13}$C NMR (300 MHz, DMSO, δ/ppm): 14.5 (—CH$_3$), 22.6 (—CH$_2$—), 29.3 (—CH$_2$—), 31.7 (—CH$_2$—), 32.9 (—CH$_2$—), 35.7 (—CH$_2$—), 134.0 (Ar—C), 136.4 (Ar—C), 142.4 (Ar—C). FTIR spectrum (cm$^{-1}$): 3264 (B—OH), 2958 (—CH$_2$—), 2919 (—CH$_2$—), 2851 (—CH$_2$—), 1496, 1457, 1398, 1333, 1181, 1122, 1030, 900, 825, 722, 672, 605.

(iv) Synthesis of 2,5-bis(hexyl)terephthazide (Compound 2 with n=6), the reaction scheme of which is given below.

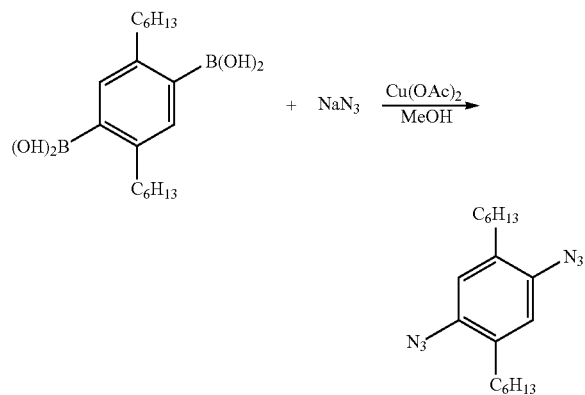

The experimental procedures employed are as follows. To a solution of 2,5-dihexyl-1,4-phenylenediboronic acid (3.3 g, 10 mmol) in 10 mL methanol were added sodium azide (3.3 g, 50 mmol) and copper(II) acetate (0.36 g, 2 mmol). The reaction mixture was stirred vigorously at room temperature overnight. The resulting mixture was concentrated under reduced pressure, and the residue was extracted with hexane and then purified via silica gel column chromatography using hexane/ethyl acetate (50/1, v/v) as an eluent. The solvent was removed in vacuo and then recrystallized from hexane three times to give 1.35 g white crystals. Yield: 41%. TLC: $R_f$=0.76 (hexane/ethyl acetate=50/1, v/v). $^1$H NMR (300 MHz, CDCl$_3$, δ/ppm): 0.92 (m, 6H, —CH$_3$), 1.36 (m, 12H, —CH$_2$—), 1.55 (m, 4H, —CH$_2$—), 2.54 (t, J=8.1 Hz, 4H, —CH$_2$—), 6.89 (s, 2H, Ar—H). $^{13}$C NMR (300 MHz, CDCl$_3$, δ/ppm): 14.1 (—CH$_3$), 22.6 (—CH$_2$—), 29.1 (—CH$_2$—), 30.3 (—CH$_2$—), 31.1 (—CH$_2$—), 31.7 (—CH$_2$—), 119.7 (Ar—C), 133.4 (Ar—C), 134.0 (Ar—C). FTIR spectrum (cm$^{-1}$): 2951 (—CH$_2$—), 2921 (—CH$_2$—), 2850 (—CH$_2$—), 2102 (—N$_3$), 1522, 1496, 1458, 1398, 1268, 1188, 1133, 1077, 974, 868, 723, 658, 587, 530.

Synthesis of Prepolymer 3 with m=4 and n=6

Following the synthesis scheme given above, prepolymer 3 was synthesized by condensation polymerization of 1,1'-dialdehyde-2,2'-bis[p-(N,N-dibutylamino)phenylethynyl]ferrocene (1 with m=4) and 2,5-bis(hexyl)terephthazide (2 with n=6). The experimental procedures employed are as follows. 1,1'-dialdehyde-2,2'-bis[p-(N,N-dibutylamino)phenylethynyl] ferrocene (3.5 g, 5 mmol) and 2,5-dihexyl-terephthazide (1.6 g, 5 mmol) were dissolved in 20 mL dry toluene. The reaction mixture was thoroughly degassed through a freeze-pump-thaw procedures and then back-filled with high-purity argon gas. After that, an excess amount of trimethylphosphine (1.0 M solution in toluene, 20 mL, 20 mmol) was added dropwise at room temperature and stirred for 2 h. The solution was then heated to 60° C. for 4 days. After cooling down, the reaction mixture was concentrated. Exhaustive extraction of the resulting solid with methanol (Soxhlet extraction) and hexane afforded 3.3 g red polymer. Yield: 71%. $^1$H NMR (300 MHz, CDCl$_3$, δ/ppm): 0.96 (s, 18H, —CH$_3$), 1.35 (s, 20H, —CH$_2$—), 1.56 (s, 12H, —CH$_2$—), 2.76 (s, 4H, —CH$_2$—), 3.26 (s, 8H, —NCH$_2$—), 4.62 (s, 2H, Fc-H), 4.79 (s, 2H, Fc-H), 5.14 (s, 2H, Fc-H), 6.45 (s, 4H, Ar—H), 6.94 (s, 2H, Ar—H), 7.24 (m, 4H, Ar—H), 8.72 (s, 2H, —CH=N—). FTIR spectrum (cm$^{-1}$): 3089, 3043, 2952 (—CH$_2$—), 2923 (—CH$_2$—), 2855 (—CH$_2$—), 2203 (-ethynyl), 1603 (-phenyl and —CH=N—), 1558, 1517, 1454, 1397, 1363, 1284, 1219, 1187, 1103, 1003, 962, 926, 879, 808, 727, 647.

Synthesis of magnetic polymer 4 with m=4 and n=6)

Using the reaction scheme given above, a molecule-based magnetic polymer 4 was prepared by adding TCNE to 3 yielding an adduct of 3. The covalent bonding of TCNE with the triple bonds in 3 induces intramolecular charge-transfer interactions by cycloaddition of TCNE to donor-substituted cyanoalkynes, yielding a conjugated donor-acceptor type polymer which will exhibit magnetic behavior as will be demonstrated below.

The experimental procedures employed for the preparation of 4 are as follows. A solution of tetracyanoethylene (0.27 g, 2.05 mmol) in 15 mL dichloromethane was added dropwise to a solution of 3 in 20 mL dichloromethane under an argon atmosphere at 0° C. The reaction mixture was then stirred at 0° C. for 4 h and then warmed to room temperature overnight. The polymer solution was concentrated under reduced pressure and then passed through a silica gel chromatographic column using dichloromethane/ethyl acetate (20/1, v/v) as an eluent. The obtained product was re-dissolved in dichloromethane and precipitated in hexane three times to give 0.88 g dark, red powder. Yield: 74%. TLC: $R_f$=0.72 (dichloromethane/ethyl acetate=20/1, v/v). $^1$H NMR (300 MHz, CDCl$_3$, δ/ppm): 0.95 (s, 18H, —CH$_3$), 1.34 (s, 20H, —CH$_2$—), 1.56 (s, 12H, —CH$_2$—), 2.75 (s, 4H, —CH$_2$—), 3.35 (s, 8H, —NCH$_2$—), 4.89 (s, 2H, Fc-H), 5.42 (s, 2H, Fc-H), 5.80 (s, 2H, Fc-H), 6.58 (s, 6H, Ar—H), 7.87 (s, 4H, Ar—H), 8.62 (s, 2H, —CH=N—). $^{13}$C NMR (300 MHz, CDCl$_3$, δ/ppm): 13.9 (—CH$_3$), 20.2 (—CH$_2$—), 22.5 (—CH$_2$—), 29.3 (—CH$_2$—), 31.7 (—CH$_2$—), 51.2 (—NCH$_2$—), 67.5 (Fc-C), 71.1 (Fc-C), 80.6 (Fc-C), 89.8 (=C(CN)$_2$), 105.0 (Ar—C), 112.1 (Ar—C), 114.7 (—CN), 115.4 (—CN), 116.2 (—CN), 121.7 (Ar—C), 123.4 (Ar—C), 133.2 (Ar—C), 135.8 (Ar—C), 137.8 (Ar—C), 153.5 (N—Ar—C), 155.2 (—CH=N—), 162.0 (C=C(CN)$_2$), 169.9 (C=C(CN)$_2$). FTIR spectrum (cm$^{-1}$): 3098, 2952 (—CH$_2$—), 2925 (—CH$_2$—), 2858 (—CH$_2$—), 2210 (—CN), 1598 (-phenyl and —CH=N—), 1482, 1444, 1412, 1336, 1288, 1205, 1180, 1104, 922, 815, 727, 658, 590.

Synthesis of Molecule-Based Magnetic Polymer via the Schiff Base Reaction Followed by Adduction with TCNE Following the synthesis scheme given below, a metallocene conjugated type prepolymer 3 is achieved by the Schiff base reaction. In the synthesis scheme an electron-donating compound 1 is first synthesized as described above and then compound 1 is reacted with 2,5-dihexyl-1,4-diaminebenzene 5 having n=6, yielding a prepolymer 3 which is still a conjugated type electron-donating polymer. It is noted that the catalyst and reaction temperature employed in obtaining prepolymer 3 by following the synthesis scheme given below are different from those given above where the azide-containing compound 2 is used. The rest of the synthesis procedures are identical in the two synthesis schemes.

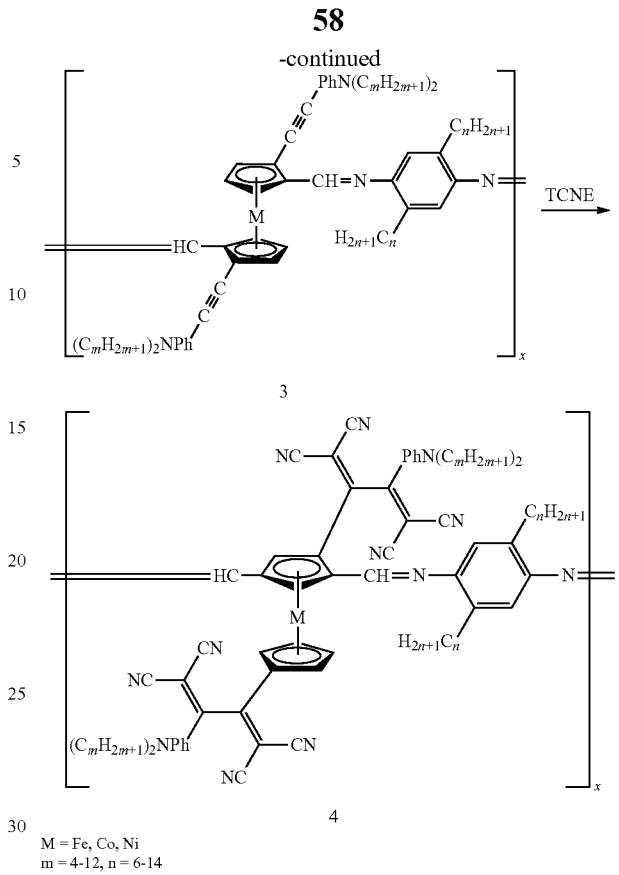

M = Fe, Co, Ni
m = 4-12, n = 6-14

Example 5

E. Synthesis of 2,5-dihexyl-1,4-diaminebenzene (Compound 5 with n=6)

The synthesis scheme for compound 5 is given below. The reason why long flexible groups $C_nH_{2n+1}$ are introduced into compound 5 is to improve its solubility. Otherwise compound 5 would have very poor solubility making the chemical reaction with compound 1 very difficult.

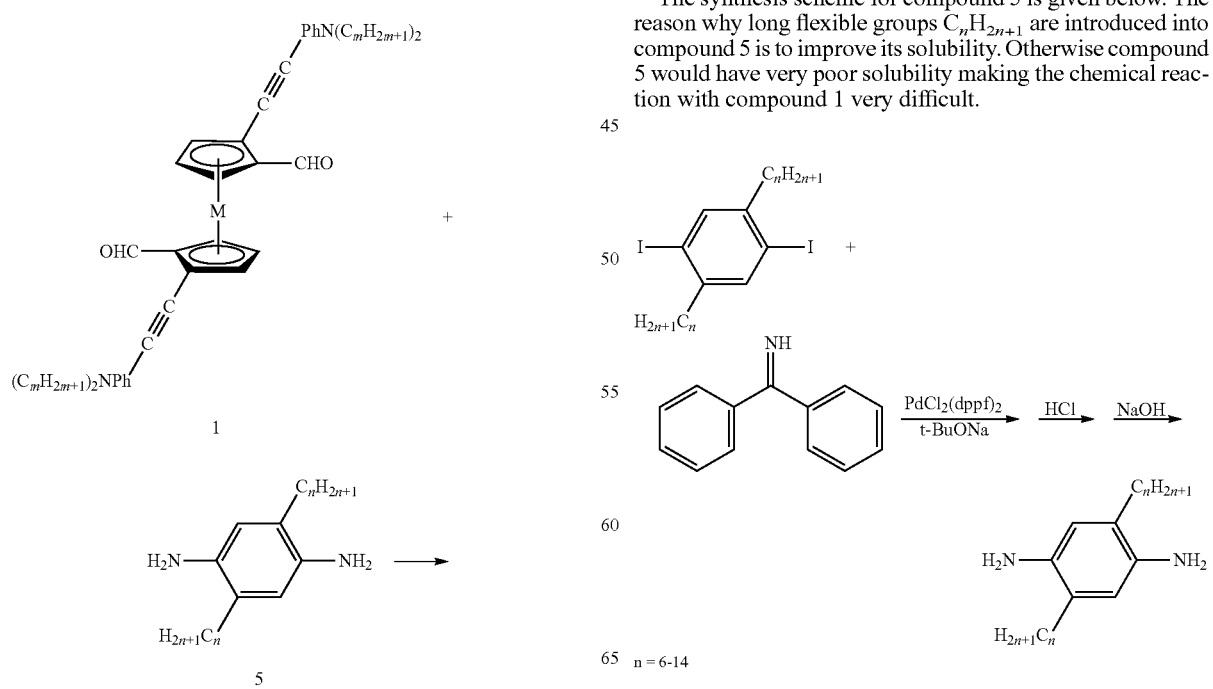

n = 6-14

The experimental procedures employed are as follows. Benzophenone imine (3.8 g, 20 mmol), 2,5-dihexyl-1,4-diiodobenzene (5.0 g, 10 mmol), 2.0 M solution of sodium tert-butoxide solution in THF (10 mL, 20 mmol) were mixed in 100 mL toluene. 1,1'-bis(diphenylphosphino) ferrocene] dichloropalladium(II) was then added, and the mixture was thoroughly degassed through a freeze-pump-thaw procedure performed. After that, the mixture was heated to reflux. Initially a clear orange solution formed. After about 3 h the mixture became cloudy due to the formation of sodium iodide precipitates. Reflux was continued for 48 h under an argon atmosphere. The reaction was stopped by cooling the mixture to room temperature, followed by addition of 50 mL water and then 50 mL 37% aqueous HCl. The mixture was refluxed overnight and cooled to room temperature. The solution was diluted with 100 mL ethyl acetate. The acidic aqueous phase was separated, and washed with ethyl acetate (50 mL×3). The isolated acidic aqueous phase was carefully treated with 3M aqueous NaOH, and then extracted with dichloromethane (50 mL×3). The collected organic layers were washed with water and dried over $MgSO_4$. Then, the solvent was removed in vacuo. The product was further purified via silica gel column chromatography using chloroform as an eluent. The collected solution was concentrated under reduced pressure, and then recrystallized from ethanol give 1.0 g colorless crystals. Yield: 36%. TLC: $R_f$=0.56 (chloroform). $^1$H NMR (300 MHz, $CDCl_3$, δ/ppm): 0.92 (m, 6H, —$CH_3$), 1.38 (m, 12H, —$CH_2$—), 1.60 (m, 4H, —$CH_2$—), 2.44 (s, 4H, —$CH_2$—), 3.42 (s, 4H, —$NH_2$), 6.48 (s, 2H, Ar—H). $^{13}$C NMR (300 MHz, $CDCl_3$, δ/ppm): 14.2 (—$CH_3$), 22.7 (—$CH_2$—), 29.2 (—$CH_2$—), 29.5 (—$CH_2$—), 31.1 (—$CH_2$—), 31.8 (—$CH_2$—), 117.6 (Ar—C), 126.5 (Hexyl-Ar—C), 136.3 ($NH_2$—Ar—C). FTIR spectrum ($cm^{-1}$): 3430 (—$NH_2$), 3386 (—$NH_2$), 3316 (—$NH_2$), 3200 (—$NH_2$), 2957 (—$CH_2$), 2921 (—$CH_2$), 2851 (—$CH_2$), 1618 (—$NH_2$), 1558 (-phenyl), 1511, 1460, 1427, 1377, 1322, 1286, 1255, 1197, 1093, 880, 787, 709.

Synthesis of Prepolymer 3 with m=4 and n=6

Following the synthesis scheme given above, prepolymer 3 was synthesized by condensation polymerization of 1,1'-dialdehyde-2,2'-bis[p-(N,N-dibutylamino)phenylethynyl]ferrocene (1 with m=4) and 2,5-dihexyl-1,4-diaminebenzene (5 with n=6). The experimental procedures employed are as follows. 1,1'-dialdehyde-2,2'-bis[p-(N,N-dibutylamino)phenyl ethynyl]ferrocene (0.70 g, 1 mmol), 2,5-dihexyl-1,4-diaminebenzene (0.28 g, 1 mmol), and lithium chloride (0.42 g, 10 mmol) were placed in a Schlenk tube, which was evacuated under vacuo and purged with argon gas. Then, 5 mL anhydrous toluene was added to the solution and thoroughly degassed through a freeze-pump-thaw procedure. The reaction mixture was heated to 65° C. under an argon atmosphere for three days. After cooling to room temperature, the prepolymer solution was concentrated and then purified by Soxhlet extraction with methanol for 24 h. Prepolymer 3 was re-dissolved in chloroform, filtered, and then methanol was added drop wise to precipitate out the product. Prepolymer 3 was dried in vacuum to give 0.58 g red polymer. Yield: 62%. $^1$H NMR (300 MHz, $CDCl_3$, δ/ppm): 0.93 (m, 18H, —$CH_3$), 1.30 (s, 20H, —$CH_2$—), 1.53 (s, 12H, —$CH_2$—), 2.73 (s, 4H, —$CH_2$—), 3.24 (s, 8H, —$NCH_2$—), 4.59 (s, 2H, Fc-H), 4.77 (s, 2H, Fc-H), 5.11 (s, 2H, Fc-H), 6.40 (s, 4H, Ar—H), 6.90 (s, 2H, Ar—H), 7.19 (m, 4H, Ar—H), 8.69 (s, 2H, —CH═N—), 10.3 (s, 2H, trace of —CHO), FTIR spectrum ($cm^{-1}$): 3090, 3043, 2952 (—$CH_2$—), 2923 (—$CH_2$—), 2855 (—$CH_2$—), 2195 (-ethynyl), 1677 (trace of —CHO), 1602 (-phenyl and —CH═N—), 1558, 1517, 1455, 1398, 1363, 1286, 1257, 1220, 1187, 1103, 1092, 1019, 926, 873, 806, 729.

What is claimed is:

1. A magnetic polymer of the formula:

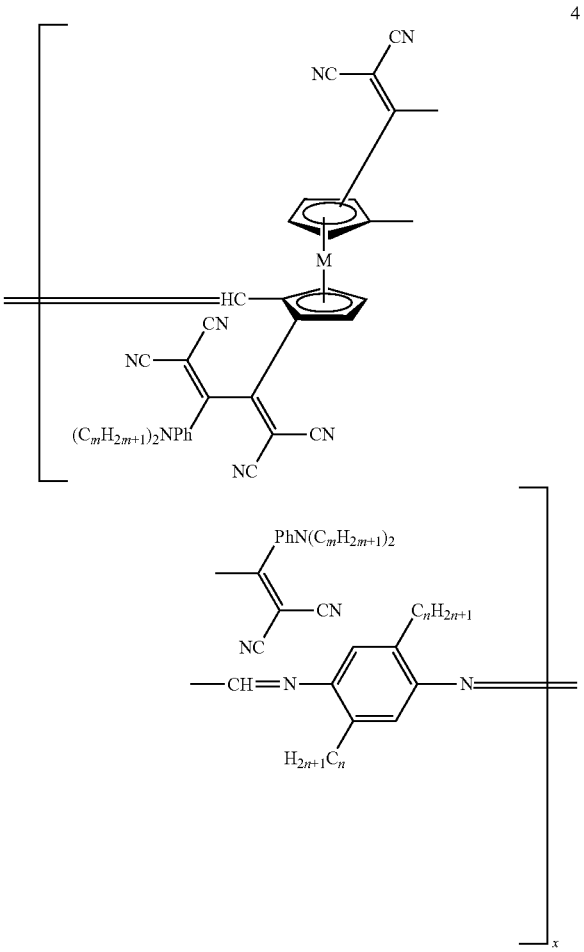

M = Fe, Co, Ni
m = 4-12, n = 6-14 wherein M is iron (Fe), cobalt (Co) or nickel (Ni), m is from 4 to 12 and n is from 6 to 14 and x represents the number of repeating units.

2. The magnetic polymer of claim 1, wherein m is 4 and n is 6.

3. The magnetic polymer of claim 2, wherein M is iron.

4. The magnetic polymer of claim 1, further characterized in that the magnetic polymer is devoid of magnetic particles.

5. A method of preparing a magnetic polymer, the method comprising the steps of:
  (a) preparing an organometallic monomer;
  (b) preparing a monomer having a functional group that polymerizes with the organometallic monomer;
  (c) reacting the organometallic monomer of (a) with the monomer of (b), to yield an electron-donating polymer; and
  (d) reacting the electron-donating polymer of step (c) with an electron acceptor, thereby directly bonding the electron acceptor to the organometallic unit of the reaction product of step (c), thereby producing an electron donor-acceptor magnetic polymer.

6. The method claim 5, wherein the electron donor-acceptor magnetic polymer is devoid of magnetic particles.

7. The method of claim 5, wherein, in said step (a) the organometallic monomer contains a triple bond.

8. The method of claim 7, wherein, in said step (a) the organometallic monomer contains a metallocene.

9. The method of claim 8, wherein, in said step (a) the organometallic monomer contains flexible side chains.

10. The method of claim 9, wherein, in said step (a) the organometallic monomer contains an aldehyde (CHO) group.

11. The method of claim 10, wherein, in said step (b) the functional group of the monomer is an azide group, and the azide group reacts with the aldehyde group in step (c) such that electron-donating polymer contains a carbon-nitrogen double bond (C=N).

12. The method of claim 11, wherein, in said step (a) the organometallic monomer contains a metallocene, and, in step (d), the electron acceptor is directly bonded to the metallocene.

13. The method of claim 12, wherein the electron acceptor is tetracyanoethylene (TCNE).

14. The method of claim 5, wherein, in said step (a) the organometallic monomer contains flexible side chains.

15. The method of claim 5, wherein, in said step (a) the organometallic monomer contains an aldehyde (CHO) group.

16. The method of claim 5, wherein, in said step (b) the functional group of the monomer is an azide group.

17. The method of claim 5, wherein, in said step (b) the functional group of the monomer is an azide group, and step (c) is achieved through the aza-Wittig reaction.

* * * * *